(12) United States Patent
Wachi et al.

(10) Patent No.: US 6,308,011 B1
(45) Date of Patent: *Oct. 23, 2001

(54) ZOOM LENS AND PHOTOGRAPHIC APPARATUS HAVING THE SAME

(75) Inventors: Fumihito Wachi, Tokyo; Kenichi Kimura, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,270

(22) Filed: Mar. 30, 1999

(30) Foreign Application Priority Data

Mar. 31, 1998 (JP) .................................................. 10-105501
Sep. 11, 1998 (JP) .................................................. 10-276480
Oct. 8, 1998 (JP) .................................................. 10-301684

(51) Int. Cl.$^7$ ............................. G03B 17/00; G02B 15/14

(52) U.S. Cl. .............................................. 396/72; 359/689

(58) Field of Search ................................. 396/72, 79, 83; 359/689, 784

(56) References Cited

U.S. PATENT DOCUMENTS

| | | | |
|---|---|---|---|
| 4,733,952 | 3/1988 | Fujioka | 350/426 |
| 4,999,007 | 3/1991 | Aoki et al. | 350/426 |
| 5,134,524 | 7/1992 | Hamano et al. | 359/687 |
| 5,341,243 | 8/1994 | Okuyama et al. | 359/687 |
| 5,434,710 | * 7/1995 | Zozawa | 359/689 |
| 5,682,269 | 10/1997 | Kimura et al. | 359/770 |
| 5,739,961 | 4/1998 | Nakayama et al. | 359/687 |
| 5,754,346 | 5/1998 | Nakayama et al. | 359/687 |
| 5,872,660 | * 2/1999 | Kohno et al. | 359/689 |
| 5,909,318 | * 6/1999 | Tanaka | 359/689 |
| 6,028,716 | * 2/2000 | Kato et al. | 359/689 |

FOREIGN PATENT DOCUMENTS

| | | |
|---|---|---|
| 55-35323 | 3/1980 | (JP) . |
| 56-158316 | 12/1981 | (JP) . |
| 59-16248 | 4/1984 | (JP) . |
| 61-221719 | 10/1986 | (JP) . |
| 63-135913 | 6/1988 | (JP) . |
| 63-292106 | 11/1988 | (JP) . |
| 1-191820 | 8/1989 | (JP) . |
| 3-240011 | 10/1991 | (JP) . |
| 3-288113 | 12/1991 | (JP) . |
| 6-11650 | 1/1994 | (JP) . |
| 6-94996 | 4/1994 | (JP) . |
| 6-40170 | 5/1994 | (JP) . |
| 6-66008 | 8/1994 | (JP) . |
| 7-3507 | 1/1995 | (JP) . |
| 7-52256 | 6/1995 | (JP) . |
| 7-261083 | 10/1995 | (JP) . |
| 8-152558 | 6/1996 | (JP) . |
| 9-258103 | 10/1997 | (JP) . |

* cited by examiner

Primary Examiner—W. B. Perkey
(74) Attorney, Agent, or Firm—Fitzpatrick, Cella, Harper & Scinto

(57) ABSTRACT

A zoom lens, includes, in order from an object side to an image side, a first lens unit of negative refractive power, the first lens unit having an aspherical lens of negative refractive power, a stop, a second lens unit of positive refractive power, the second lens unit having an aspherical lens of positive refractive power, and a third lens unit of positive refractive power, wherein, during zooming from a wide-angle end to a telephoto end, the second lens unit and the stop move in unison toward the object side, and the first lens unit so moves as to compensate for a shift of an image plane resulting from the zooming.

31 Claims, 33 Drawing Sheets

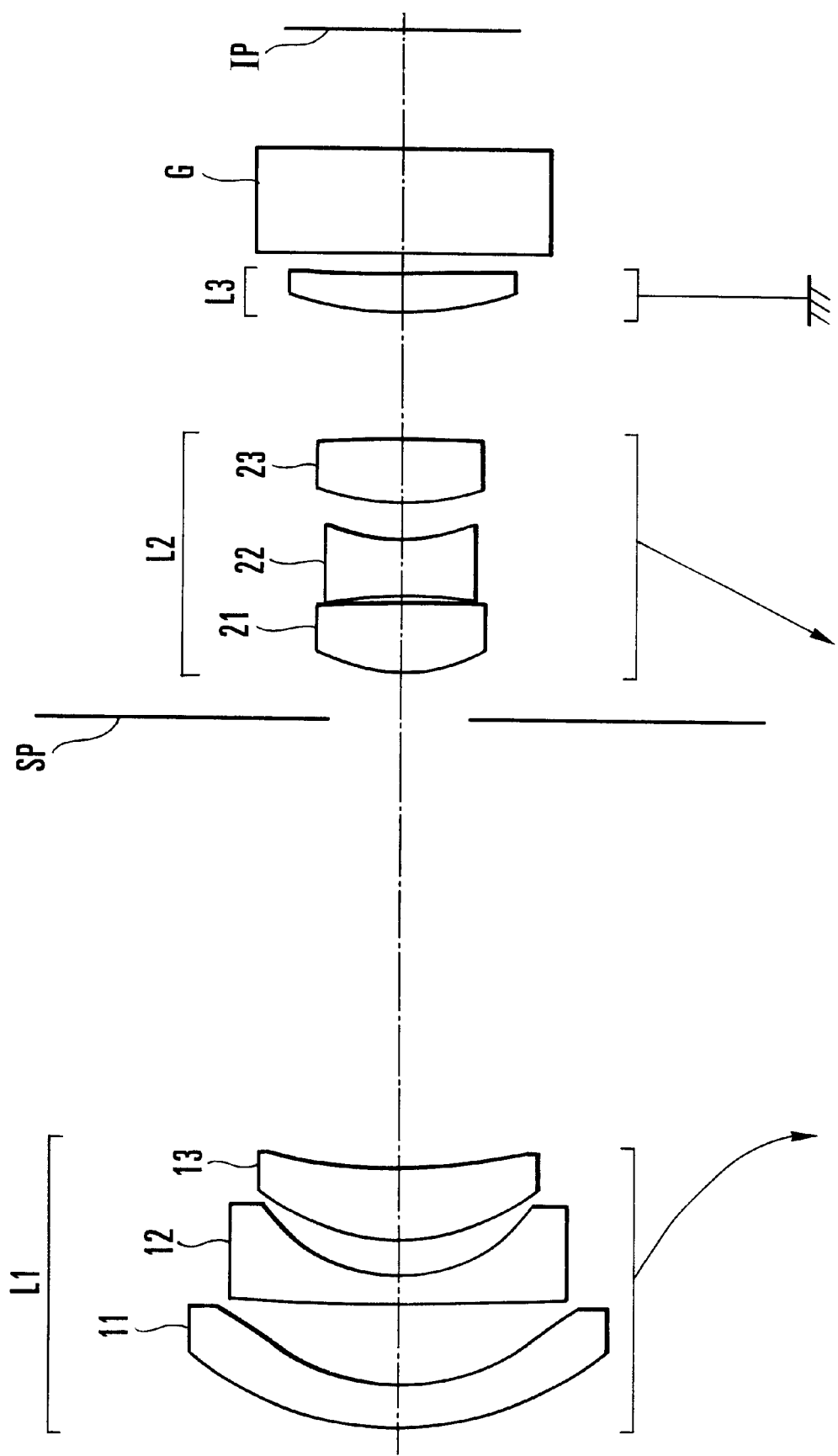

FIG. 2A
FNO/2.82
FIG. 2B
ω=32.2°
FIG. 2C
ω=32.2°
FIG. 2D
ω=32.2°
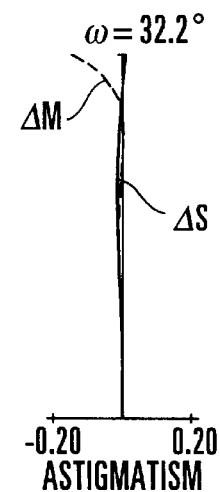
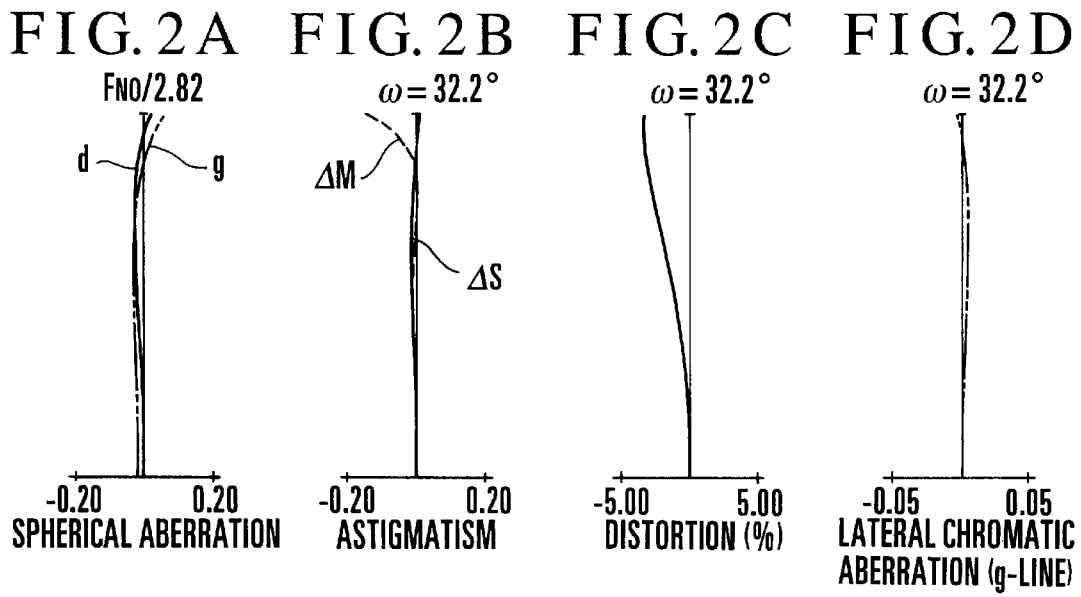
-0.20  0.20
SPHERICAL ABERRATION
-0.20  0.20
ASTIGMATISM
-5.00  5.00
DISTORTION (%)
-0.05  0.05
LATERAL CHROMATIC ABERRATION (g-LINE)
FIG. 3A
FNO/4.05
FIG. 3B
ω=15.5°
FIG. 3C
ω=15.5°
FIG. 3D
ω=15.5°
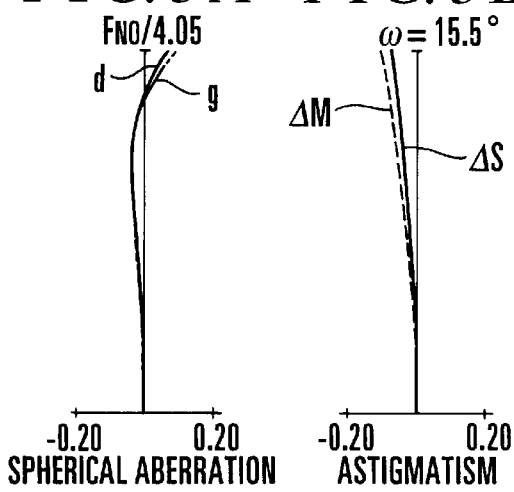
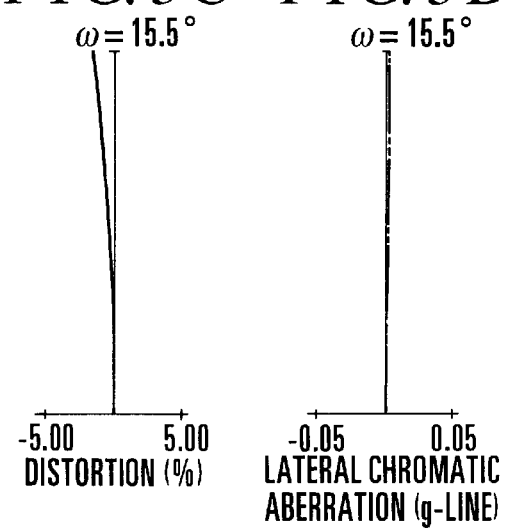
-0.20  0.20
SPHERICAL ABERRATION
-0.20  0.20
ASTIGMATISM
-5.00  5.00
DISTORTION (%)
-0.05  0.05
LATERAL CHROMATIC ABERRATION (g-LINE)
FIG. 4A
FNO/4.75
FIG. 4B
ω=12.1°
FIG. 4C
ω=12.1°
FIG. 4D
ω=12.1°
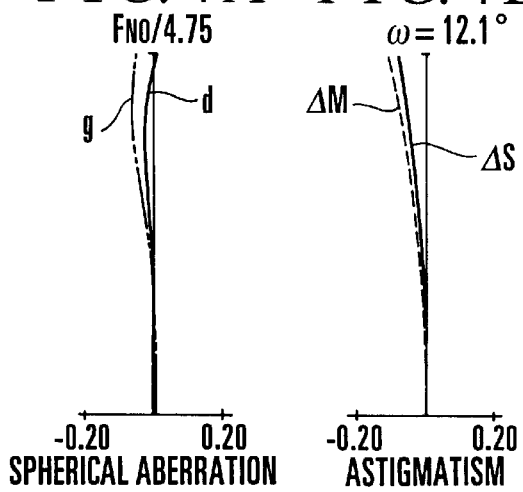
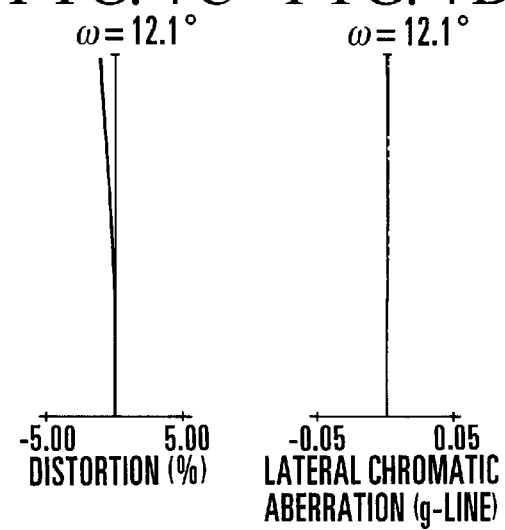
-0.20  0.20
SPHERICAL ABERRATION
-0.20  0.20
ASTIGMATISM
-5.00  5.00
DISTORTION (%)
-0.05  0.05
LATERAL CHROMATIC ABERRATION (g-LINE)

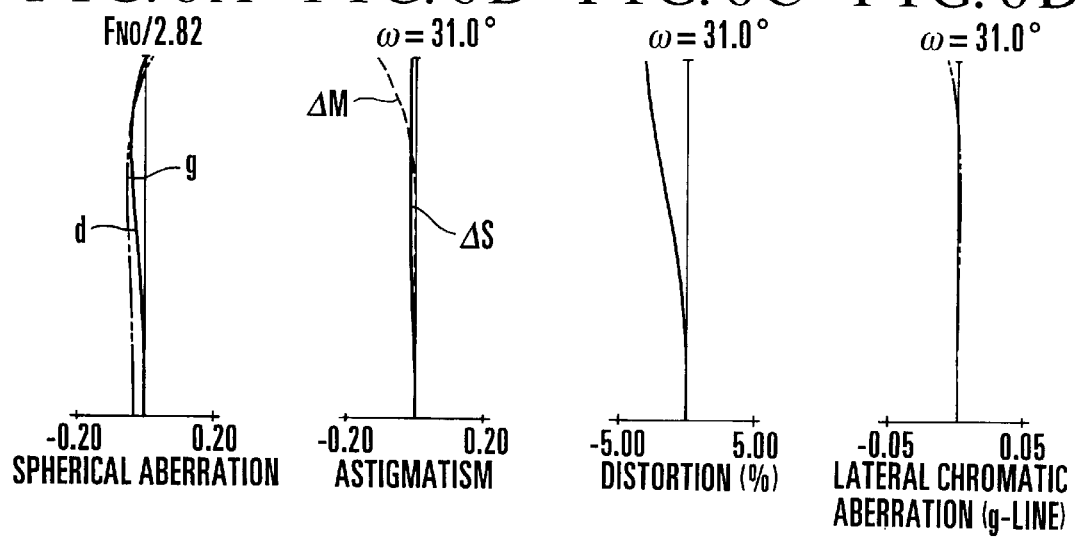
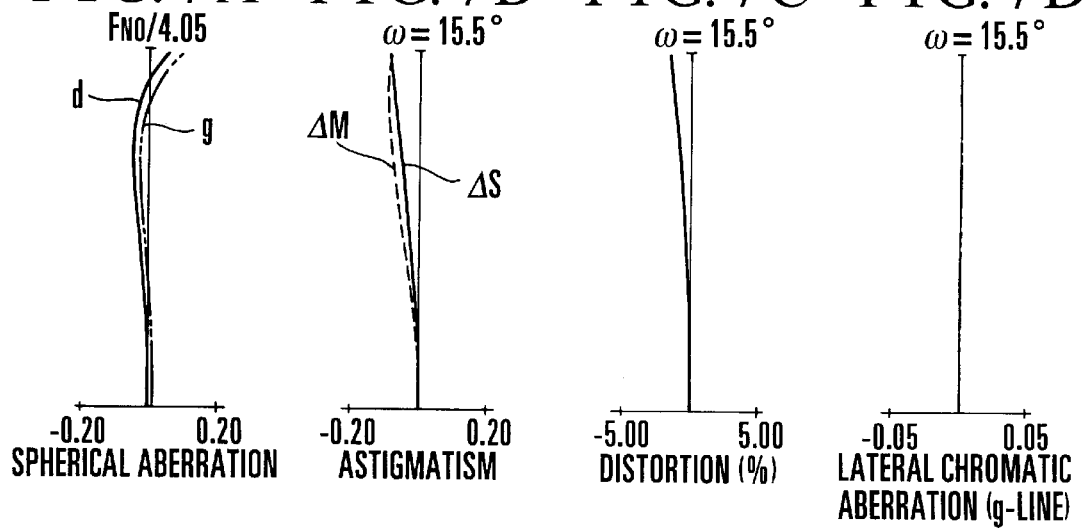
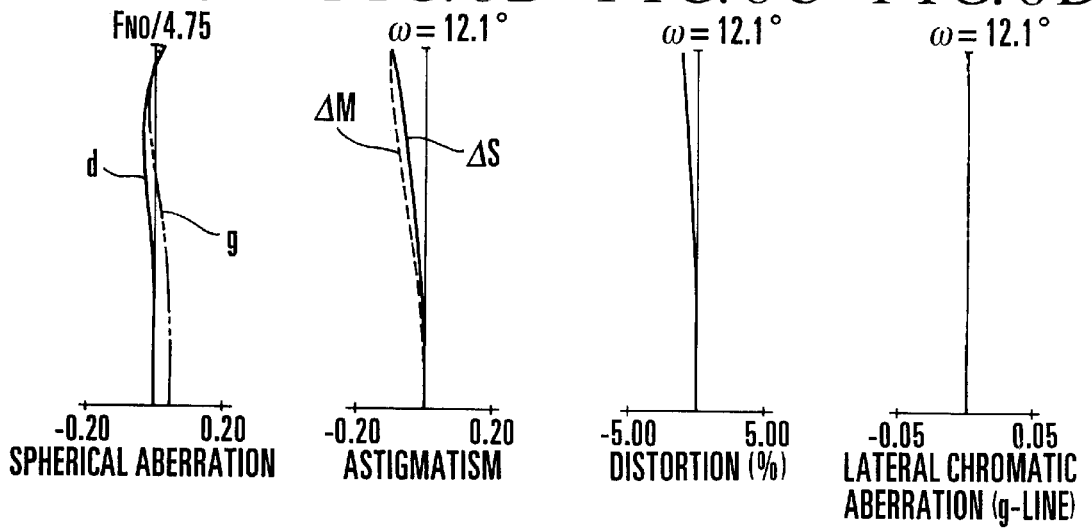

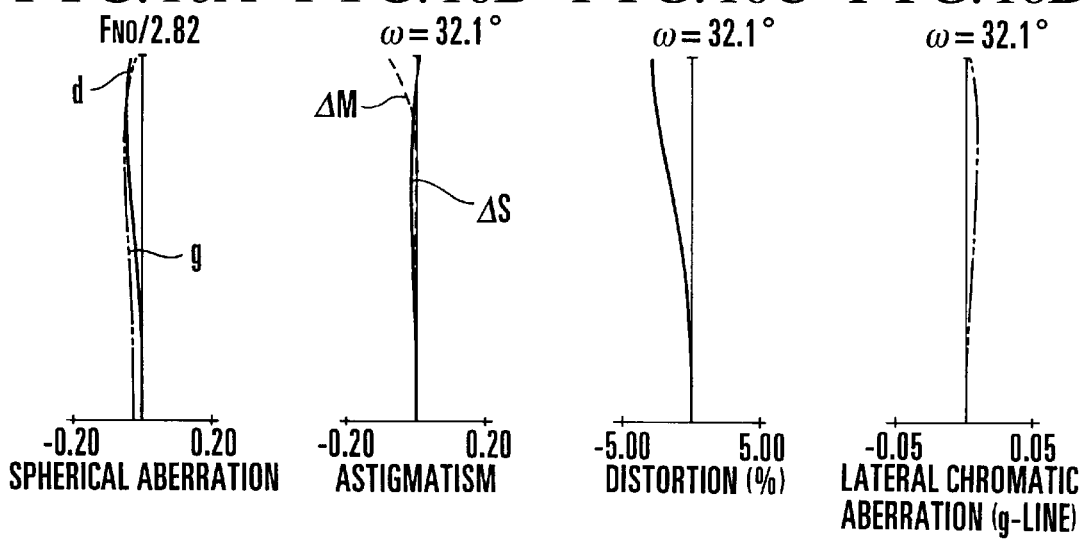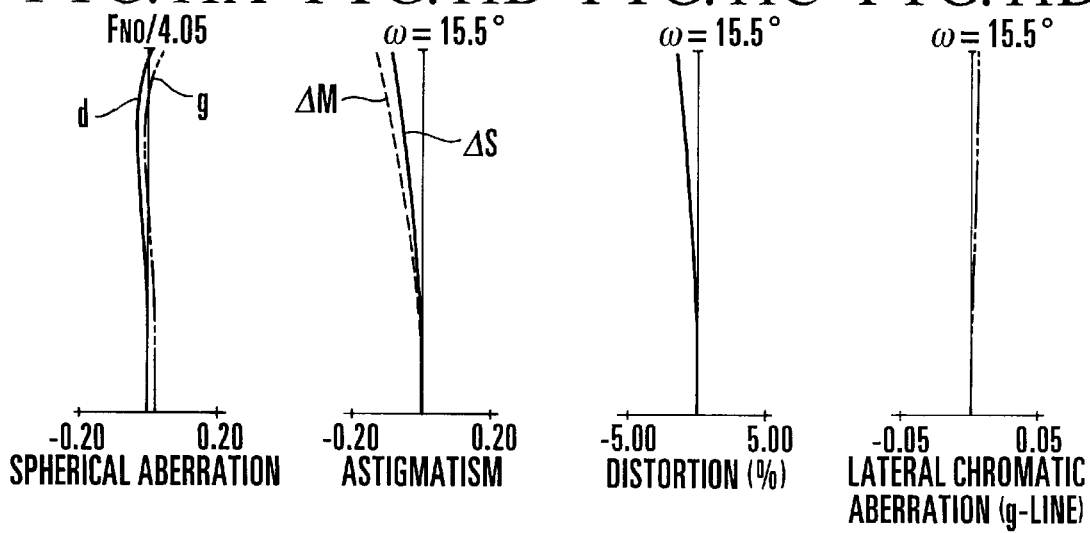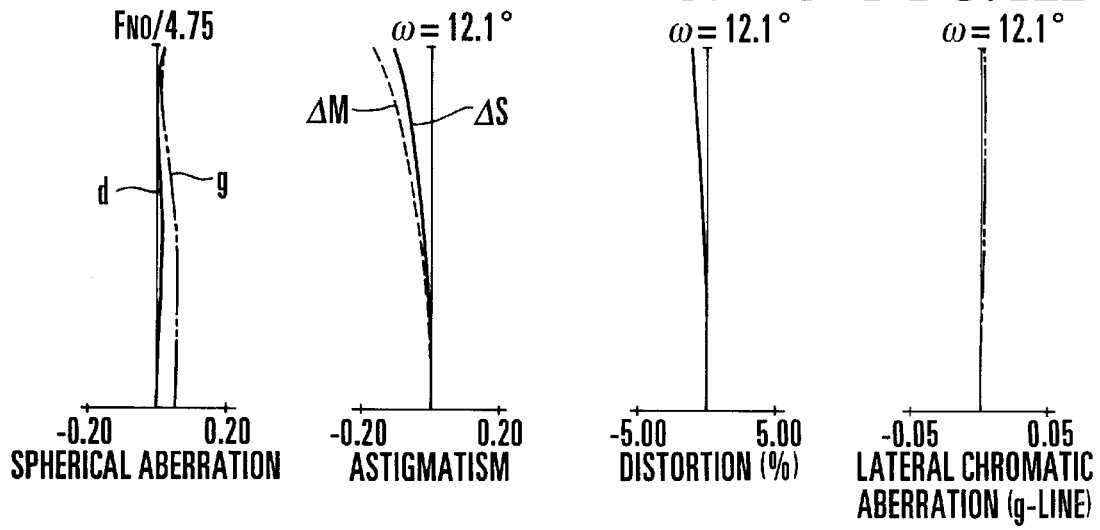

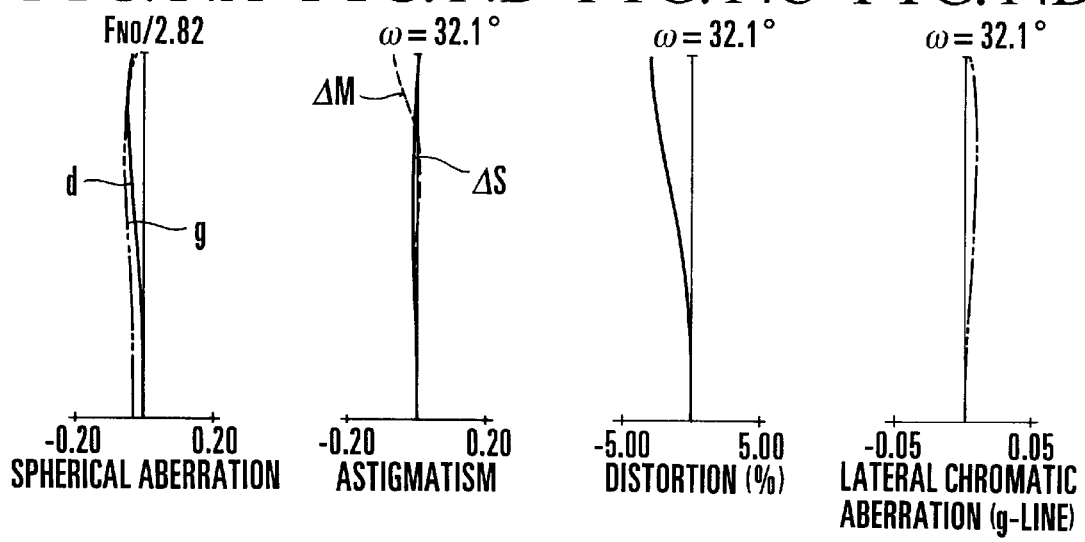
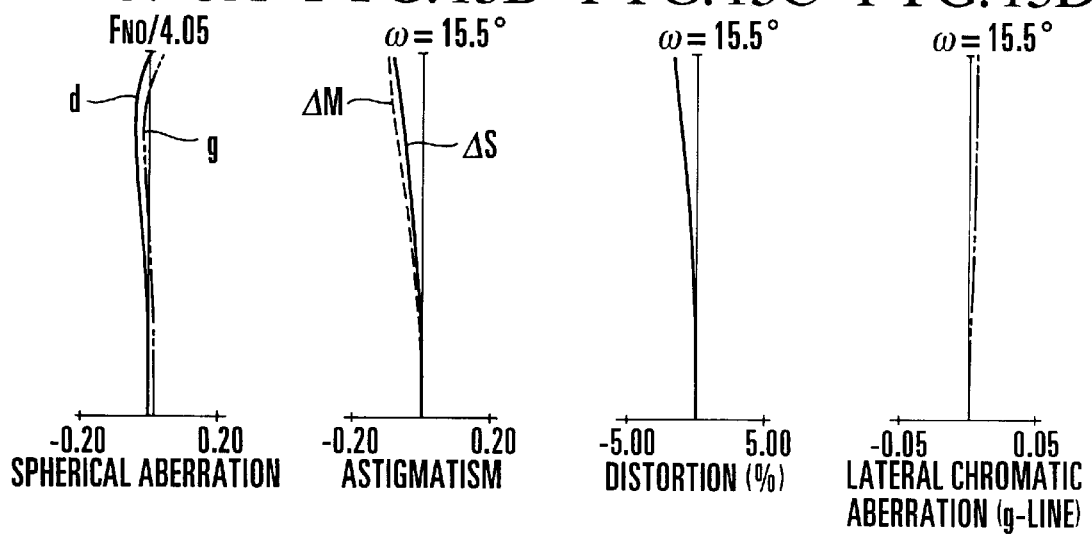
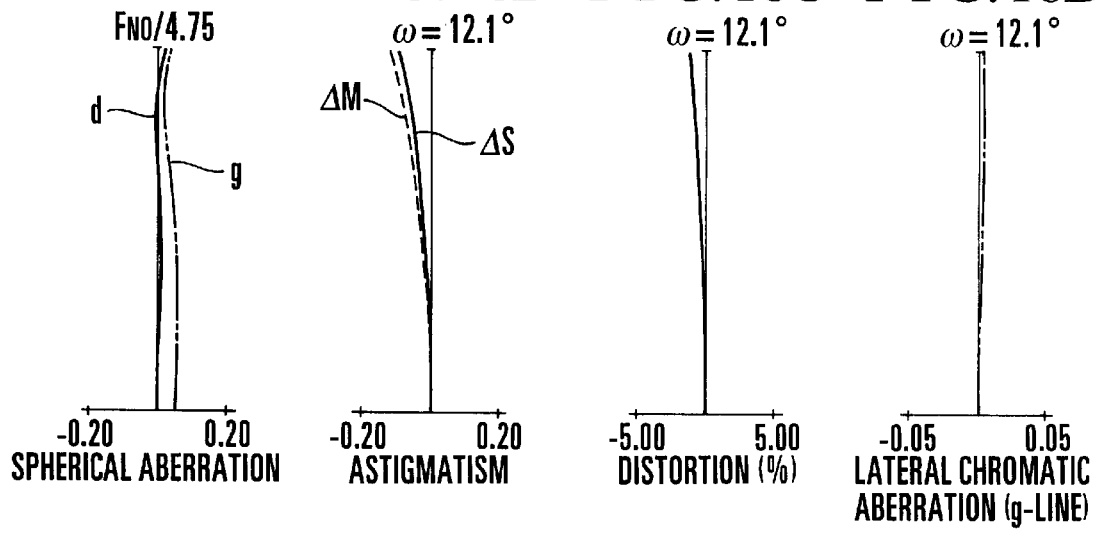

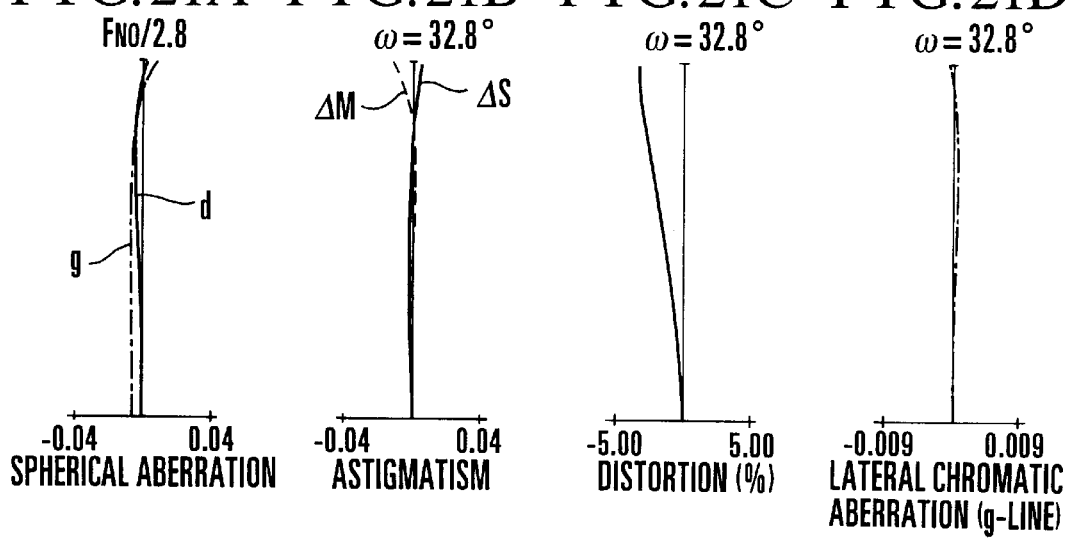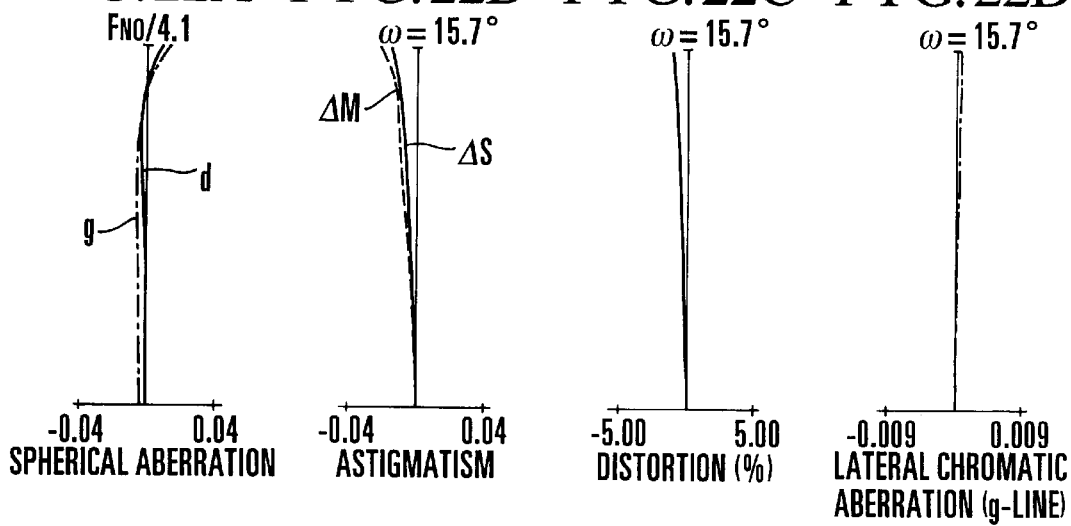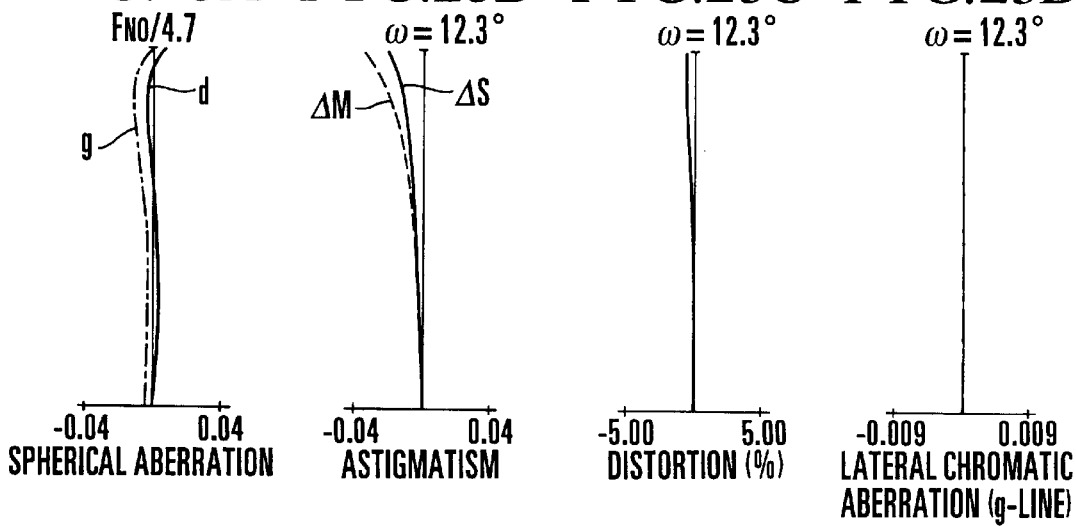

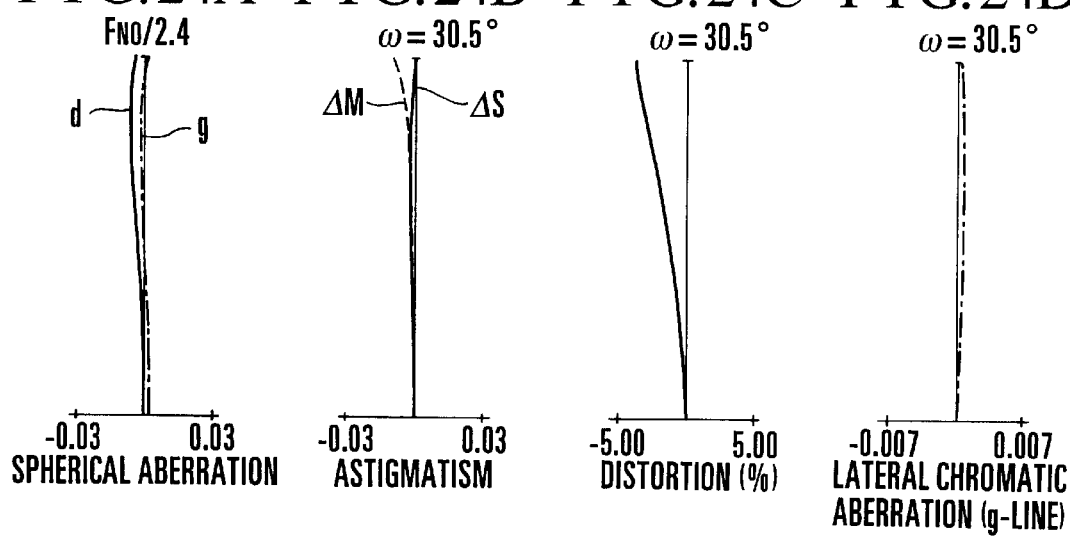
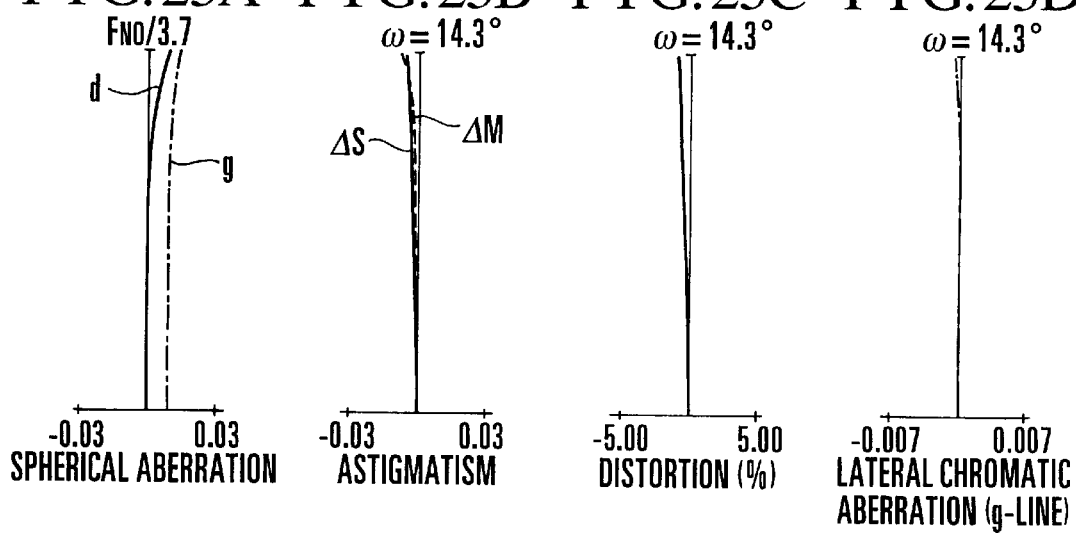
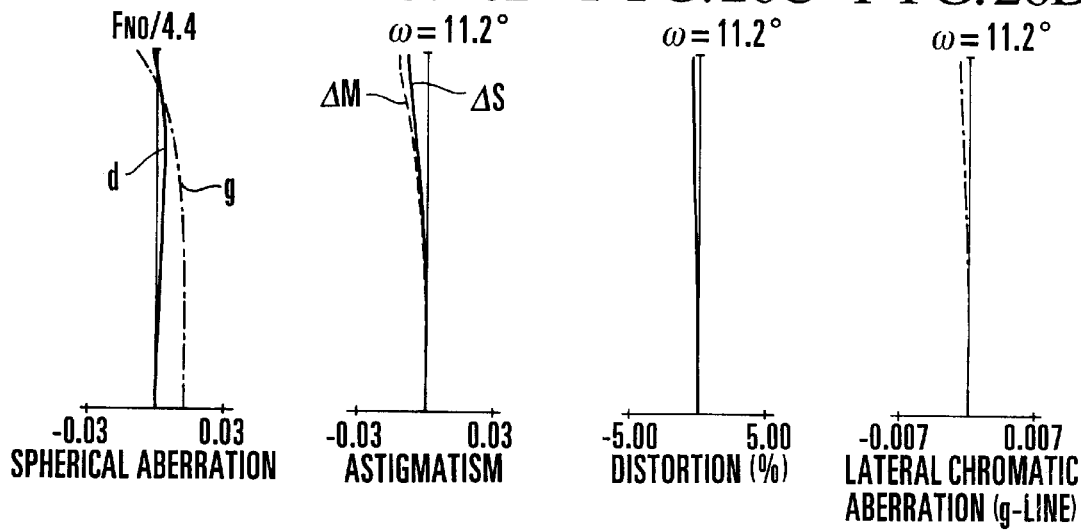

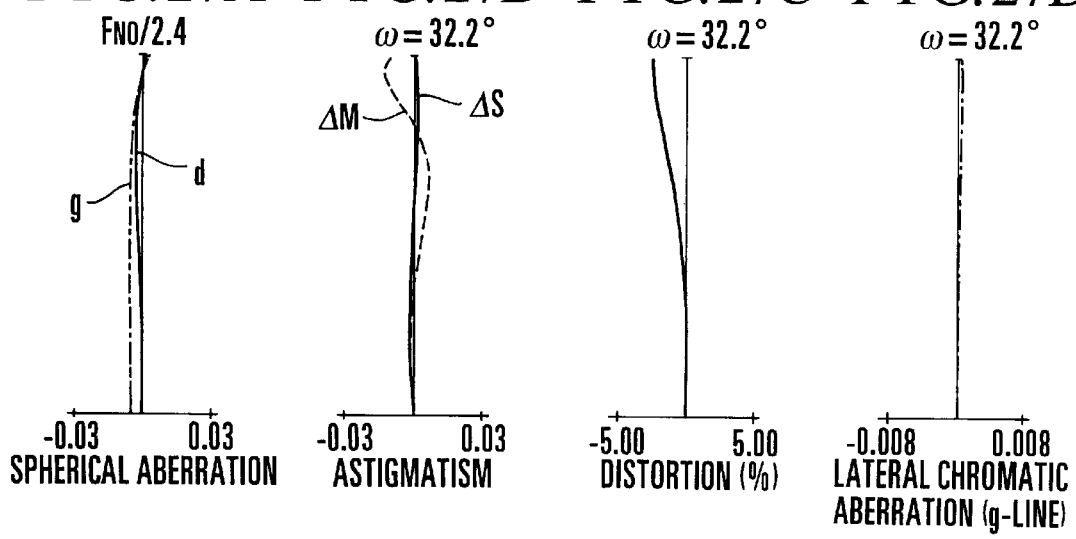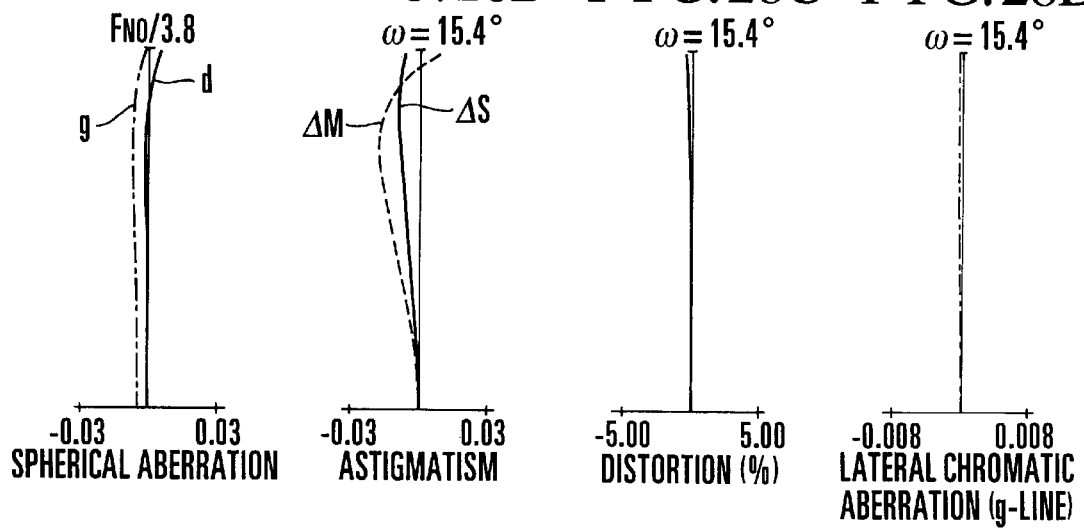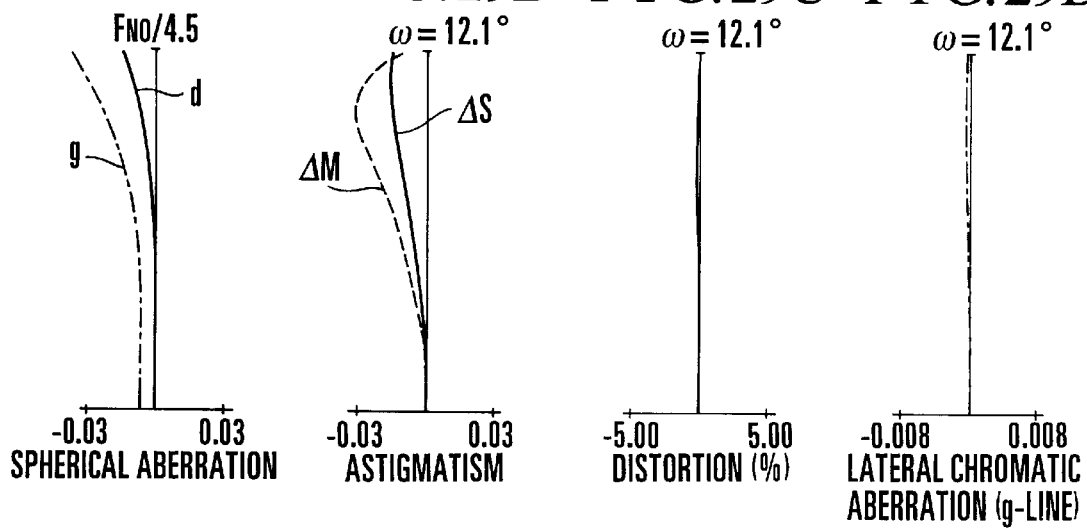

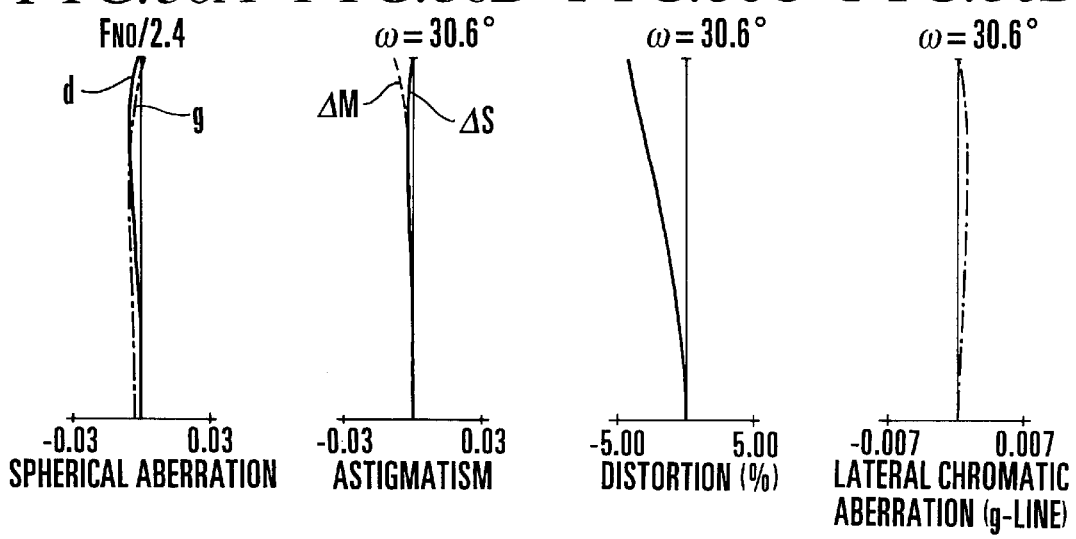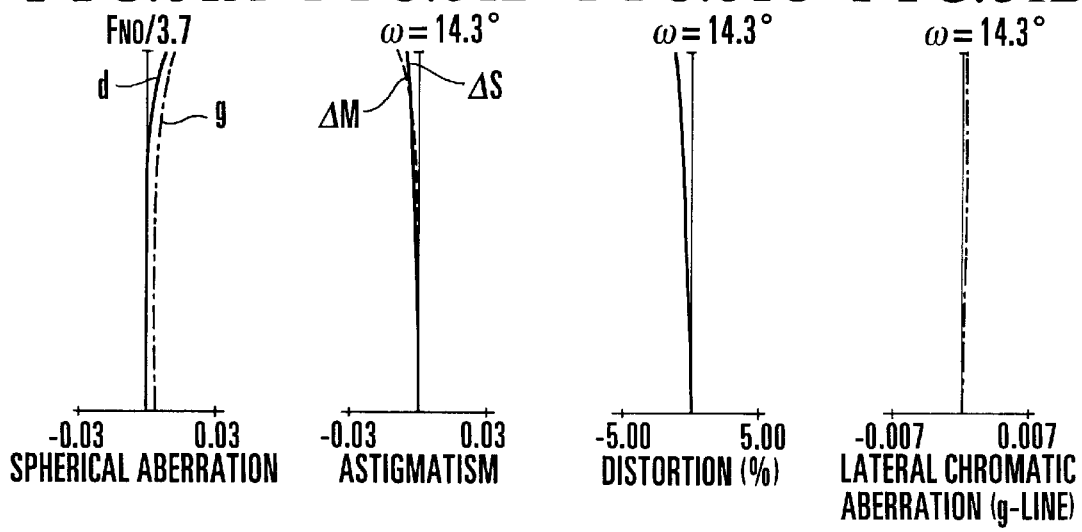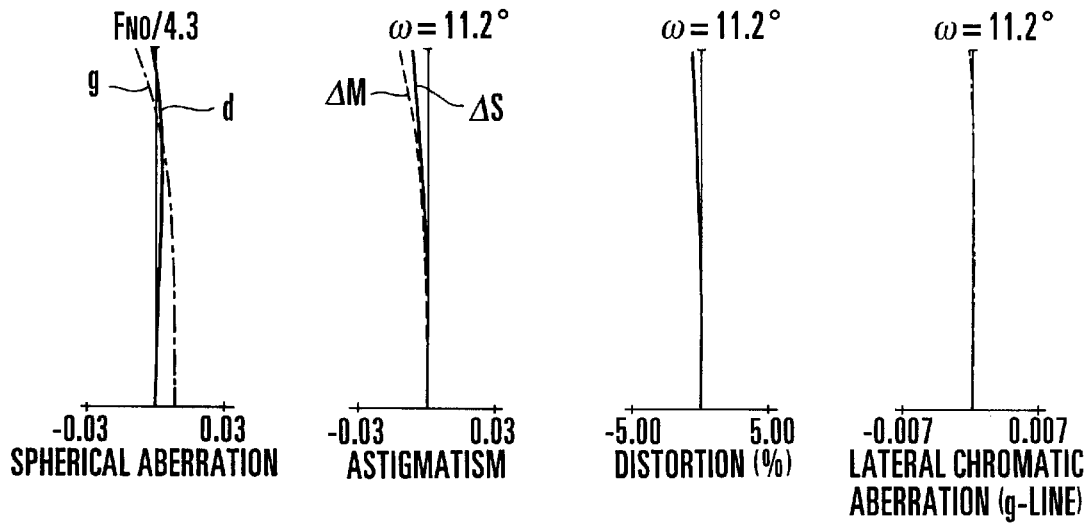

FNO/2.83

-0.025   0.025
SPHERICAL ABERRATION

ω=36.9°

-0.025   0.025
ASTIGMATISM

ω=36.9°

-5.00   5.00
DISTORTION (%)

FNO/3.66

-0.025   0.025
SPHERICAL ABERRATION

ω=21.6°

-0.025   0.025
ASTIGMATISM

ω=21.6°

-5.00   5.00
DISTORTION (%)

FNO/4.20

-0.025   0.025
SPHERICAL ABERRATION

ω=16.8°

-0.025   0.025
ASTIGMATISM

ω=16.8°

-5.00   5.00
DISTORTION (%)

Fno/2.53
SPHERICAL ABERRATION

ω=36.6°
ASTIGMATISM

ω=36.6°
DISTORTION (%)

Fno/3.50
SPHERICAL ABERRATION

ω=20.8°
ASTIGMATISM

ω=20.8°
DISTORTION (%)

Fno/4.04
SPHERICAL ABERRATION

ω=16.6°
ASTIGMATISM

ω=16.6°
DISTORTION (%)

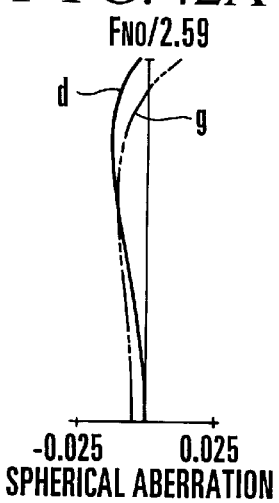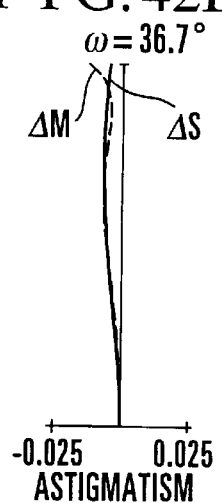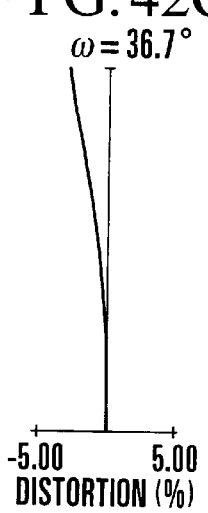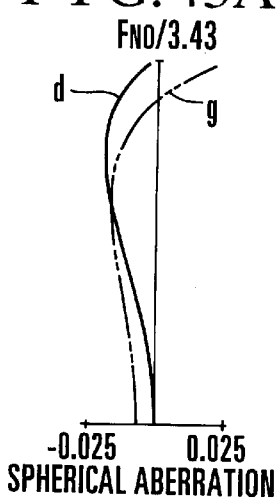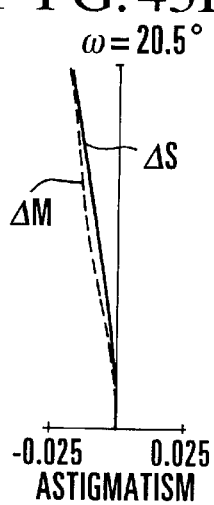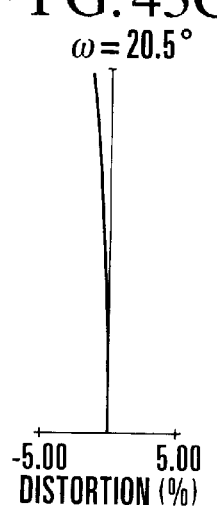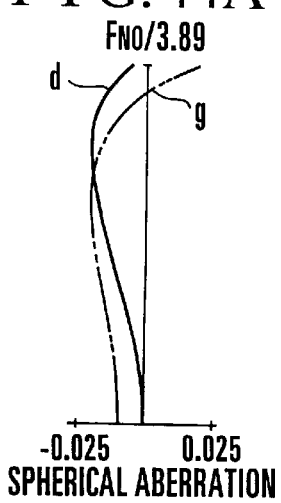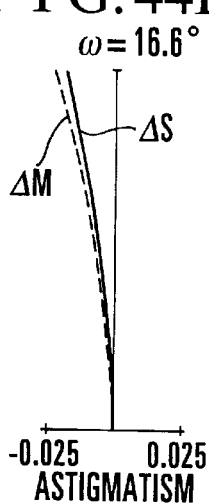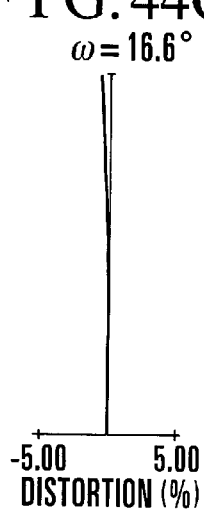

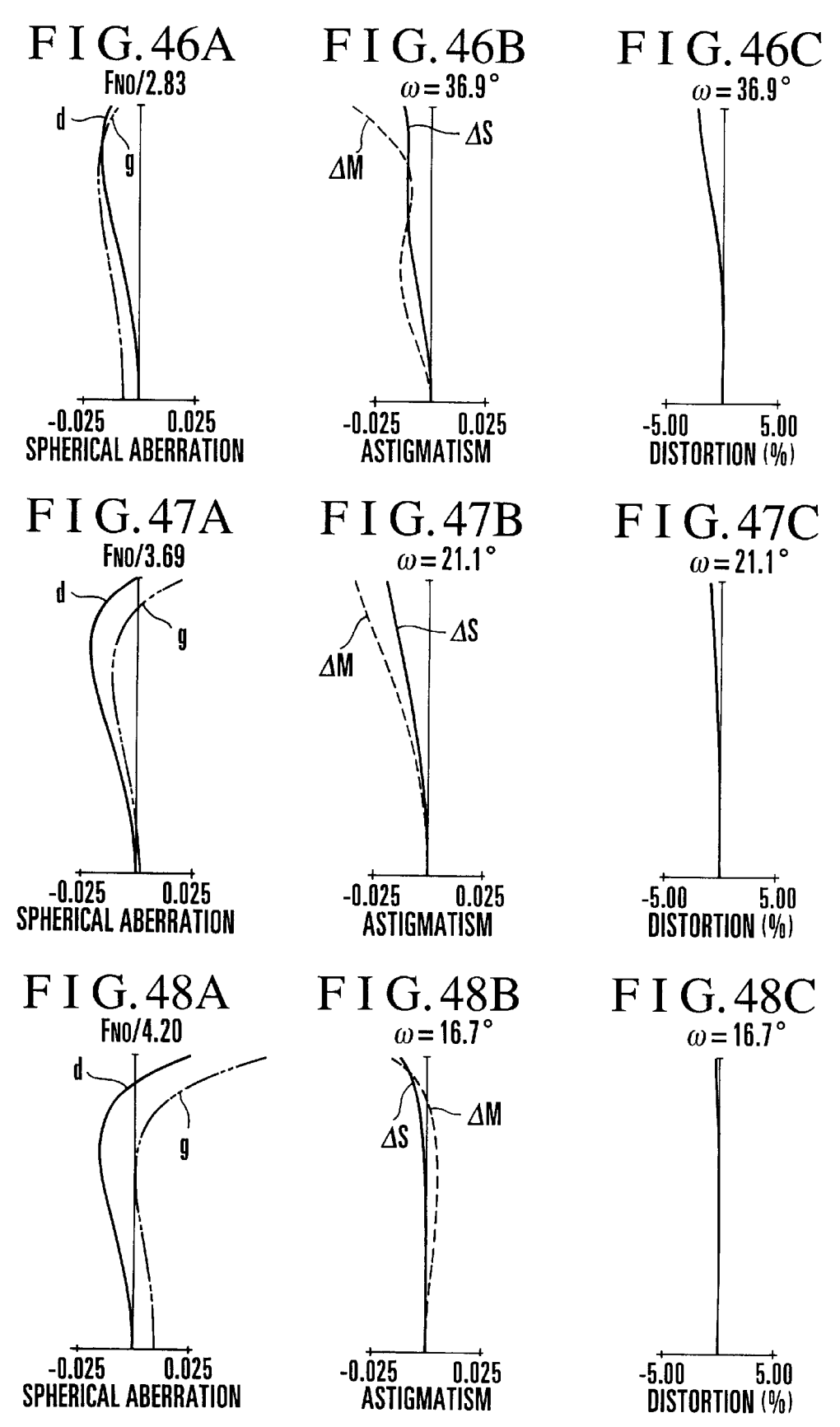

FIG. 46A
FNO/2.83
-0.025  0.025
SPHERICAL ABERRATION

FIG. 46B
ω=36.9°
-0.025  0.025
ASTIGMATISM

FIG. 46C
ω=36.9°
-5.00  5.00
DISTORTION (%)

FIG. 47A
FNO/3.69
-0.025  0.025
SPHERICAL ABERRATION

FIG. 47B
ω=21.1°
-0.025  0.025
ASTIGMATISM

FIG. 47C
ω=21.1°
-5.00  5.00
DISTORTION (%)

FIG. 48A
FNO/4.20
-0.025  0.025
SPHERICAL ABERRATION

FIG. 48B
ω=16.7°
-0.025  0.025
ASTIGMATISM

FIG. 48C
ω=16.7°
-5.00  5.00
DISTORTION (%)

Fno/2.83
d, g
-0.025  0.025
SPHERICAL ABERRATION

ω=36.6°
ΔS, ΔM
-0.025  0.025
ASTIGMATISM

ω=36.6°
-5.00  5.00
DISTORTION (%)

Fno/3.68
d, g
-0.025  0.025
SPHERICAL ABERRATION

ω=21.1°
ΔS, ΔM
-0.025  0.025
ASTIGMATISM

ω=21.1°
-5.00  5.00
DISTORTION (%)

Fno/4.20
d, g
-0.025  0.025
SPHERICAL ABERRATION

ω=16.7°
ΔS, ΔM
-0.025  0.025
ASTIGMATISM

ω=16.7°
-5.00  5.00
DISTORTION (%)

FNO/2.83

-0.025  0.025
SPHERICAL ABERRATION $\omega = 36.9°$

-0.025  0.025
ASTIGMATISM $\omega = 36.9°$

-5.00  5.00
DISTORTION (%)

FNO/3.67

-0.025  0.025
SPHERICAL ABERRATION $\omega = 19.8°$

-0.025  0.025
ASTIGMATISM $\omega = 19.8°$

-5.00  5.00
DISTORTION (%)

FNO/4.00

-0.025  0.025
SPHERICAL ABERRATION $\omega = 16.7°$

-0.025  0.025
ASTIGMATISM $\omega = 16.7°$

-5.00  5.00
DISTORTION (%)

FNO/2.74

-0.025  0.025
SPHERICAL ABERRATION

ω=36.5°

-0.025  0.025
ASTIGMATISM

ω=36.5°

-5.00  5.00
DISTORTION (%)

FNO/3.81

-0.025  0.025
SPHERICAL ABERRATION

ω=20.4°

-0.025  0.025
ASTIGMATISM

ω=20.4°

-5.00  5.00
DISTORTION (%)

FNO/4.37

-0.025  0.025
SPHERICAL ABERRATION

ω=16.5°

-0.025  0.025
ASTIGMATISM

ω=16.5°

-5.00  5.00
DISTORTION (%)

FNO/2.83

-0.025  0.025
SPHERICAL ABERRATION

ω=29.0°

-0.025  0.025
ASTIGMATISM

ω=29.0°

-5.00  5.00
DISTORTION (%)

FNO/3.50

-0.025  0.025
SPHERICAL ABERRATION

ω=18.8°

-0.025  0.025
ASTIGMATISM

ω=18.8°

-5.00  5.00
DISTORTION (%)

FNO/3.89

-0.025  0.025
SPHERICAL ABERRATION

ω=15.5°

-0.025  0.025
ASTIGMATISM

ω=15.5°

-5.00  5.00
DISTORTION (%)

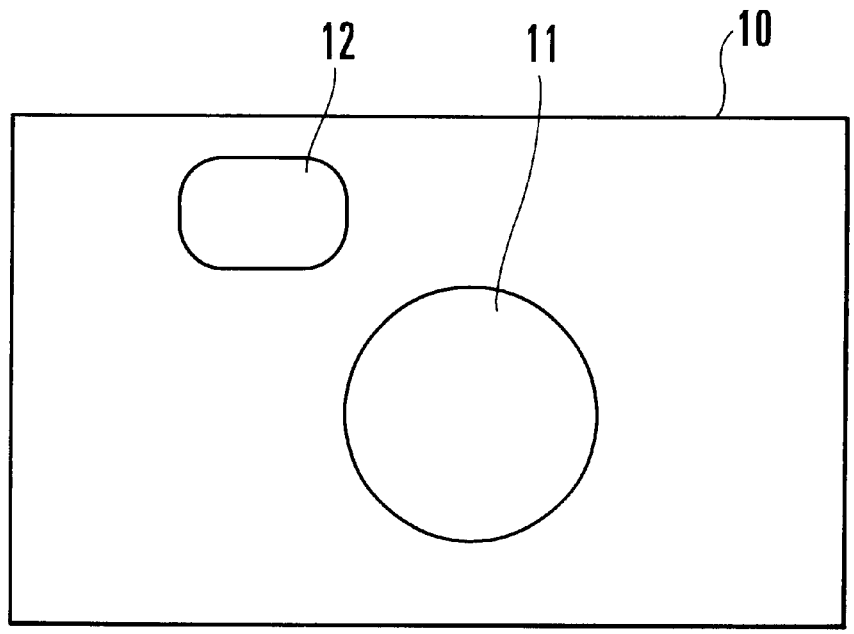
F I G. 65A
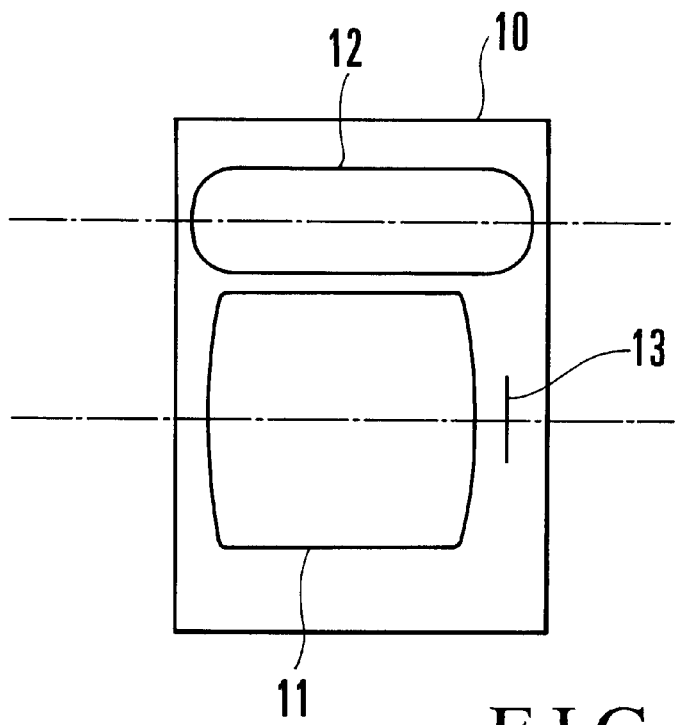
F I G. 65B

ZOOM LENS AND PHOTOGRAPHIC APPARATUS HAVING THE SAME

BACKGROUND OF THE INVENTION

1. Field of the Invention

The present invention relates to compact zoom lenses for use in photographic cameras, video cameras, electronic still cameras, etc.

2. Description of Related Art

Recently, as the home video camera has been reduced in size and weight, minimization of the bulk and size of the zoom lens, too, has made a remarkable advance, and great efforts are being devoted, in particular, to greatly reduce the total length of the zoom lens, to further reduce the diameter of the front lens members, and to seek a simpler configuration.

To attain these aims, optical system means has been developed to limit the range or zoom ratio to 2 to 3, and to provide a simple arrangement for the zoom lens of 2-unit or 3-unit configuration.

For example, Japanese Laid-Open Patent Applications No. Sho 55-35323 and No. Sho 56-158316 disclose a 3-unit zoom lens comprising, in order from an object side to an image side, a first lens unit of negative refractive power, a second lens unit of positive refractive power and a third lens unit of positive refractive power, the second lens unit axially moving to vary the focal length, while simultaneously moving the first lens unit to compensate for the shift of the image plane.

Such a type of zoom lens in which the front lens unit is negative in refractive power, or the so-called "negative lead" type, is favorable for widening the field angle at the wide-angle end with relative ease. Therefore, it has found its use in many zoom lenses that cover a field of view of 60° or more.

For example, Japanese Patent Publications No. Sho 59-16248 and No. Hei 6-66008 propose zoom lenses having two lens units of negative and positive refractive powers with the separation therebetween varying to vary the focal length, or the so-called "short" zoom lenses.

Also, Japanese Patent Publication No. Hei 7-52256 proposes a zoom lens comprising, in order from an object side to an image side, a first lens unit of negative refractive power, a second lens unit of positive refractive power and a third lens unit of positive refractive power, with the separation between the second and third lens units increasing as zooming occurs from the wide-angle end to the telephoto end.

Also, U.S. Pat. No. 5,434,710 discloses a zoom lens comprising, in order from an object side, a first lens unit of negative refractive power, a second lens unit of positive refractive power and a third lens unit of positive refractive power, with the separation between the second and third lens units decreasing as zooming occurs from the wide-angle end to the telephoto end.

Further, for the zoom lens of a video camera, the improvement of the compact form must be combined with a requirement of achieving a high resolution over the entire zooming range.

In general, in order to increase the resolution, the aberrations every lens unit produces may be minimized. To this purpose, a simple practice is to increase the number of constituent lenses in each lens unit to decrease the contributions of each lens unit to the aberrations. This method, however, increases the lens-system size, contradicting the goal of minimizing the size of the lens system.

In contrast, one of the prior known methods using an aspheric surface corrects spherical and zonal aberrations while minimizing the total number of lens elements. With the use of an aspheric surface, it becomes possible to expect an ever increasing reduction in the number of lens elements and the production of an aberration-correcting effect that cannot be obtained from the spherical surfaces.

Meanwhile, in order to achieve a lens system of high resolving power, it is important to correct chromatic aberrations as well as spherical and zonal aberrations. The above-described method that relies on the asphericity can, however, hardly correct chromatic aberrations.

Particularly for the 3-unit zoom lenses described above, the selection of the second lens unit as the main variator tends to increase the variation of chromatic aberrations with zooming. For this reason, in the prior art, the second lens unit has been achromatized by using a negative lens made from a material of high dispersion and a positive lens made from a material of low dispersion, each one or more in number.

Because of this arrangement, there are fewer degrees of freedom available to the second lens unit to correct aberrations other than chromatic aberrations. Therefore, the difficulty of correcting off-axial aberrations tends to increase at the wide-angle end of the zooming range.

A zoom lens with few members has previously been proposed in, for example, U.S. Pat. No. 4,999,007. In particular, the first and second embodiments disclosed in U.S. Pat. No. 4,999,007 show practical examples with a zoom ratio of no less than 3. However, the first lens unit is constructed with as small a number of members as 1 or 2. So, the aberrations the first lens unit produces, including chromatic aberrations, are not sufficiently corrected. Another problem arises from the fact that the aspherical first lens in the first embodiment is formed to a shape unfavorable for making it by molding. Concretely speaking, the axial and edge thicknesses differ so greatly from each other that the lens, although easy to make, is very hard to handle in detaching it from the mold. Also, in the second embodiment, although the drawbacks described above are slight, the field angle is narrow, as the wide-angle end is not designed to extend toward short enough focal lengths.

In Japanese Laid-Open Patent Application No. Hei 1-191820, too, a zoom lens with few members is proposed, in which embodiments of a zoom ratio of about 3 are disclosed. However, the first lens unit is constructed with one or two members and is not sufficiently corrected for aberrations, including chromatic ones. In addition, the zoom lens is designed not to make the maximum field angle wide enough.

Meanwhile, in Japanese Laid-Open Patent Application No. Hei 6-11650, a negative lens unit at the frontmost position is followed, on the image side thereof, by a positive lens unit. In such a zoom lens, the first lens unit is constructed with either positive and negative lenses, totaling two lenses, or negative and positive lenses, totaling two lenses, or a negative meniscus lens, a bi-concave lens and a positive meniscus lens, totaling three lenses, or a negative meniscus lens, a bi-convex lens and a bi-concave lens, totaling three lenses. The aberrations the first lens unit produces are not sufficiently corrected.

Japanese Laid-Open Patent Application No. Hei 3-240011 discloses a 3-unit zoom lens of a negative-positive-positive refractive power arrangement in this order from the object side to the image side. The first lens unit is constructed with a negative meniscus lens, a bi-concave lens and a positive meniscus lens, totaling three lenses. So, the aberrations the first lens unit produces are not sufficiently corrected.

Another Japanese Laid-Open Patent Application No. Hei 6-94996, too, discloses a 3-unit zoom lens of a negative-positive-positive refractive power arrangement in this order from the object side to the image side. The first and second lens units are both constructed in such a way as not to use any aspheric surfaces. So, the first lens unit produces distortion and, during zooming to the wide-angle region, lateral aberration. The second lens unit produces spherical aberration and astigmatism. These aberrations are not sufficiently corrected.

Yet another Japanese Laid-Open Patent Application No. Hei 8-152558 discloses a zoom lens including negative and positive lens units in this order from the object side to the image side. The second lens unit is constructed in such a way as not to use any aspheric surfaces. So the spherical aberration and astigmatism the second lens unit produces are not sufficiently corrected.

As described before, the negative lead type of zoom lens is favorable for reducing the size of the lens system and widening the field angle. To simultaneously fulfill the requirements of widening the field angle while still assuring improvements of the compact form of the entire lens system, and of obtaining a good image quality over the entire area of the image frame, however, there is a need to appropriately determine the refractive power arrangement of all the lens units and the forms of the constituent lenses. Otherwise, the range of variation of aberrations with zooming would increase greatly, and it would become difficult to obtain images of good quality over the entire area of the image frame.

Meanwhile, as the video camera, digital still camera or like photographing apparatus using a solid-state image pickup element gets ever higher capabilities, there is a growing demand that the optical system to be used is a zoom lens of large aperture ratio with the inclusion of wide field angles. In a camera of this kind, optical elements other than the lens, such as a low-pass filter and color correction filter, are installed in the space between the last lens member and the image pickup element. For this reason, the optical system to be used is required to have a relatively long back focal distance. Further, in the case of the color camera using a set of image pickup elements for color images, color shading must be avoided. For this purpose, the optical system to be used is desired to have its image side exhibit good telocentric characteristics.

A zoom lens configuration in which two lens units, namely a first lens unit of negative refractive power and a second lens unit of positive refractive power, move in differential relation, or the so-called "short zoom" type, has found its use in many wide-angle 2-unit zoom lenses. In these optical systems of the short zoom type, the positive second lens unit is moved to vary the focal length and the negative first lens unit is moved to compensate for the image shift with the variation of the focal length.

These two lens units provide an arrangement that assures a zooming range of about 2. To increase the zoom ratio to more than 2 and still make up the lens totality in a compact form, Japanese Patent Publications No. Hei 7-3507 and No. Hei 6-40170, for example, have proposed that a third lens unit of negative or positive refractive power is added to the 2-unit zoom lens at the image side and used for correcting all the aberrations resulting from the increase of the zoom ratio, that is, the so-called 3-unit zoom lenses.

However, since these 3-unit zoom lenses are designed to be used mainly for 35 mm film photography, it is hard to say that the back focal distance matches the required one for an optical system using a solid-state image pickup element and coincides with good telecentric characteristics as to suffice for that optical system.

3-unit zoom lenses which exhibit the back-focal-distance and the telecentric characteristics and are widened in the field angle are proposed in, for example, Japanese Laid-Open Patent Applications No. Sho 63-135913 and No. Hei 7-261083. Also, in Japanese Laid-Open Patent Application No. Hei 3-288113, there is disclosed an optical system as derived from such 3-unit zoom lenses by making the first lens unit of negative refractive power remain stationary. The second and third lens units of positive refractive power move to effect zooming. In these conventional examples, however, each of the lens units has a relatively large number of constituent lenses, thereby undesirably elongating the total length of the entire lens system and increasing the production cost.

The above Japanese Laid-Open Patent Application No. Hei 7-261083 shows an example of a first lens unit of negative refractive power having a convex lens (positive lens) at the frontmost position. Particularly when widening the field angle, it is, therefore, unavoidable to suffer the drawback of increasing the diameter of the complete lens. Further, in this example, the first lens unit of negative refractive power is made movable for focusing. To control the focusing movement together with the zooming movement, there is another drawback that the operating mechanism becomes complicated in structure.

Also, in the above U.S. Pat. No. 4,999,007, there is disclosed a 3-unit zoom lens with the first and second lens units each in the form of a single lens. However, the total length for the wide-angle end of the entire lens system is relatively long. Moreover, because the first lens unit is spaced from a stop by a very long distance in the wide-angle end, the off-axial rays are incident on the first lens unit at a large height. As constituent lenses of the first lens unit increase in diameter to admit those rays, there is a drawback that the whole lens system becomes bulky.

Further, in a case where the field angle for the wide-angle end is widened, a peculiar problem arises in that distortion is under-corrected. To allow employment of an image pickup element of high pixel density whose sensitivity is relatively low, the relative aperture must be much increased.

BRIEF SUMMARY OF THE INVENTION

The present invention has been made with the above-described conventional techniques in mind. The lens system is simplified in construction and reduced in the bulk and size, while still maintaining an optical performance to be obtained. It is, therefore, an object of the invention to provide a zoom lens of novel configuration and a photographing apparatus using the same.

To attain the above object, in accordance with a first aspect of the invention, there is provided a zoom lens, which comprises, in order from an object side to an image side, a first lens unit of negative optical power, the first lens unit having an aspherical lens of negative optical power, a stop, a second lens unit of positive optical power, the second lens unit having an aspherical lens of positive optical power, and a third lens unit of positive optical power, wherein, during a change in magnification from a wide-angle end to a telephoto end, the second lens unit and the stop move in unison toward the object side, and the first lens unit so moves as to compensate for the shift of an image plane resulting from the variation of magnification.

In accordance with a second aspect of the invention, there is provided a zoom lens, which comprises, in order from an object side to an image side, a first lens unit of negative optical power, the first lens unit having, in order from the object side to the image side, a negative lens of meniscus form convex toward the object side, a negative lens of meniscus form convex toward the object side and a positive lens of meniscus form convex toward the object side, a second lens unit of positive optical power, and a third lens unit of positive optical power, wherein, during a change in magnification from a wide-angle end to a telephoto end, the second lens unit moves toward the object side and the first lens unit so moves as to compensate for the shift of an image plane resulting from the variation of magnification, and wherein each of the first lens unit and the second lens unit has at least one aspherical lens, the zoom lens satisfying the following conditions:

$-3 \leq f1/fw \leq -2$ $2 \leq f2/fw \leq 3$ where f1 is a focal length of the first lens unit, f2 is a focal length of the second lens unit, and fw is a focal length of the zoom lens in the wide-angle end.

In accordance with a third aspect of the invention, there is provided a zoom lens, which comprises, in order from an object side to an image side, a first lens unit of negative optical power, the first lens unit having, in order from the object side to the image side, a negative lens, a negative lens and a positive lens, a second lens unit of positive optical power, the second lens unit having, in order from the object side to the image side, a positive lens, a negative lens and a positive lens, and a third lens unit of positive optical power, wherein a change in magnification is effected by varying the separation between the first lens unit and the second lens unit.

In accordance with a fourth aspect of the invention, there is provided a zoom lens, which comprises, in order from an object side to an image side, a first lens unit of negative optical power, the first lens unit having, in order from the object side to the image side, a negative lens having a concave surface facing the image side and a positive lens, a second lens unit of positive optical power, the second lens unit having, in order from the object side to the image side, a positive lens, a negative lens and a positive lens, and a third lens unit of positive optical power, wherein a change in magnification is effected by varying the separation between the first lens unit and the second lens unit.

Further, according to the invention, there is provided a photographing apparatus which comprises a zoom lens according to one of the above first to fourth aspects of the invention.

The above and further aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 1 is a longitudinal section view of a numerical example 1 of the zoom lens.

FIGS. 2A to 2D are graphic representations of the aberrations of the zoom lens of numerical example 1 in the wide-angle end.

FIGS. 3A to 3D are graphic representations of the aberrations of the zoom lens of numerical example 1 in a middle focal-length position.

FIGS. 4A to 4D are graphic representations of the aberrations of the zoom lens of numerical example 1 in the telephoto end.

FIGS. 6A to 6D are graphic representations of the aberrations of the zoom lens of numerical example 2 in the wide-angle end.

FIGS. 7A to 7D are graphic representations of the aberrations of the zoom lens of numerical example 2 in a middle focal-length position.

FIGS. 8A to 8D are graphic representations of the aberrations of the zoom lens of numerical example 2 in the telephoto end.

FIGS. 10A to 10D are graphic representations of the aberrations of the zoom lens of numerical example 3 in the wide-angle end.

FIGS. 11A to 11D are graphic representations of the aberrations of the zoom lens of numerical example 3 in a middle focal-length position.

FIGS. 12A to 12D are graphic representations of the aberrations of the zoom lens of numerical example 3 in the telephoto end.

FIGS. 14A to 14D are graphic representations of the aberrations of the zoom lens of numerical example 4 in the wide-angle end.

FIGS. 15A to 15D are graphic representations of the aberrations of the zoom lens of numerical example 4 in a middle focal-length position.

FIGS. 16A to 16D are graphic representations of the aberrations of the zoom lens of numerical example 4 in the telephoto end.

FIGS. 21A to 21D are graphic representations of the aberrations of the zoom lens of numerical example 5 in the wide-angle end.

FIGS. 22A to 22D are graphic representations of the aberrations of the zoom lens of numerical example 5 in a middle focal-length position.

FIGS. 23A to 23D are graphic representations of the aberrations of the zoom lens of numerical example 5 in the telephoto end.

FIGS. 24A to 24D are graphic representations of the aberrations of the zoom lens of numerical example 6 in the wide-angle end.

FIGS. 25A to 25D are graphic representations of the aberrations of the zoom lens of numerical example 6 in a middle focal-length position.

FIGS. 26A to 26D are graphic representations of the aberrations of the zoom lens of numerical example 6 in the telephoto end.

FIGS. 27A to 27D are graphic representations of the aberrations of the zoom lens of numerical example 7 in the wide-angle end.

FIGS. 28A to 28D are graphic representations of the aberrations of the zoom lens of numerical example 7 in a middle focal-length position.

FIGS. 29A to 29D are graphic representations of the aberrations of the zoom lens of numerical example 7 in the telephoto end.

FIGS. 30A to 30D are graphic representations of the aberrations of the zoom lens of numerical example 8 in the wide-angle end.

FIGS. 31A to 31D are graphic representations of the aberrations of the zoom lens of numerical example 8 in a middle focal-length position.

FIGS. 32A to 32D are graphic representations of the aberrations of the zoom lens of numerical example 8 in the telephoto end.

FIGS. 42A to 42C are graphic representations of the aberrations of the zoom lens of numerical example 11 in the wide-angle end.

FIGS. 43A to 43C are graphic representations of the aberrations of the zoom lens of numerical example 11 in a middle focal-length position.

FIGS. 44A to 44C are graphic representations of the aberrations of the zoom lens of numerical example 11 in the telephoto end.

FIGS. 46A to 46C are graphic representations of the aberrations of the zoom lens of numerical example 12 in the wide-angle end.

FIGS. 47A to 47C are graphic representations of the aberrations of the zoom lens of numerical example 12 in a middle focal-length position.

FIGS. 48A to 48C are graphic representations of the aberrations of the zoom lens of numerical example 12 in the telephoto end.

FIGS. 65A and 65B are schematic diagrams of a photographing apparatus equipped with a zoom lens of any one of the numerical examples 1 to 16.

DETAILED DESCRIPTION OF THE INVENTION

Hereinafter, preferred embodiments of the invention will be described in detail with reference to the drawings.

Figure 5:
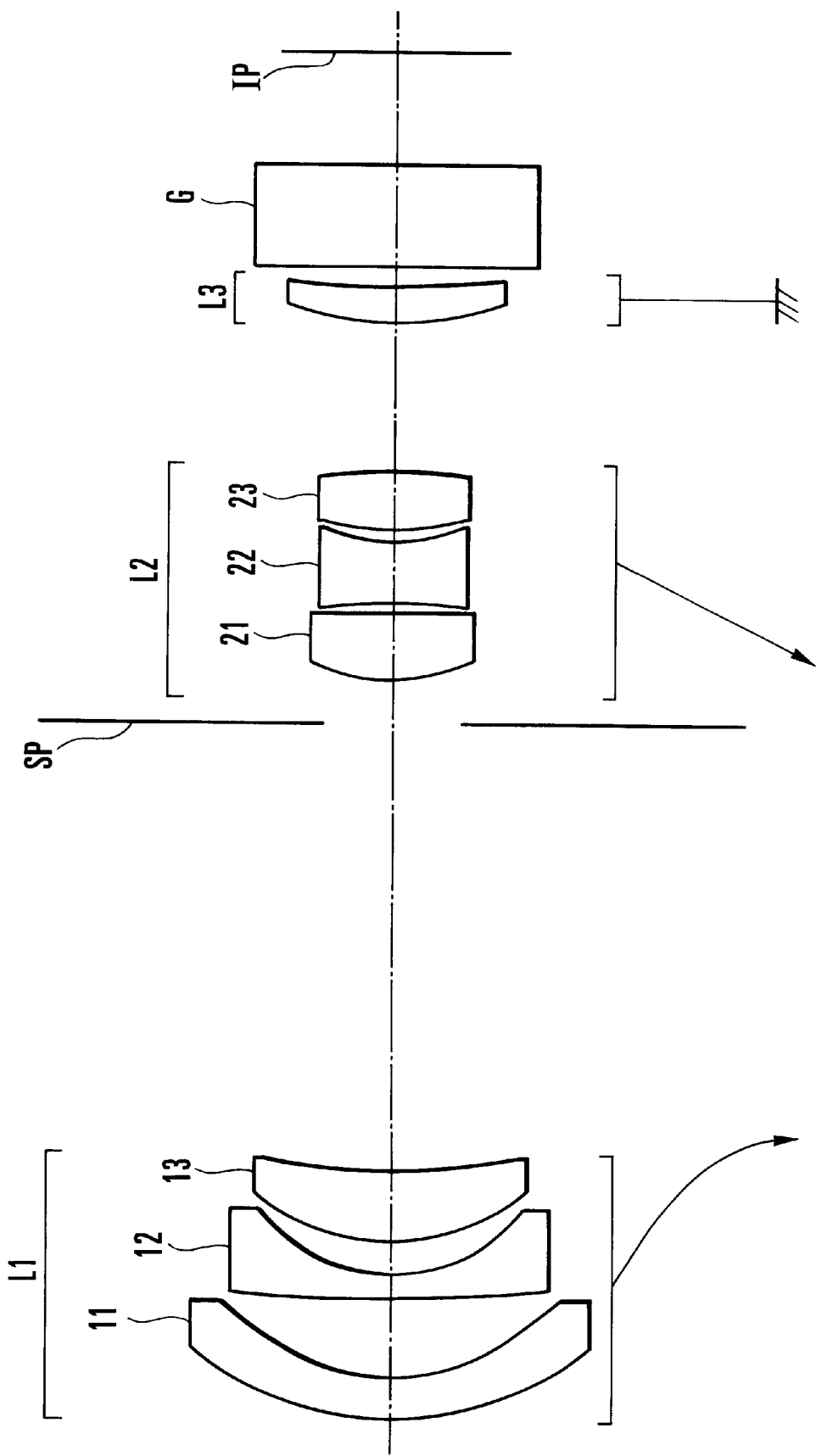
FIG. 5 is a longitudinal section view of a numerical example 2 of the zoom lens.
Figure 9:
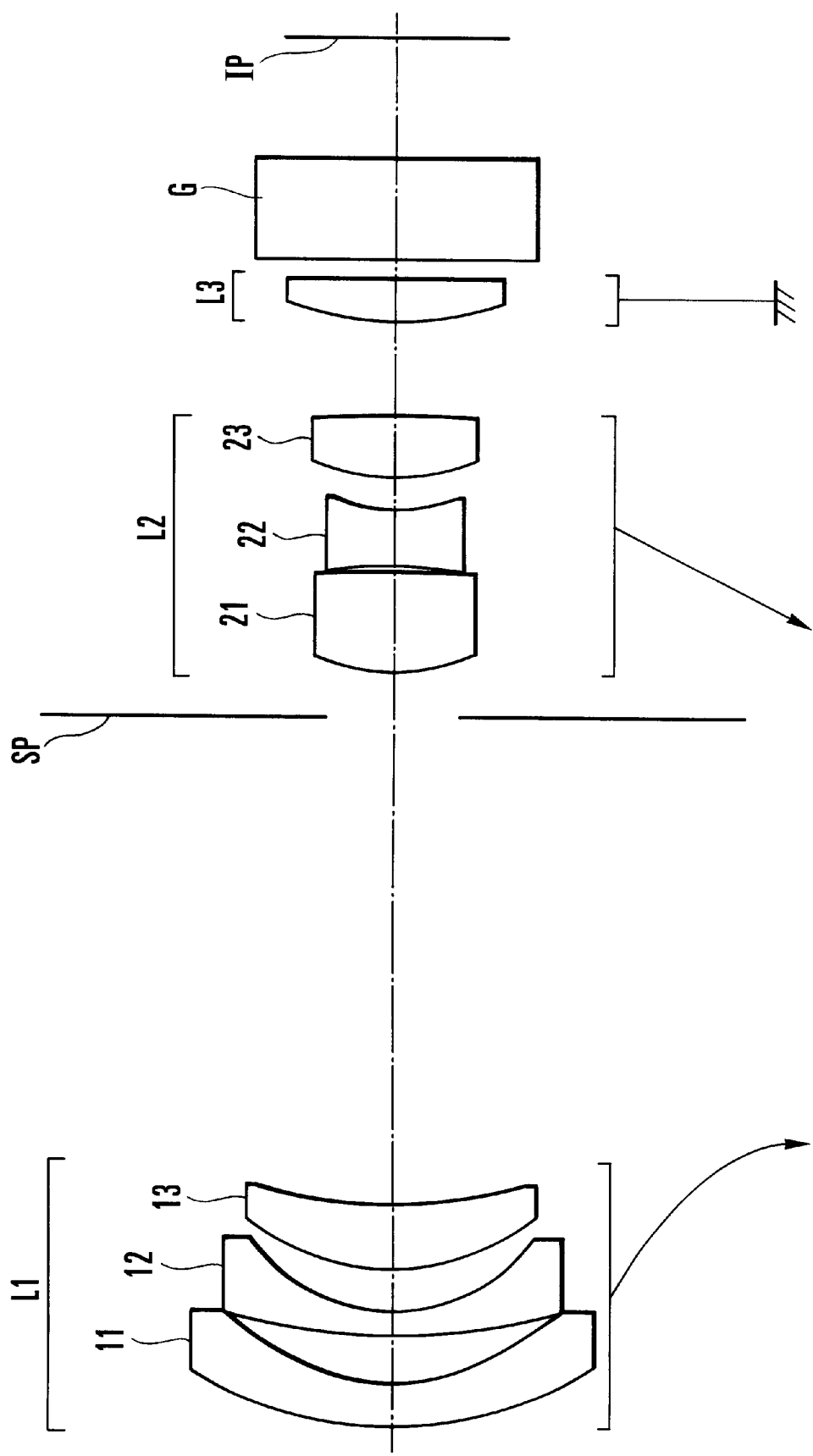
FIG. 9 is a longitudinal section view of a numerical example 3 of the zoom lens.

FIG. 1 in block-diagram form shows a numerical example 1 of the zoom lens to be described more fully later. FIGS. 2A to 2D through FIGS. 4A to 4D graphically show the aberrations of the zoom lens of numerical example 1 at the wide-angle end, a middle focal-length position and the telephoto end, respectively, FIG. 5 in block-diagram form shows a numerical example 2 of the zoom lens to be more fully described later. FIGS. 6A to 6D through FIGS. 8A to 8D graphically show the aberrations of the zoom lens of numerical example 2 at the wide-angle end, a middle focal-length position and the telephoto end, respectively. FIG. 9 in block-diagram form shows a numerical example 3 of the zoom lens to be more fully described later. FIGS. 10A to 10D through FIGS. 12A to 12D graphically show the aberrations of the zoom lens of numerical example 3 at the wide-angle end, a middle focal length position and the telephoto end, respectively. FIG. 5 in block-diagram form shows a numerical example 4 of the zoom lens to be more fully described later. FIGS. 14A to 14D through FIGS. 16A to 16D graphically show the aberrations of the zoom lens of numerical example 4 at the wide-angle end, a middle focal-length position and the telephoto end, respectively.

Referring to the lens block diagrams shown in FIGS. 1, 5, 9 and 13, the zoom lens comprises, in order from an object side to an image side, a first lens unit L1 of negative refractive power, an aperture SP, a second lens unit L2 of positive refractive power and a third lens unit L3 of positive refractive power. A glass block G such as a filter occupies the space between the third lens unit L3 and an image plane IP.

In the zoom lenses of the numerical examples 1 to 4, during a change in magnification (zooming) from the wide-angle end to the telephoto end, the second lens unit axially moves toward the object side, while simultaneously moving the first lens unit non-linearly to compensate for the shift of the image plane resulting from zooming. The third lens unit remains stationary during zooming. The focusing provision is made in either the first lens unit or the third lens unit.

Focusing with the first lens unit provides the advantage that the image sharpness is not affected by zooming. In another case where the third lens unit is selected to be used in focusing, because, as the movable part takes its place at the rear, its size accounts for a small proportion of the system, and there is the advantage in assuring improvements in the compactness of the device.

In each of the zoom lenses of the numerical examples 1 to 4, the first lens unit has a negative lens provided with at least one aspheric surface, and the second lens unit has a positive lens provided with at least one aspheric surface. The stop SP is disposed in the space between the first lens unit and the second lens unit and is arranged to move in unison with the second lens unit during zooming.

Further, the third lens unit is constructed with one positive lens. The negative lens provided with the aspheric surface included in the first lens unit is formed to a meniscus shape. The aspheric surface in the first lens unit is put on one of the lens surfaces on the object side and the image side of the negative lens, which is smaller in its radius of curvature than the opposite surface.

Specifically describing the lens configuration, the first lens unit is constructed with a negative lens 11 of meniscus form, concave toward the image side, a negative lens 12 of meniscus form, concave toward the image side and a positive lens 13 of meniscus form, convex toward the object side, totaling three lenses. The lens surface on the image side of the first negative lens 11 is an aspheric surface.

In this instance, letting the Center thickness (thickness on the optical axis) of the negative lens 11 be denoted by "d" and, as the diameter for support in the lens barrel is taken as a maximum peripheral diameter, letting the maximum thickness in a direction parallel to the optical axis at the maximum peripheral diameter be denoted by "t", the following condition is satisfied:

$1 < t/d < 2.$

When the above condition is satisfied, the lens can be manufactured by molding with ease.

The second lens unit is the main variator of the zoom lens. So, the zooming movement of the second lens unit is rather longer. For this reason, a second lens unit of smaller size and lighter weight is more favorable for driving in the lens system. Specifically speaking, the second lens unit can be constructed with, in order from the object side:

(a1) one positive lens;

(a2) one positive lens and one negative lens;

(a3) a positive lens, a negative lens and a positive lens; or (a4) a positive lens, a positive lens, a negative lens and a positive lens.

In the case of the scheme (a4), the aspheric surface may be removed. Even if this is so, it is possible to insure the desired performance. However, there is the disadvantage that compactness of the device is not improved. So, the employment of the aspheric surface is rather desirable even in the cage of the scheme (a4), so that the size of the second lens unit is reduced. Of the above schemes (a1) to (a4), the scheme (a3) is best in balancing size and performance, as is Used in the numerical examples 1 to 4.

Specifically speaking, the second lens unit is constructed with a positive lens 21 of either bi-convex form or meniscus form convex toward the object side, a negative lens 22 of bi-concave form and a positive lens 23 of bi-convex form, totaling three lenses. The third lens unit is constructed with a single positive lens of meniscus form convex toward the object side.

The characteristic features of each of the zoom lenses of numerical examples 1 to 4 are described below.

Numerical Example 1

In the numerical example 1, an aperture stop is disposed in between the first lens unit and the second lens unit and is arranged to axially move in unison with the second lens unit during zooming.

An aspheric surface is disposed in the lens surface on the image side of the negative meniscus lens 11 of the first lens unit. The ratio of the edge thickness to the center thickness of the lens 11 is restricted to 1.5 or thereabout in order to insure that the form of the lens 11 becomes favorable for molding. The method of making a determination of the maximum thickness "t" in the direction parallel to the optical axis is as follows. In the numerical example 1, the illumination at 1.0 of the full image height in the wide-angle end is made to be 50% (taking distortion in consideration). Therefore, the negative meniscus lens 11 having the aspheric surface is trimmed to an inner diameter of 12.3 mm for a clear diameter of 11.3 mm, thus allowing the difference for support in the lens barrel. For this reason, the maximum thickness "t" in the direction parallel to the optical axis is found to be 2.06 mm. The lens 11 alone cannot bear the entirety of the negative refractive power of the first lens unit. Therefore, the first lens unit has two negative lenses over which the negative refractive power is distributed.

The aspheric surface provided in the lens 11 is effective to correct aberrations at large image heights at the wide-angle end.

The second lens unit is constructed with three lenses, i.e., a positive lens 21, a negative lens 22 and a positive lens 23. An aspheric surface is provided in the positive lens 23 on the image side. The aspheric surface provided in the lens 23 is effective to correct spherical aberration and field curvature.

Numerical Example 2

In the numerical example 2, an aperture stop is disposed in between the first lens unit and the second lens unit and is arranged to axially move in unison with the second lens unit during zooming.

An aspheric surface is disposed in the lens surface on the image side of the negative meniscus lens 11 of the first lens unit. The ratio of the edge thickness to the center thickness of the lens 11 is restricted to 1.65 or thereabout in order to insure that the form of the lens 11 becomes favorable for molding. The method of making a determination of the maximum thickness "t" in the direction parallel to the optical axis is as follows. In the numerical example 2, the illumination at 1.0 of the full image height in the wide-angle end is made to be 50% (taking distortion in consideration). Therefore, the lens 11 is trimmed to an inner diameter of 12.1 mm for a clear diameter of 11.1 mm, thus allowing the difference for support in the lens barrel. For this reason, the maximum thickness "t" in the direction parallel to the optical axis is found to be 2.32 mm. The lens 11 alone cannot bear the entirety of the negative refractive power of the first lens unit. Therefore, the first lens unit has two negative lenses over which the negative refractive power is distributed.

The aspheric surface provided in the lens 11 is effective to correct aberrations at large image heights at the wide-angle end. The non-aspherical or spherical negative lens 12 of meniscus form takes a smaller share of the power than in the numerical example 1, so that the negative lens 12 becomes easier to make.

The second lens unit is constructed with three lenses, i.e., a positive lens 21, a negative lens 22 and a positive lens 23. An aspheric surface is provided in the positive lens 23 on the image side. The aspheric surface provided in the lens 23 is effective to correct spherical aberration and field curvature.

Numerical Example 3

In the numerical example 3, an aperture stop is disposed in between the first lens unit and the second lens unit and is arranged to axially move in unison with the second lens unit during zooming.

An aspheric surface is disposed in the lens surface on the image side of the negative meniscus lens 11 of the first lens unit. The ratio of the edge thickness to the center thickness of the lens 11 is restricted to 1.8 or thereabout in order to insure that the form of the lens 11 becomes favorable for molding. The method of making a determination of the maximum thickness "t" in the direction parallel to the optical axis is as follows. In the numerical example 3, the illumination at 1.0 of the full image height in the wide-angle end is made to be 50% (taking distortion in consideration). Therefore, the lens 11 is trimmed to an inner diameter of 12.2 mm for a clear diameter of 11.2 mm, thus allowing the difference for support in the lens barrel. Because of this arrangement, the maximum thickness "t" in the direction parallel to the optical axis is found to be 2.52 mm. The lens 11 alone cannot bear the entirety of the negative refractive power of the first lens unit. Therefore, the first lens unit has two negative lenses over which the negative refractive power is distributed.

The aspheric surface provided in the lens 11 is effective to correct aberrations at large image heights at the wide-angle end. The non-aspherical or spherical negative lens 12 of meniscus form takes a smaller share of the power than in the numerical example 2, so that the lens 12 becomes easier to make.

The second lens unit is constructed with three lenses, i.e., a positive lens 21, a negative lens 22 and a positive lens 23. An aspheric surface is provided in the positive lens 23 on the image side. The aspheric surface provided in the lens 23 is effective to correct spherical aberration and field curvature.

Numerical Example 4

In the numerical example 4, an aperture stop is disposed in the space between the first lens unit and the second lens unit and is arranged to axially move in unison with the second lens unit during zooming.

An aspheric surface is disposed in the lens surface on the image side of the negative meniscus lens 11 of the first lens unit. The ratio of the edge thickness to the center thickness of the lens 11 is restricted to 2.0 or thereabout in order to insure that the form of the lens 11 becomes favorable for molding. The method of making a determination of the maximum thickness "t" in the direction parallel to the optical axis is as follows. In the numerical example 4, the illumination at 1.0 of the full image height in the wide-angle end is made to be 50% (taking distortion in consideration). Therefore, the lens 11 is trimmed to an inner diameter of 12.2 mm for a clear diameter of 11.2 mm, thus allowing the difference for support in the lens barrel. Because of this arrangement, the maximum thickness "t" in the direction parallel to the optical axis is found to be 2.8 mm. The lens 11 alone cannot bear the entirety of the negative refractive power of the first lens unit. Therefore, the first lens unit has two negative lenses over which the negative refractive power is distributed.

The aspheric surface provided in the lens 11 is effective to correct aberrations at large image heights at the wide-angle end. The spherical negative lens 12 of meniscus form takes a smaller share of the power than in the numerical example 3, so that the lens 12 becomes easier to make.

The second lens unit is constructed with three lenses, i.e., a positive lens 21, a negative lens 22 and a positive lens 23. An aspheric surface is provided in the positive lens 23 on the image side. The aspheric surface provided in the lens 23 is effective to correct spherical aberration and field curvature.

Next, the numerical data for the numerical examples 1 to 4 are given in respective tables, where ri is the radius of curvature of the i-th surface, when counted from the object side, di is the thickness of the i-th optical member or the i-th air separation, when counted from the object side, and ni and vi are respectively the refractive index and Abbe number of the material of the i-th optical member, when counted from the object side. The values of the factor in the above-described condition for the numerical examples 1 to 4 are listed in Table-1.

In the numerical examples 1 to 4, the last two surfaces define a face plate, filter or like glass block. The shape of an aspheric surface is expressed in the coordinates with an X axis in the axial direction and an H axis in the direction perpendicular to an optical axis, the direction in which light advances being taken as positive, by the following equation:

$$X = \frac{(1/R)H^2}{1 + \sqrt{1-(1+K)(H/R)^2}} + AH^2 + BH^4 + CH^6 + DH^8 + EH^{10}$$

where R is the radius of the osculating sphere, and K, A, B, C, D and E are the aspheric coefficients. It is to be noted that the notation "D-OX" means "$\times 10^{-x}$".

Numerical Example 1

| f = 5.29~15.47 | Fno = 1:2.82 | 2ω = 64.3° | |
|---|---|---|---|
| r1 = 11.100 | d1 = 1.40 | n1 = 1.69350 | v1 = 53.2 |
| *r2 = 7.152 | d2 = 2.70 | | |
| r3 = 123.673 | d3 = 0.80 | n2 = 1.80610 | v2 = 40.9 |
| r4 = 5.756 | d4 = 1.20 | | |

-continued

| f = 5.29~15.47 | Fno = 1:2.82 | 2ω = 64.3° | |
|---|---|---|---|
| r5 = 7.656 | d5 = 2.32 | n3 = 1.84666 | ν3 = 23.8 |
| r6 = 20.406 | d6 = Variable | | |
| r7 = (Stop) | d7 = 1.50 | | |
| r8 = 6.212 | d8 = 2.25 | n4 = 1.83400 | ν4 = 37.2 |
| r9 = −96.250 | d9 = 0.19 | | |
| r10 = −22.222 | d10 = 1.90 | n5 = 1.84666 | ν5 = 23.8 |
| r11 = 6.352 | d11 = 1.10 | | |
| r12 = 8.942 | d12 = 2.00 | n6 = 1.69350 | ν6 = 53.2 |
| *r13 = −35.122 | d13 = Variable | | |
| r14 = 11.508 | d14 = 1.30 | n7 = 1.48749 | ν7 = 70.2 |
| r15 = 78.476 | d15 = 0.65 | | |
| r16 = ∞ | d16 = 3.44 | n8 = 1.51633 | ν8 = 64.2 |
| r17 = ∞ | | | |

*Aspheric surface

| Variable | Focal Length | | |
|---|---|---|---|
| Separation | 5.29 | 12.01 | 15.47 |
| d 6 | 14.69 | 3.67 | 1.73 |
| d13 | 4.15 | 13.72 | 18.65 |

Aspheric Coefficients

| r2: | R = 7.15211D+00 | K = −4.03496D−01 | B = −8.52610D−05 |
|---|---|---|---|
| | C = −2.58782D−06 | D = −3.95466D−08 | E = −2.09606D−09 |
| r13: | R = −3.51222D+01 | K = −1.02695D+02 | B = 3.92930D−04 |
| | C = 2.17609D−05 | D = 1.74621D−06 | E = −9.34319D−08 |

Numerical Example 2

| f = 5.31~15.45 | Fno = 1:2.82 | 2ω = 64.1° | |
|---|---|---|---|
| r1 = 11.549 | d1 = 1.40 | n1 = 1.69350 | ν1 = 53.2 |
| *r2 = 6.912 | d2 = 2.70 | | |
| r3 = 66.679 | d3 = 0.30 | n2 = 1.83400 | ν2 = 37.2 |
| r4 = 5.951 | d4 = 1.20 | | |
| r5 = 7.897 | d5 = 2.32 | n3 = 1.84666 | ν3 = 23.8 |
| r6 = 22.664 | d6 = Variable | | |
| r7 = (Stop) | d7 = 1.50 | | |
| r8 = 6.643 | d8 = 2.25 | n4 = 1.83400 | ν4 = 37.2 |
| r9 = 234.003 | d9 = 0.30 | | |
| r10 = −22.737 | d10 = 2.11 | n5 = 1.80518 | ν5 = 25.4 |
| r11 = 5.899 | d11 = 0.40 | | |
| r12 = 8.623 | d12 = 2.00 | n6 = 1.69350 | ν6 = 53.2 |
| *r13 = −16.771 | d13 = Variable | | |
| r14 = 10.438 | d14 = 1.30 | n7 = 1.48749 | ν7 = 70.2 |
| r15 = 40.167 | d15 = 0.65 | | |
| r16 = ∞ | d16 = 3.44 | n8 = 1.51633 | ν8 = 64.2 |
| r17 = ∞ | | | |

*: Aspheric surface

| Variable | Focal Length | | |
|---|---|---|---|
| Separation | 5.31 | 12.00 | 15.45 |
| d 6 | 15.06 | 3.84 | 1.85 |
| d13 | 4.86 | 14.43 | 19.36 |

Aspheric Coefficients

| r2: | R = 6.91181D+00 | K = −3.70221D−01 | B = −1.19750D−04 |
|---|---|---|---|
| | C = 1.02960D−06 | D = −1.91994D−07 | E = 5.10532D−11 |
| r13: | R = −1.67714D+01 | K = 1.60797D+00 | B = 2.88787D−04 |
| | C = −6.06163D−07 | D = 1.20458D−06 | E = −3.69991D−08 |

Numerical Example 3

| f = 5.31~15.48 | Fno = 1:2.82 | 2ω = 64.1° | |
|---|---|---|---|
| r1 = 14.533 | d1 = 1.40 | n1 = 1.69350 | ν1 = 53.2 |
| *r2 = 7.356 | d2 = 1.61 | | |
| r3 = 24.185 | d3 = 0.80 | n2 = 1.83481 | ν2 = 42.7 |
| r4 = 6.235 | d4 = 1.48 | | |
| r5 = 8.201 | d5 = 2.20 | n3 = 1.84666 | ν3 = 23.8 |
| r6 = 17.475 | d6 = Variable | | |
| r7 = (Stop) | d7 = 1.50 | | |
| r8 = 6.775 | d8 = 3.50 | n4 = 1.83400 | ν4 = 37.2 |
| r9 = −35.043 | d9 = 0.14 | | |
| r10 = −16.513 | d10 = 1.90 | n5 = 1.84666 | ν5 = 23.8 |
| r11 = 6.452 | d11 = 1.13 | | |
| r12 = 8.600 | d12 = 2.00 | n6 = 1.69350 | ν6 = 53.2 |
| *r13 = −39.950 | d13 = Variable | | |
| r14 = 12.400 | d14 = 1.40 | n7 = 1.51823 | ν7 = 58.9 |
| r15 = 119.143 | d15 = 0.65 | | |
| r16 = ∞ | d16 = 3.44 | n8 = 1.51633 | ν8 = 64.2 |
| r17 = ∞ | | | |

*Aspheric Surface

| Variable | Focal Length | | |
|---|---|---|---|
| Separation | 5.31 | 12.02 | 15.48 |
| d 6 | 16.32 | 4.28 | 2.16 |
| d13 | 3.13 | 12.70 | 17.63 |

Aspheric Coefficients

| r2: | R = 7.35600D+00 | K = −3.40169D−01 | B = −1.33861D−04 |
|---|---|---|---|
| | C = −1.36714D−06 | D = −7.05455D−08 | E = 7.88209D−10 |
| r13: | R = −3.99501D+01 | K = −5.48777D+01 | B = 5.03052D−04 |
| | C = 6.31900D−07 | D = 2.78813D−06 | E = −1.45021D−07 |

Numerical Example 4

| f = 5.30~15.48 | Fno = 1:2.82 | 2ω = 64.1° | |
|---|---|---|---|
| r1 = 16.265 | d1 = 1.40 | n1 = 1.69350 | ν1 = 53.2 |
| *r2 = 7.191 | d2 = 1.50 | | |
| r3 = 18.988 | d3 = 0.80 | n2 = 1.83481 | ν2 = 42.7 |
| r4 = 6.398 | d4 = 1.52 | | |
| r5 = 8.260 | d5 = 2.20 | n3 = 1.84666 | ν3 = 23.8 |
| r6 = 16.484 | d6 = Variable | | |
| r7 = (Stop) | d7 = 1.50 | | |
| r8 = 6.755 | d8 = 3.63 | n4 = 1.83400 | ν4 = 37.2 |
| r9 = −35.118 | d9 = 0.14 | | |
| r10 = −15.971 | d10 = 1.90 | n5 = 1.84666 | ν5 = 23.8 |
| r11 = 6.476 | d11 = 1.13 | | |
| r12 = 8.623 | d12 = 2.00 | n6 = 1.69350 | ν6 = 53.2 |
| *r13 = −40.991 | d13 = Variable | | |

-continued

| f = 5.30~15.48 | | Fno = 1:2.82 | | 2ω = 64.1° | |
|---|---|---|---|---|---|
| r14 = 11.763 | d14 = 1.40 | | n7 = 1.51823 | | v7 = 58.9 |
| r15 = 79.007 | d15 = 0.65 | | | | |
| r16 = ∞ | d16 = 3.44 | | n8 = 1.51633 | | v8 = 64.2 |
| r17 = ∞ | | | | | |

*Aspheric Surface

| Variable | Focal Length | | |
|---|---|---|---|
| Separation | 5.30 | 12.02 | 15.48 |
| d 6 | 16.60 | 4.37 | 2.21 |
| d13 | 2.92 | 12.49 | 17.42 |

Aspheric Coefficients

| r2: | R = 7.19145D+00 | K = −2.98105D−01 | B = −1.53388D−04 |
|---|---|---|---|
| | C = −6.35996D−07 | D = −8.48145D−08 | E = −6.59415D−10 |
| r13: | R = −4.09907D+01 | K = −5.67479D+01 | B = −5.12602D−04 |
| | C = 1.80615D−07 | D = 2.84359D−06 | E = −1.39202D−07 |

TABLE-1

| Condition | Numerical Example | | | |
|---|---|---|---|---|
| Factor | 1 | 2 | 3 | 4 |
| t/d | 2.06 | 2.30 | 2.50 | 2.80 |

According to the numerical examples 1 to 4 of the zoom lens as applied to the negative lead type having three lens units, the form and the construction and arrangement of the constituent lenses of each lens unit are appropriately determined and the aspheric surfaces are appropriately used to thereby assure a shortening of the total length of the entire lens system. With the zoom ratio taken at about 3, the field angle for the wide-angle end is increased to a wide value of 65°, while still permitting good correction of various aberrations including chromatic aberrations throughout the entire zooming range. A zoom lens of high performance is thus made possible to achieve.

Next, numerical examples 5 to 8 of zoom lenses, whose data will be given later, are described.

FIG. 17, FIG. 18, FIG. 19 and FIG. 20 in block-diagram form show zoom lenses of numerical examples 5 to 8 at the wide-angle end. The zoom lens comprises, in order from an object side to an image side, a first lens unit L1 of negative refractive power movable for zooming, a second lens unit L2 of positive refractive power movable for zooming, the first and second lens units constituting a zoom section, and a third lens unit L3 of positive refractive power. During zooming from the wide-angle end to the telephoto end, as indicated by the arrows, the second lens unit L2 axially moves toward the object side, while simultaneously moving the first lens unit L1 axially to compensate for the imaae shift. The third lens unit L3 remains stationary in the axial directions during zooming, but may be made movable as will be explained later.

A stop S is disposed in the space between the first lens unit L1 and the second lens unit L2. The stop S is desirably made to move in unison with the second lens unit L2. With the stop S arranged to move, in application to the camera system in which, when not used, the lens barrel is retracted from the shooting position to, and encapsulated within, the camera body, the stop S does not provide any adverse effect on the making of the retractable barrel, contributing to a reduction of the size of the entire lens system in the encapsulated state. Also, the movement of the stop S is combined with that of the second lens unit L2, giving another advantage of obviating the necessity of adding an independent mechanism for moving the stop S only. Even when encapsulated, the operating mechanism for the second lens unit L2 can also serve to encapsulate the stop S too. Yet another optical member G, such as a face plate or filter for the CCD, is positioned on the image side of the third lens unit L3.

The first lens unit L1 has a negative lens 1a of meniscus form convex toward the object side, a negative lens 1b of meniscus form convex toward the object side and a positive lens 1c of meniscus form convex toward the object side. Each of the first lens unit L1 and the second lens unit L2 has at least one aspheric surface.

The scheme that the first lens unit L1 is constructed with the negative lens 1a of meniscus form convex toward the object side, the negative lens 1b of meniscus form convex toward the object side and the positive lens 1c of meniscus form convex toward the object side has been determined from the point of view of the distortion and field curvature the first lens is unit L1 produces. By employing this scheme, it is possible to decrease the distortion produced by the first lens unit L1 and also to make the distortion good in balance with the field curvature. Of the schemes other than that described above, for example, a one that has a bi-concave negative lens and a positive lens of meniscus form convex toward the object side is effective for field curvature, but objectionable because deterioration of distortion results. Further, of the schemes other than those described above, for example, the one that has a negative lens of meniscus form, convex toward the object side, and a bi-convex positive lens is effective for distortion, but not desirable because deterioration of field curvature results.

Here, letting f1 denote the focal length of the first lens unit L1, f2 denote the focal length of the second lens unit L2, and fw denote the focal length of the entire lens system at the wide-angle end, the zoom lenses of numerical examples 5 to 8 satisfy the following conditions:

$$-3 \leq f1/fw \leq -2 \quad (1)$$

$$2 \leq f2/fw \leq 3 \quad (2)$$

The inequalities of condition (1) are concerned with the ratio of the refractive power of the first lens unit L1 to the focal length at the wide-angle end of the entire lens system and have an aim chiefly to secure a certain back focal distance and still minimize the produced amount of aberrations. For the wide-angle zoom lens, the factor represents a fundamental rule of refractive power distribution. When the lower limit of the condition (1) is exceeded, as this implies that the refractive power of the first lens unit L1 is too weak, it becomes difficult to sufficiently secure the back focal distance. Also, at the wide-angle end, the total length of the entire lens system and the diameter of the front lens members are caused to increase greatly. So, the violation of the inequality is undesirable. When the refractive power of the first lens unit L1 is too strong beyond the upper limit of the condition (1), all aberrations, for example, field curvature and distortion, become difficult to correct in good balance.

The inequalities of condition (2) are concerned with the ratio of the refractive power of the second lens unit L2 to the focal length at the wide-angle end of the entire lens system and have an aim chiefly to secure a certain back focal distance and still minimize the produced amount of aberrations. For the wide-angle zoom lens, the factor represents another fundamental rule of refractive power distribution. When the lower limit of the condition (2) is exceeded, as this implies that the refractive power of the second lens unit L2 is too strong, it becomes difficult to sufficiently secure the back focal distance. So, the violation of this condition is undesirable.

When the upper limit of the condition (2) is exceeded, as this implies that the refractive power of the second lens unit L2 is too weak, the back focal distance is advantageously secured, but it becomes difficult to make the field angle of the entire lens system to become wider. To achieve the much desired increase of the field angle, there is need to strengthen the negative refractive power of the first lens unit L1. Then, the curvature of field becomes larger and the produced amount of coma increases greatly, which are hard to correct.

Also, letting the image magnification in the telephoto end of the second lens unit L2 be denoted by β2T, it is preferred to satisfy the following condition:

$$-2 \leq \beta 2T \leq -1 \tag{3}$$

The inequalities of condition (3) are concerned with the lateral magnification at the telephoto end of the second lens unit L2 and have an aim to obtain a good optical performance with the limitation of the size of the lens system to a minimum. When the lower limit of the condition (3) is exceeded, the amount of reciprocating movement of the first lens unit L increases during zooming from the wide-angle end to the telephoto end. Particularly for the telephoto region, a large dead space is produced. Moreover, a negative refractive power has to be made very strong in relation to the refractive power of the entire lens system. Therefore, the Petzval sum increases in the negative direction. So, the field curvature becomes larger. When the upper limit of the condition (3) is exceeded, the separation between the first lens unit L1 and the second lens unit L2 becomes large in the neighborhood of the wide-angle end and the movement of the first lens unit L1 increases. Therefore, the total length in the wide-angle end of the entire lens system increases undesirably.

Further, letting the average of the refractive indices of a plurality of positive lenses constituting part of the second lens unit L2 be denoted by n2ave, it is preferred to satisfy the following condition;

$$1.65 \leq n2ave \leq 2.0 \tag{4}$$

The inequalities of condition (4) give a proper range for the average value of the refractive indices of the positive lenses in the second lens unit L2 and have an aim to appropriately correct the negative Petzval sum and other various aberrations produced by the first lens unit L1. When the lower limit of the condition (4) is exceeded, each of the positive lenses in the second lens unit L2 becomes stronger in curvature. Therefore, it becomes difficult to correct spherical aberration. When the upper limit of the condition (4) is exceeded, as this means that the refractive index of the positive lens is too high, it becomes difficult to correct the negative Petzval sum produced by the first lens unit L1.

Also, it is preferred that, as the second lens unit L2 having a positive refractive power is made movable during zooming, the third lens unit L3 moves in unison with the second lens unit L2, thereby providing an advantage of correcting the exit pupil and the focus surface in respect to the MTF (modulation transfer function).

Further, it is preferred that the aspheric surface in the second lens unit L2 is disposed in the lens surface closest to the object side in the second lens unit L2. In the case of the negative lead type zoom lens, because the rays of light emerging from the negative first lens unit L1 diverge, the axial beam has a largest diameter at that surface of the second lens unit L2 which is adjacent to the stop S and, therefore, the neighborhood of the stop S is most suited to correct spherical aberration. So, it is advantageous to put the aspheric surface in the neighborhood of the stop S.

Further, it is preferred that the aspheric surface in the second lens unit L2 is disposed in a convex lens. The second lens unit L2 has a positive refractive power as a whole. If, as the diverging light beam from the first lens unit L1 enters the second lens unit L2, the frontmost lens in the second lens unit L2 is a concave lens, the light beam is more diverged, so that the diameter of the second lens unit L2 has to increase undesirably. If the frontmost lens in the second lens unit L2 is a convex lens, the diverging light beam from the first lens unit L1 changes to convergence in entering the second lens unit L2, allowing the diameter of the second lens unit L2 to decrease. For this reason, a position at which the aspheric surface is preferably disposed is a convex surface of the convex lens which is adjacent to the stop S.

Further, it is preferred that the aspheric surface in the second lens unit L2 is disposed also in the lens surface closest to the image side in the second lens unit L2. In the case of the negative lead-type zoom lens, at the wide-angle end, the off-axial ray impinges on the negative first lens unit at an extreme height, and becomes lowest in height in the neighborhood of the stop S. As the off-axial ray travels from the second lens unit L2 to the third lens unit L3, the height of incidence is set to increase again. The on-axial light beam is, on the other hand, most widened at the frontmost surface of the second lens unit L2, and then changes to convergence toward the image plane. To correct both aberrations of the on-axial and off-axial rays with high efficiency, the aspheric surface is advantageously disposed in the lens surface closest to the image side in the second lens unit L2. For the off-axial light beam, this surface gives the largest height of incidence within the second lens unit L2 and, therefore, is most suited to correct lateral aberrations. Also, for the on-axial light beam, too, this surface is inferior to the lens surface closest to the object side in the second lens unit L2, but gives a larger height of incidence than on the third lens unit L3.

The shape of an aspheric surface is expressed in the coordinates with an X axis in the axial direction and an h axis in the direction perpendicular to an optical axis, the direction in which light advances being taken as positive, by the following equation:

$$X = \frac{(1/R)h^2}{1 + \sqrt{1 - (1+K)(h/R)^2}} + Bh^4 + Ch^6 + Dh^8 + Eh^{10} + Fh^{12}$$

where R is the radius of the osculating sphere, and K, B, C, D, E and F are the aspheric coefficients.

Next, the numerical data for the numerical examples 5 to 8 are given in tables, where the symbols have the same meanings as those in the numerical examples 1 to 4.

Numerical Example 5

| f = 1~2.92 | Fno = 1:2.8~4.7 | 2ω = 65.6~24.6° | |
|---|---|---|---|
| r1 = 3.1553 | d1 = 0.3582 | n1 = 1.69350 | ν1 = 53.2 |
| *r2 = 1.5776 | d2 = 0.2521 | | |
| r3 = 5.3286 | d3 = 0.1508 | n2 = 1.80400 | ν2 = 46.6 |
| r4 = 1.1639 | d4 = 0.3850 | | |
| r5 = 1.6670 | d5 = 0.3770 | n3 = 1.84666 | ν3 = 23.8 |
| r6 = 3.2938 | d6 = Variable | | |
| r7 = (Stop) | d7 = 0.0000 | | |
| r8 = 1.2639 | d8 = 0.5279 | n4 = 1.83400 | ν4 = 37.2 |
| r9 = −4.9231 | d9 = 0.0158 | | |
| r10 = −3.1936 | d10 = 0.3582 | n5 = 1.84666 | ν5 = 23.8 |
| r11 = 1.3489 | d11 = 0.2130 | | |
| r12 = 1.8546 | d12 = 0.3770 | n6 = 1.69350 | ν6 = 53.2 |
| *r13 = −17.3592 | d13 = Variable | | |
| r14 = 2.7465 | d14 = 0.2639 | n7 = 1.51633 | ν7 = 64.1 |
| r15 = 105.1430 | d15 = 0.1216 | | |
| r16 = ∞ | d16 = 0.6447 | n8 = 1.51633 | ν8 = 64.2 |
| r17 = ∞ | | | |

*Aspheric Surface

| Variable | Focal Length | | |
|---|---|---|---|
| Separation | 1.00 | 2.27 | 2.92 |
| d 6 | 3.07 | 0.80 | 0.41 |
| d13 | 0.64 | 2.39 | 3.29 |

Aspheric Coefficients r2: K = 1.57758 · 10⁰   B = 0.00000 · 10   C = −3.82953 · 10⁻²
    D = −5.76163 · 10⁻³   E = −1.56652 · 10⁻²   F = 1.72736 · 10⁻³
r13: K = −1.73592 · 10¹   B = −4.18110 · 10²   C = 1.03628 · 10⁻¹
    D = 4.43293 · 10⁻⁴   E = 3.61107 · 10⁻¹   F = −3.61834 · 10⁻¹

Numerical Example 6

| f = 1~2.9 | Fno = 1:2.4~4.4 | 2ω = 61~22.4° | |
|---|---|---|---|
| r1 = 5.0939 | d1 = 0.3258 | n1 = 1.69350 | ν1 = 53.2 |
| *r2 = 1.8792 | d2 = 0.2006 | | |
| r3 = 8.7679 | d3 = 0.1417 | n2 = 1.68923 | ν2 = 45.8 |
| r4 = 1.2272 | d4 = 0.4576 | | |
| r5 = 1.8870 | d5 = 0.3258 | n3 = 1.84666 | ν3 = 23.8 |
| r6 = 4.0681 | d6 = Variable | | |
| r7 = (Stop) | d7 = 0.2125 | | |
| *r8 = 2.3279 | d8 = 0.2267 | n4 = 1.69350 | ν4 = 53.2 |
| r9 = 8.7349 | d9 = 0.0966 | | |
| r10 = 1.4154 | d10 = 0.2833 | n5 = 1.71000 | ν5 = 53.6 |
| r11 = −17.5041 | d11 = 0.0483 | | |
| r12 = 8.0964 | d12 = 0.3906 | n6 = 1.80518 | ν6 = 25.4 |
| r13 = 0.9504 | d13 = 0.2833 | | |
| r14 = 5.6747 | d14 = 0.2267 | n7 = 1.60311 | ν7 = 60.6 |
| r15 = −3.4386 | d15 = Variable | | |
| r16 = 6.9568 | d16 = 0.2408 | n8 = 1.60311 | ν8 = 60.6 |
| r17 = −5.4791 | d17 = 0.1097 | | |
| r18 = ∞ | d18 = 0.4845 | n9 = 1.51633 | ν9 = 64.2 |
| r19 = ∞ | | | |

*Aspheric Surface

| Variable | Focal Length | | |
|---|---|---|---|
| Separation | 1.00 | 2.25 | 2.90 |
| d 6 | 3.23 | 0.75 | 0.31 |
| d15 | 0.64 | 2.21 | 3.00 |

Aspheric Coefficients r2: K = 1.87923 · 10⁰   B = 0.00000 · 10⁰   C = −3.00542 · 10⁻²
    D = −1.61322 · 10⁻²   E = −1.16121 · 10⁻⁴   F = −9.13813 · 10⁻⁴
r8: K = 2.32792 · 10⁰   B = −2.07944 · 10⁰   C = −1.06240 · 10⁻²
    D = −1.04810 · 10⁻²   E = −3.13028 · 10⁻³   F = 0.00000 · 10⁰

Numerical Example 7

| f = 1~2.91 | Fno = 1.24~4.5 | 2ω = 64.5~24.2° | |
|---|---|---|---|
| r1 = 2.0572 | d1 = 0.1846 | n1 = 1.60311 | ν1 = 60.6 |
| r2 = 1.2892 | d2 = 0.8105 | | |
| r3 = 4.4231 | d3 = 0.3538 | n2 = 1.69350 | ν2 = 53.2 |
| *r4 = 1.5036 | d4 = 0.1668 | | |
| r5 = 3.6106 | d5 = 0.1538 | n3 = 1.68000 | ν3 = 37.6 |
| r6 = 1.5985 | d6 = 0.3758 | | |
| r7 = 2.0380 | d7 = 0.3692 | n4 = 1.84666 | ν4 = 23.8 |
| r8 = 4.7896 | d8 = Variable | | |
| r9 = (Stop) | d9 = 0.2308 | | |
| *r10 = 2.2412 | d10 = 0.2461 | n5 = 1.69350 | ν5 = 53.2 |
| r11 = 20.7697 | d11 = 0.1049 | | |
| r12 = 1.5069 | d12 = 0.2615 | n6 = 1.69500 | ν6 = 53.5 |
| r13 = 7.5631 | d13 = 0.0525 | | |
| r14 = 7.8196 | d14 = 0.5089 | n7 = 1.80518 | ν7 = 25.4 |
| r15 = 1.0300 | d15 = 0.3064 | | |
| r16 = 3.7783 | d16 = 0.2308 | n8 = 1.60311 | ν8 = 60.6 |
| *r17 = −3.9511 | d17 = Variable | | |
| r18 = 6.0650 | d18 = 0.2615 | n9 = 1.60311 | ν9 = 60.6 |
| r19 = −6.1537 | d19 = 0.1191 | | |
| r20 = ∞ | d20 = 0.5261 | n10 = 1.51633 | ν10 = 64.2 |
| r21 = ∞ | | | |

*Aspheric Surface

| Variable | Focal Length | | |
|---|---|---|---|
| Separation | 1.00 | 2.26 | 2.91 |
| d 8 | 3.22 | 0.75 | 0.31 |
| d17 | 0.90 | 2.63 | 3.53 |

Aspheric Coefficients r4: K = 1.50355 · 10⁰   B = 0.00000 · 10⁰   C = −5.90901 · 10⁻²
    D = −1.98916 · 10⁻²   E = −6.41240 · 10⁻²   F = −2.40177 · 10⁻²
r10: K = 2.24124 · 10⁰   B = −1.02379 · 10⁰   C = −2.26252 · 10⁻³
    D = 3.01571 · 10⁻³   E = −5.70467 · 10⁻³   F = 0.00000 · 10⁰
r17: K = −3.9111 · 10⁰   B = −1.31846 · 10⁻⁶   C = 5.60118 · 10⁰
    D = −1.61158 · 10⁻³   E = −3.65508 · 10⁻⁴   F = 0.00000 · 10⁰

Numerical Example 8

| f = 1~2.89 | Fno = 1:2.4~4.3 | 2ω = 61.2~22.4° | |
|---|---|---|---|
| r1 = 6.9380 | d1 = 0.3254 | n1 = 1.69350 | ν1 = 53.2 |
| *r2 = 1.8140 | d2 = 0.1472 | | |
| r3 = 4.6905 | d3 = 0.1415 | n2 = 1.77000 | ν2 = 42.4 |
| r4 = 1.2569 | d4 = 0.4440 | | |
| r5 = 1.9246 | d5 = 0.3254 | n3 = 1.84666 | ν3 = 23.8 |
| r6 = 4.4613 | d6 = Variable | | |
| r7 = (Stop) | d7 = 0.2122 | | |
| *r8 = 2.3116 | d8 = 0.2264 | n4 = 1.69350 | ν4 = 53.2 |
| r9 = 5.6698 | d9 = 0.0965 | | |
| r10 = 1.4815 | d10 = 0.2830 | n5 = 1.80000 | ν5 = 40.6 |
| r11 = 61.7896 | d11 = 0.0483 | | |
| r12 = 7.5386 | d12 = 0.2830 | n6 = 1.83000 | ν6 = 41.7 |
| r13 = −4.5462 | d13 = 0.1400 | n7 = 1.80518 | ν7 = 25.4 |
| r14 = 0.9699 | d14 = 0.2830 | | |
| r15 = 3.9362 | d15 = 0.2264 | n8 = 1.60311 | ν8 = 60.6 |
| r16 = −3.6506 | d16 = Variable | | |
| r17 = 5.5818 | d17 = 0.2405 | n9 = 1.60311 | ν9 = 60.6 |
| r18 = −7.2676 | d18 = 0.1095 | | |
| r19 = ∞ | d19 = 0.4839 | n10 = 1.51633 | ν10 = 64.2 |
| r20 = ∞ | | | |

*Aspheric Surface

| Variable | Focal Length | | |
|---|---|---|---|
| Separation | 1.00 | 2.25 | 2.89 |
| d 6 | 3.23 | 0.74 | 0.30 |
| d 16 | 0.74 | 2.30 | 3.10 |

Aspheric Coefficients r2: K = 1.81395 · 10⁰  B = 0.00000 · 10⁰  C = −3.43194 · 10⁻²
     D = −2.03616 · 10⁻²  E = 4.93345 · 10⁻³  F = −3.15447 · 10⁻³ r8: K = 2.31159 · 10⁰  B = −7.67909 · 10⁻¹  C = −1.84587 · 10⁻²
     D = −5.91127 · 10⁻³  E = −5.40833 · 10⁻³  F = 0.00000 · 10⁰

FIGS. 21A to 21D, FIGS. 22A to 22D and FIGS. 23A to 23D-graphically show the aberrations of the zoom lens of numerical example 5 at the wide-angle, a middle focal length position, and the telephoto end, respectively. FIGS. 24A to 24D, FIGS. 25A to 25D and FIGS. 26A to 26D graphically show the aberration of the zoom lens of numerical example 6 at the wide-angle, a middle focal length position and the telephoto end, respectively. FIGS. 27A to 27D, FIGS. 28A to 28D and FIGS. 29A to 29D graphically show the aberrations of the zoom lens of numerical example 7 at the wide-angle, a middle focal length position and the telephoto end, respectively. FIGS. 30A to 30D, FIGS. 31A to 31D and FIGS. 32A to 32D graphically show the aberrations of the zoom lens of numerical example 8 at the wide-angle, a middle focal length position and the telephoto end, respectively.

Incidentally, in the graphs indicative of the spherical aberrations, the solid line is used for the spectral d-line, and the dashed line is used for the spectral g-line. In the graphs indicative of the astigmatism, the solid line is used for the sagittal focus ΔS and the dashed line is used for the meridional focus ΔM.

The values of the factors in the above-described conditions (1) to (4) for the numerical examples 5 to 8 are listed in Table-2 below.

TABLE 2

| Condition | Numerical Example | | | |
|---|---|---|---|---|
| No. & Factor | 5 | 6 | 7 | 8 |
| (1) f1/fw | −2.36 | −2.51 | −2.33 | −2.48 |
| (2) f2/fw | 2.37 | 2.35 | 2.47 | 2.36 |
| (3) β2T | −1.707 | −1.525 | −1.622 | −1.523 |
| (4) n2ave | 1.76375 | 1.66887 | 1.70060 | 1.73165 |

The zoom lenses of the numerical examples 5 to 8 are made up in the negative lead type and the form and the construction and arrangement of the constituent lenses of each lens unit are appropriately determined and the aspheric surfaces are appropriately used to thereby assure a shortening of the total length of the entire lens system. Moreover, the field angle is widened, while still permitting the various aberrations including chromatic aberrations to be corrected well throughout the entire zooming range for a high performance.

Next, eight numerical examples 9 to 16 of zoom lenses are described.

Figure 33:
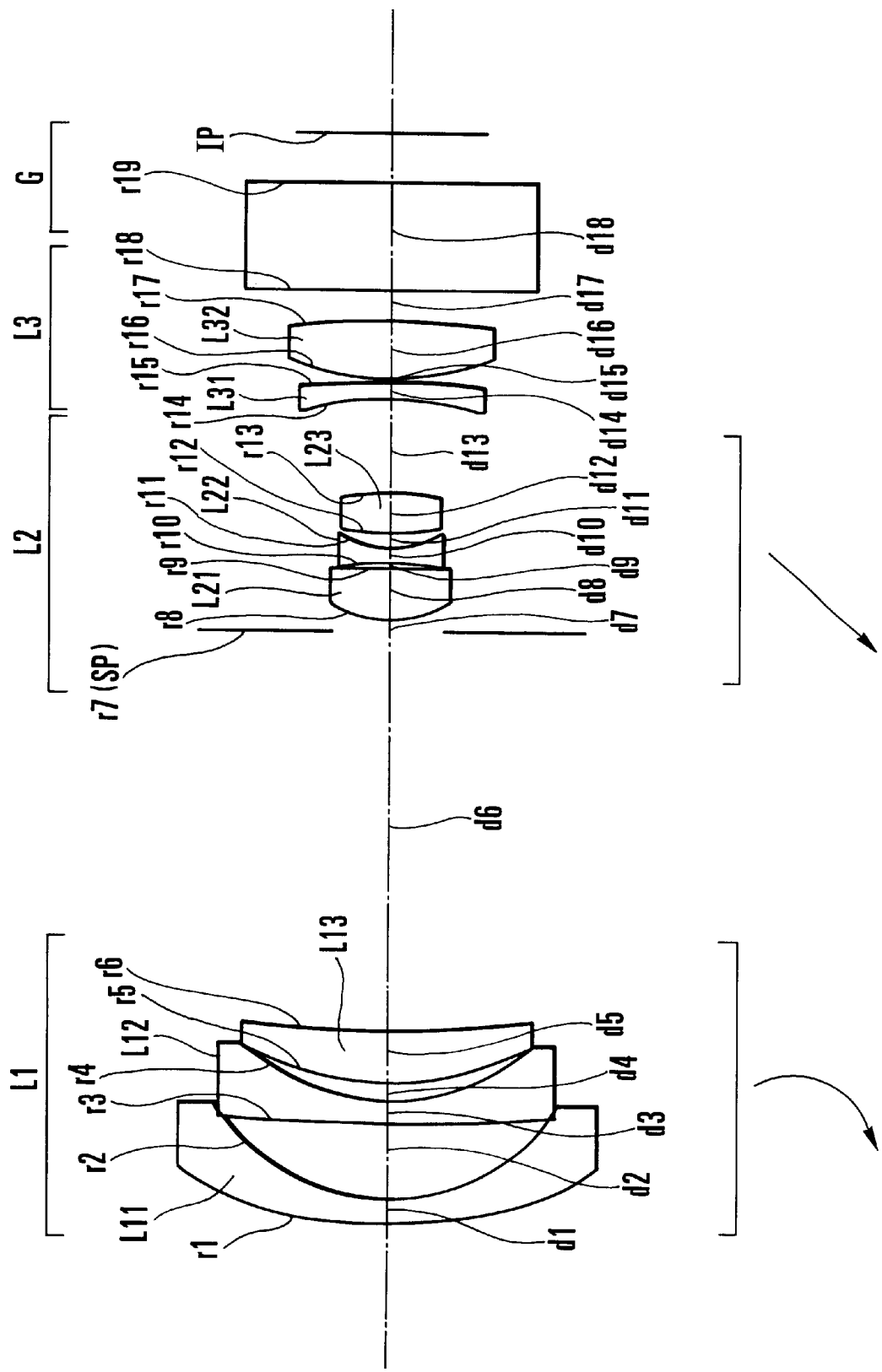
FIG. 33 is a longitudinal section view of a numerical example 9 of the zoom lens.
Figure 34A:
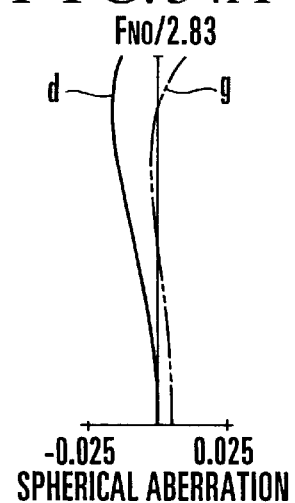
FIGS. 34A to 34C are graphic representations of the aberrations of the zoom lens of numerical example 9 in the wide-angle end.
Figure 34B:
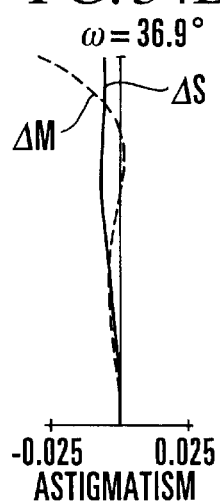
Figure 34C:
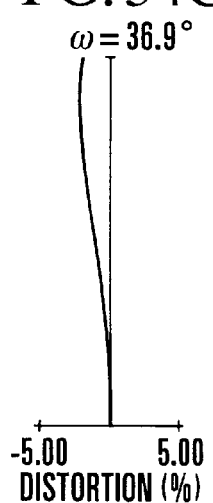
Figure 35A:
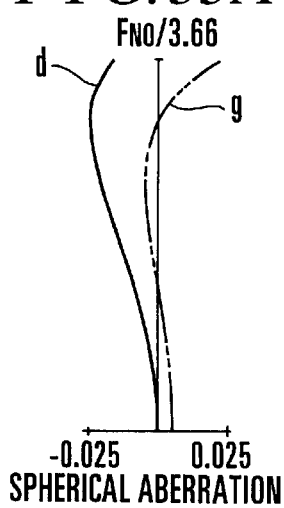
FIGS. 35A to 35C are graphic representations of the aberrations of the zoom lens of numerical example 9 in a middle focal-length position.
Figure 35B:
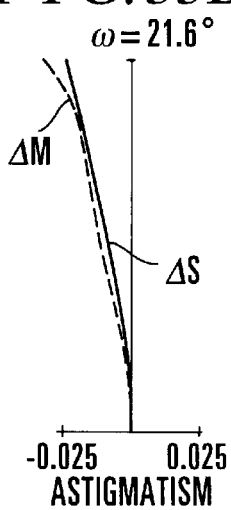
Figure 35C:
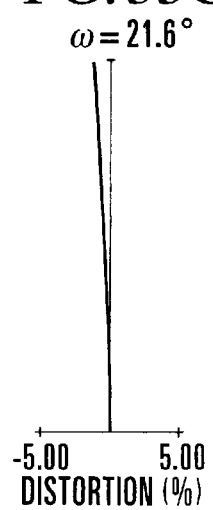
Figure 36A:
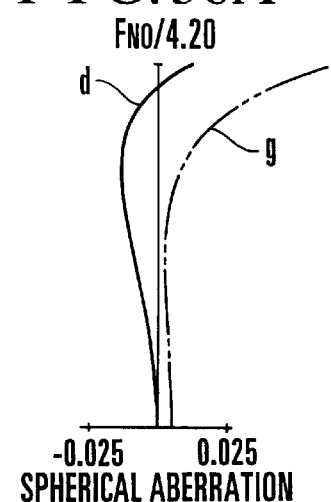
FIGS. 36A to 36C are graphic representations of the aberrations of the zoom lens of numerical example 9 in the telephoto end.
Figure 36B:
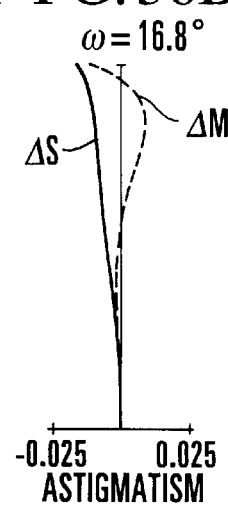
Figure 36C:
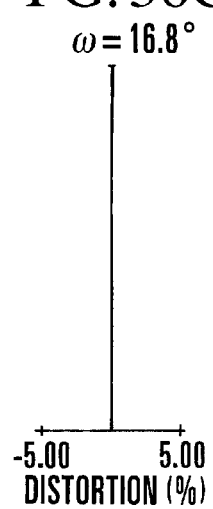

FIG. 33 in block-diagram form shows a zoom lens of numerical example 9, whose numerical data will be given later. FIGS. 34A to 34C through FIGS. 36A to 36C graphically show the aberrations of the zoom lens of FIG. 33 at the wide-angle end, a middle focal length position and the telephoto end, respectively.

Figure 37:
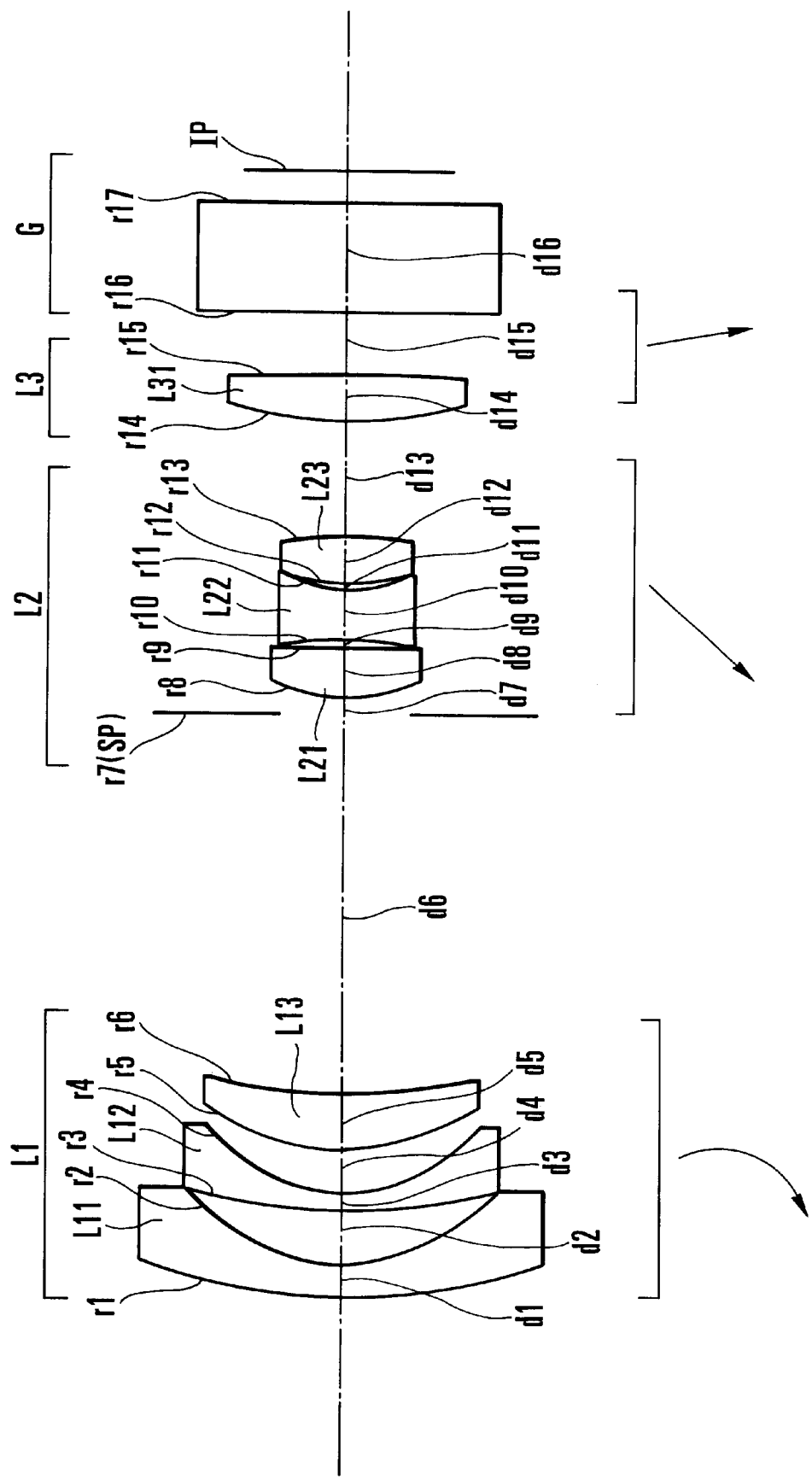
FIG. 37 is a longitudinal section view of a numerical example 10 of the zoom lens.
Figure 38A:
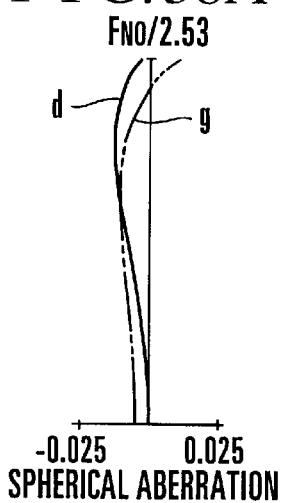
FIGS. 38A to 38C are graphic representations of the aberrations of the zoom lens of numerical example 10 in the wide-angle end.
Figure 38B:
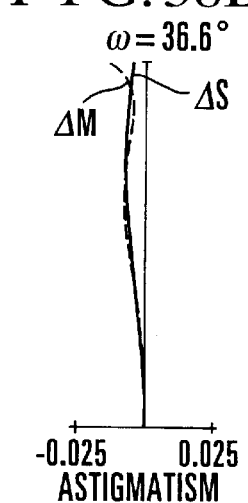
Figure 38C:
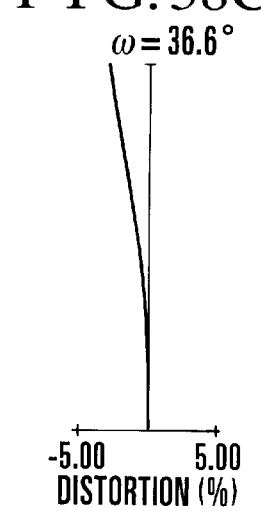
Figure 39A:
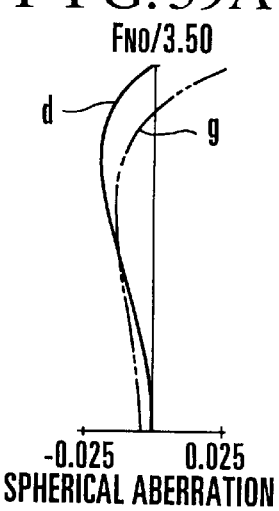
FIGS. 39A to 39C are graphic representations of the aberrations of the zoom lens of numerical example 10 in a middle focal-length position.
Figure 39B:
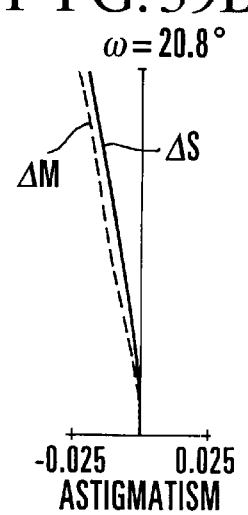
Figure 39C:
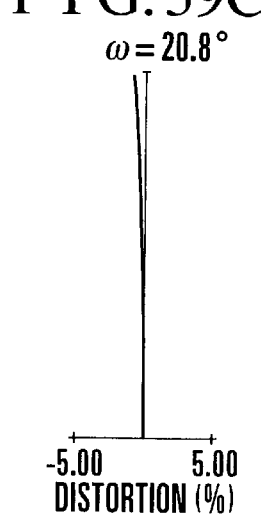
Figure 40A:
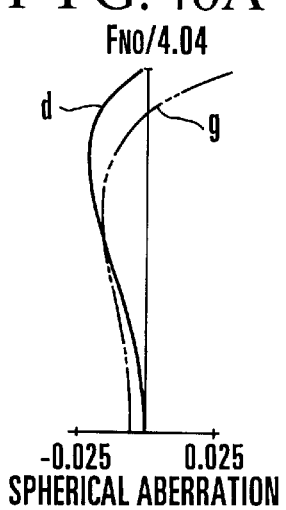
FIGS. 40A to 40C are graphic representations of the aberrations of the zoom lens of numerical example 10 in the telephoto end.
Figure 40B:
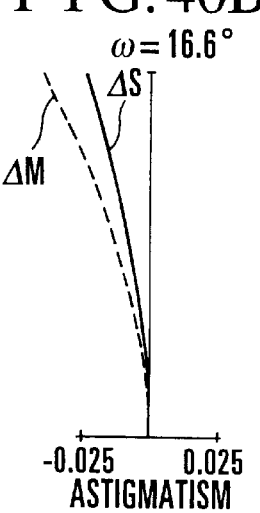
Figure 40C:
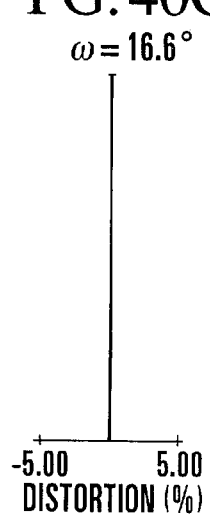

FIG. 37 in block-diagram form shows a zoom lens of numerical example 10, whose numerical data will be given later. FIGS. 38A to 38C through FIGS. 40A to 40C graphically show the aberrations of the zoom lens of FIG. 37 at the wide-angle end, a middle focal length position and the telephoto end, respectively.

Figure 41:
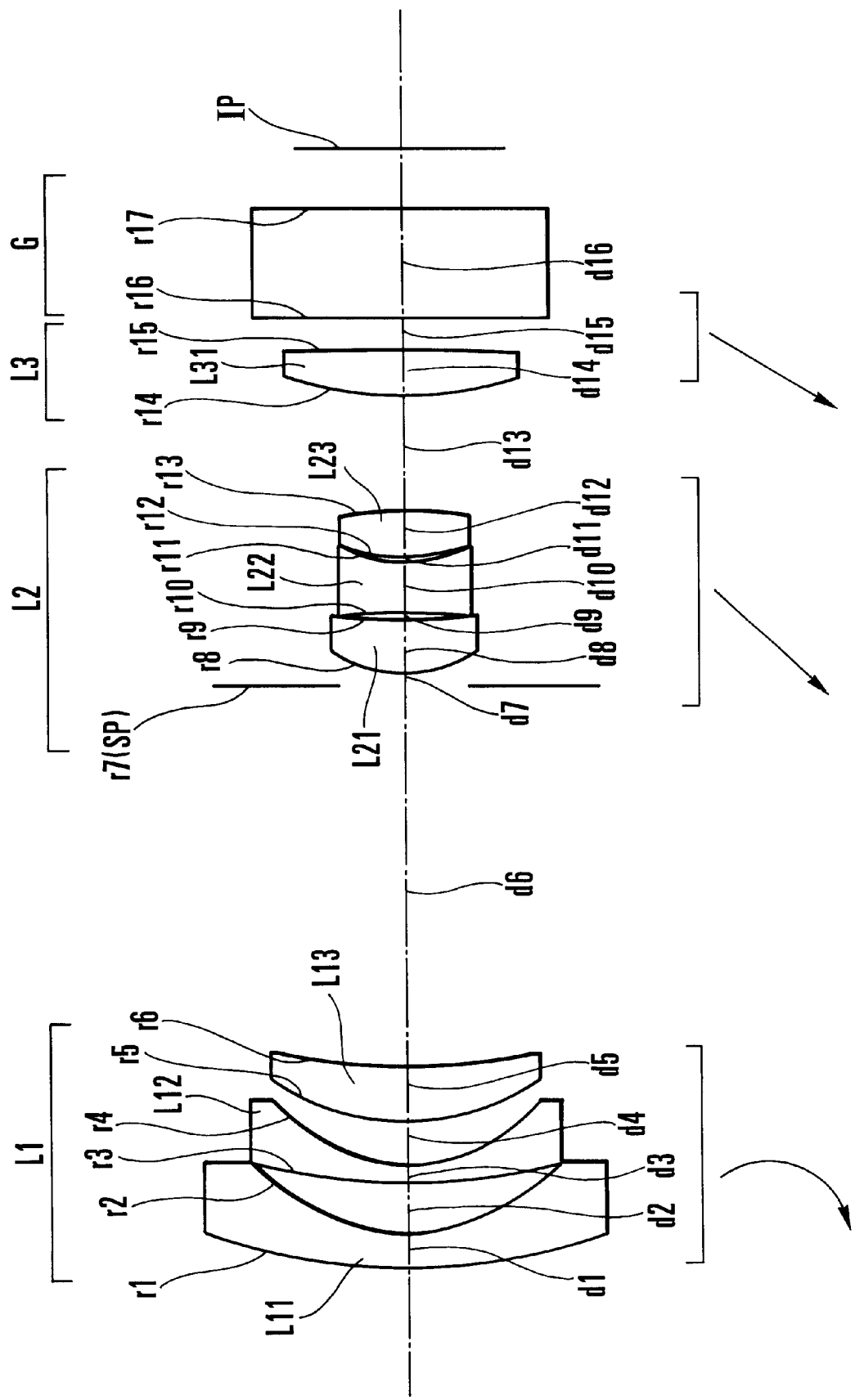
FIG. 41 is a longitudinal section view of a numerical example 11 of the zoom lens.

FIG. 41 in block-diagram form shows a zoom lens of numerical example 11, whose numerical data will be given later. FIGS. 42A to 42C through FIGS. 44A to 44C graphically show the aberrations of the zoom lens of FIG. 41 at the wide-angle end, a middle focal length position and the telephoto end, respectively.

Figure 45:
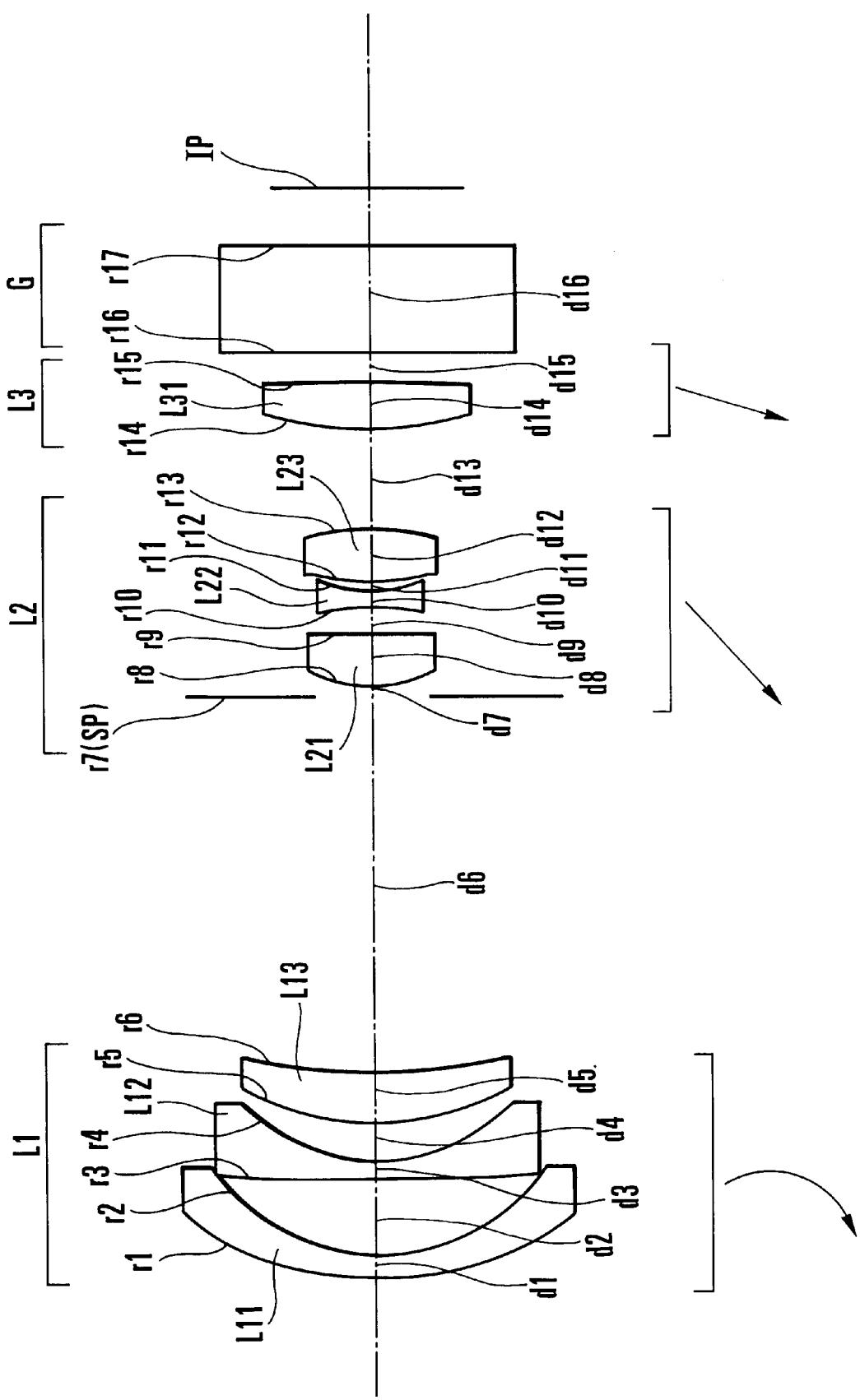
FIG. 45 is a longitudinal section view of a numerical example 12 of the zoom lens.

FIG. 45 in block diagram shows a zoom lens of numerical example 12, whose numerical data will be given later. FIGS. 46A to 46C through FIGS. 48A to 48C graphically show the aberrations of the zoom lens of FIG. 45 at the wide-angle end, a middle focal length position and the telephoto end, respectively.

Figure 49:
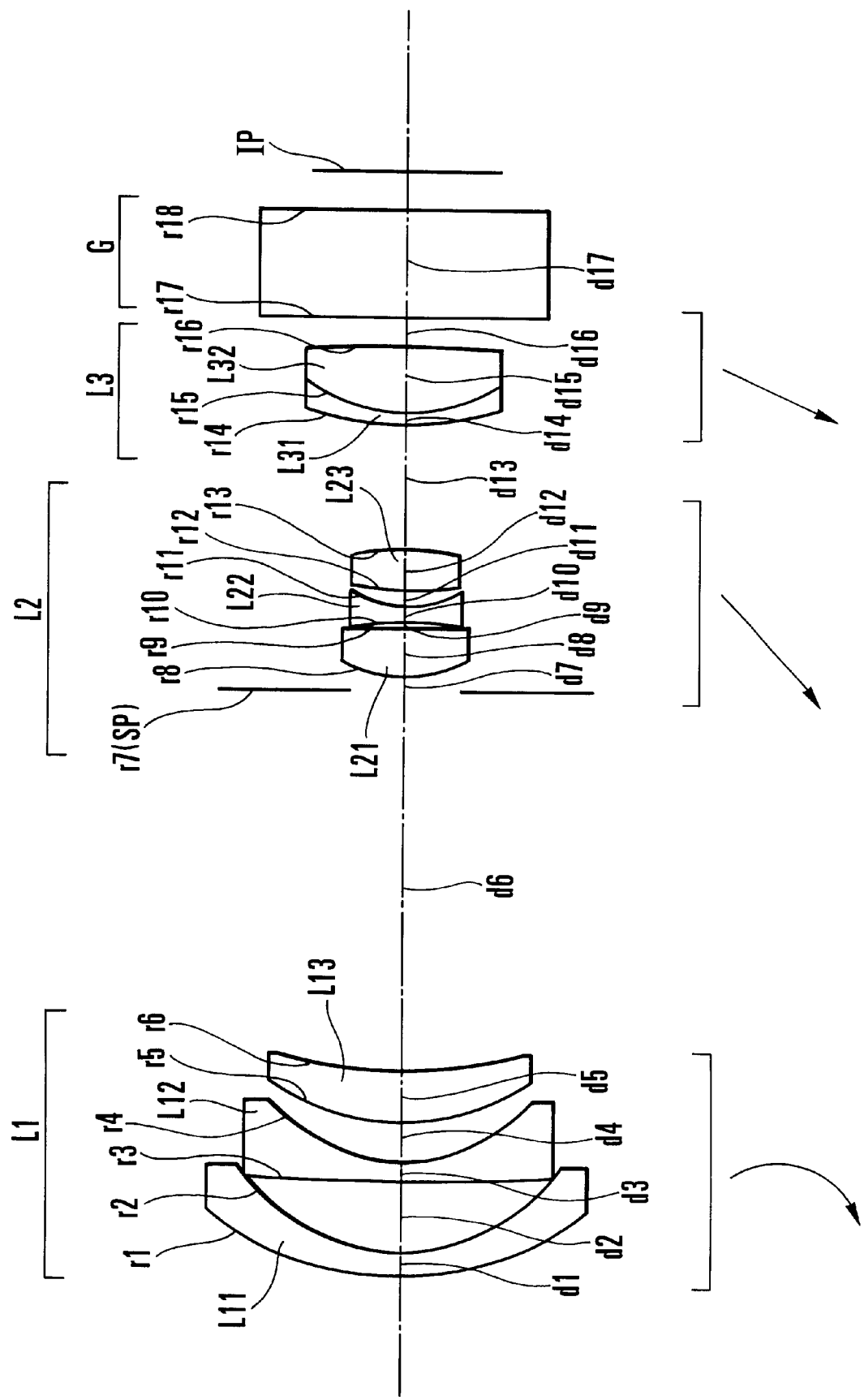
FIG. 49 is a longitudinal section view of a numerical example 13 of the zoom lens.
Figure 50A:
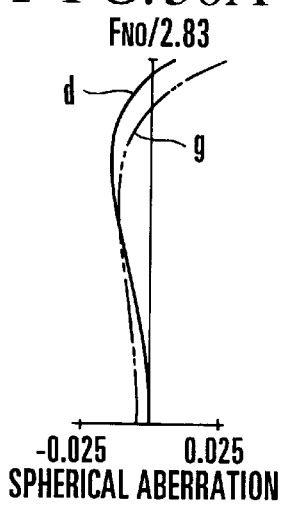
FIGS. 50A to 50C are graphic representations of the aberrations of the zoom lens of numerical example 13 in the wide-angle end.
Figure 50B:
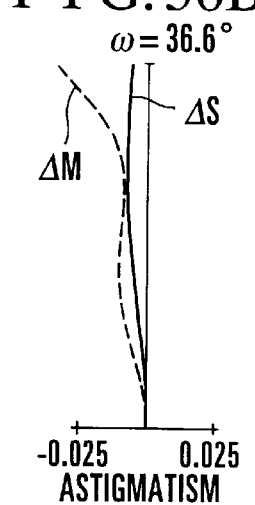
Figure 50C:
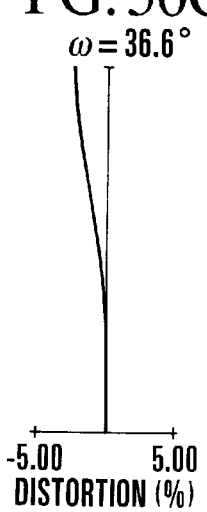
Figure 51A:
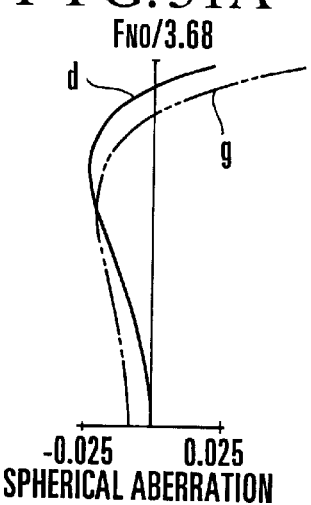
FIGS. 51A to 51C are graphic representations of the aberrations of the zoom lens of numerical example 13 in a middle focal-length position.
Figure 51B:
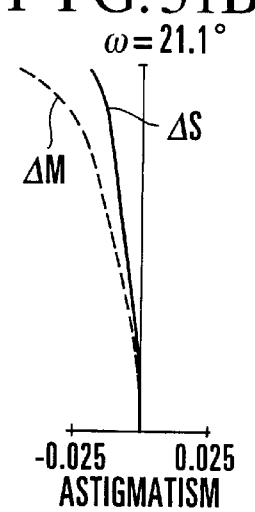
Figure 51C:
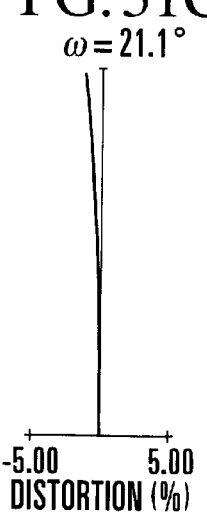
Figure 52A:
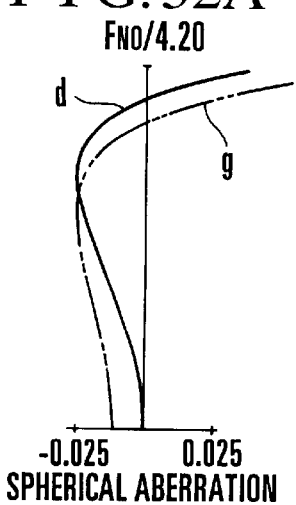
FIGS. 52A to 52C are graphic representations of the aberrations of the zoom lens of numerical example 13 in the telephoto end.
Figure 52B:
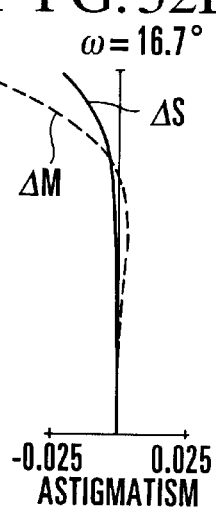
Figure 52C:
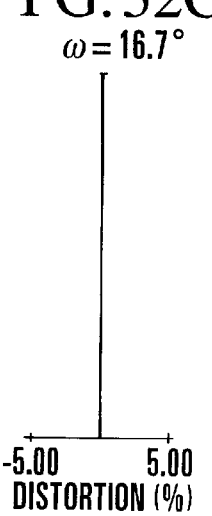

FIG. 49 in block diagram shows a zoom lens of numerical example 13, whose numerical data will be given later. FIGS. 50A to 50C through FIGS. 52A to 52C graphically show the aberrations of the zoom lens of FIG. 49 at the wide-angle end, a middle focal length position and the telephoto end, respectively.

Figure 53:
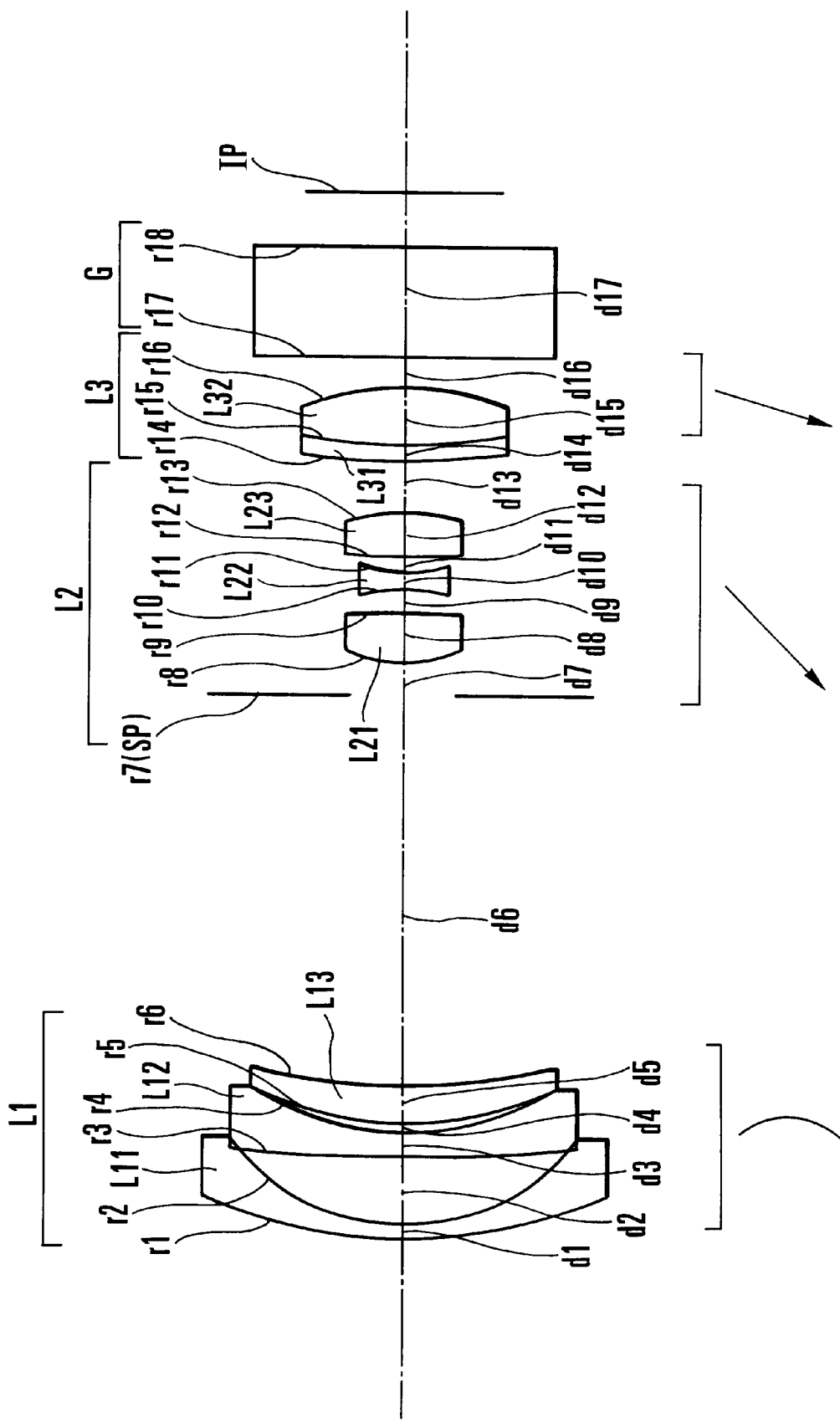
FIG. 53 is a longitudinal section view of a numerical example 14 of the zoom lens.
Figure 54A:
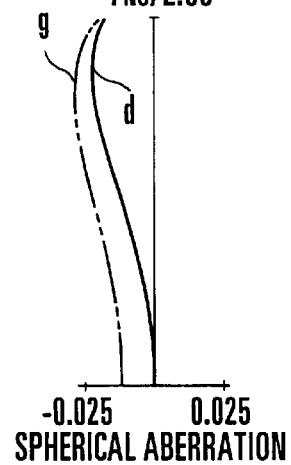
FIGS. 54A to 54C are graphic representations of the aberrations of the zoom lens of numerical example 14 in the wide-angle end.
Figure 54B:
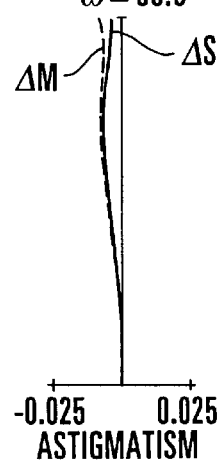
Figure 54C:
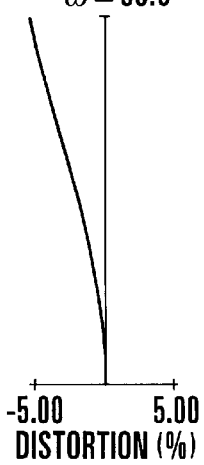
Figure 55A:
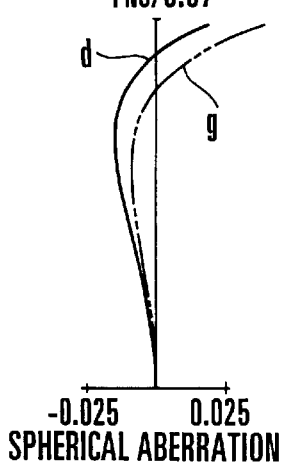
FIGS. 55A to 55C are graphic representations of the aberrations of the zoom lens of numerical example 14 in a middle focal-length position.
Figure 55B:
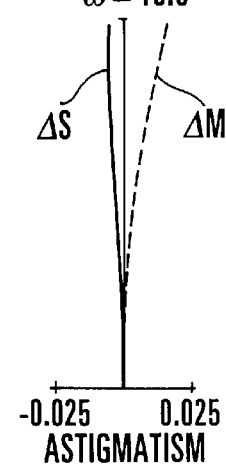
Figure 55C:
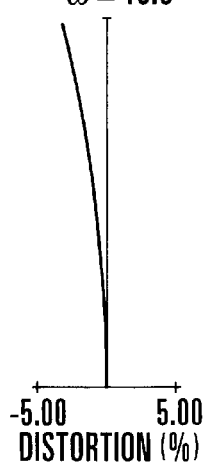
Figure 56A:
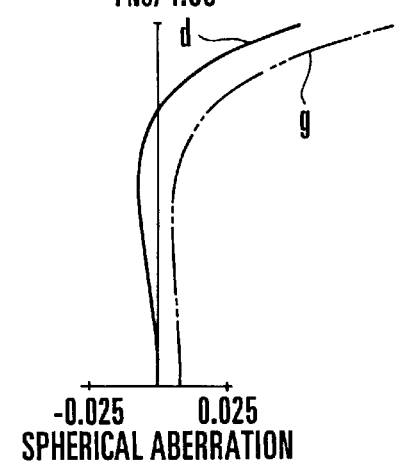
FIGS. 56A to 56C are graphic representations of the aberrations of the zoom lens of numerical example 14 in the telephoto end.
Figure 56B:
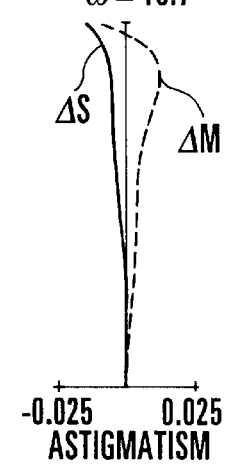
Figure 56C:
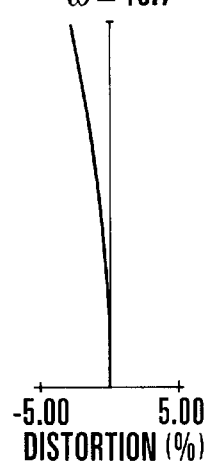

FIG. 53 in block-diagram form shows a zoom lens of numerical example 14, whose numerical data will be given later. FIGS. 54A to 54C through FIGS. 56A to 56C graphically show the aberrations of the zoom lens of FIG. 53 at the wide-angle end, a middle focal length position and the telephoto end, respectively.

Figure 57:
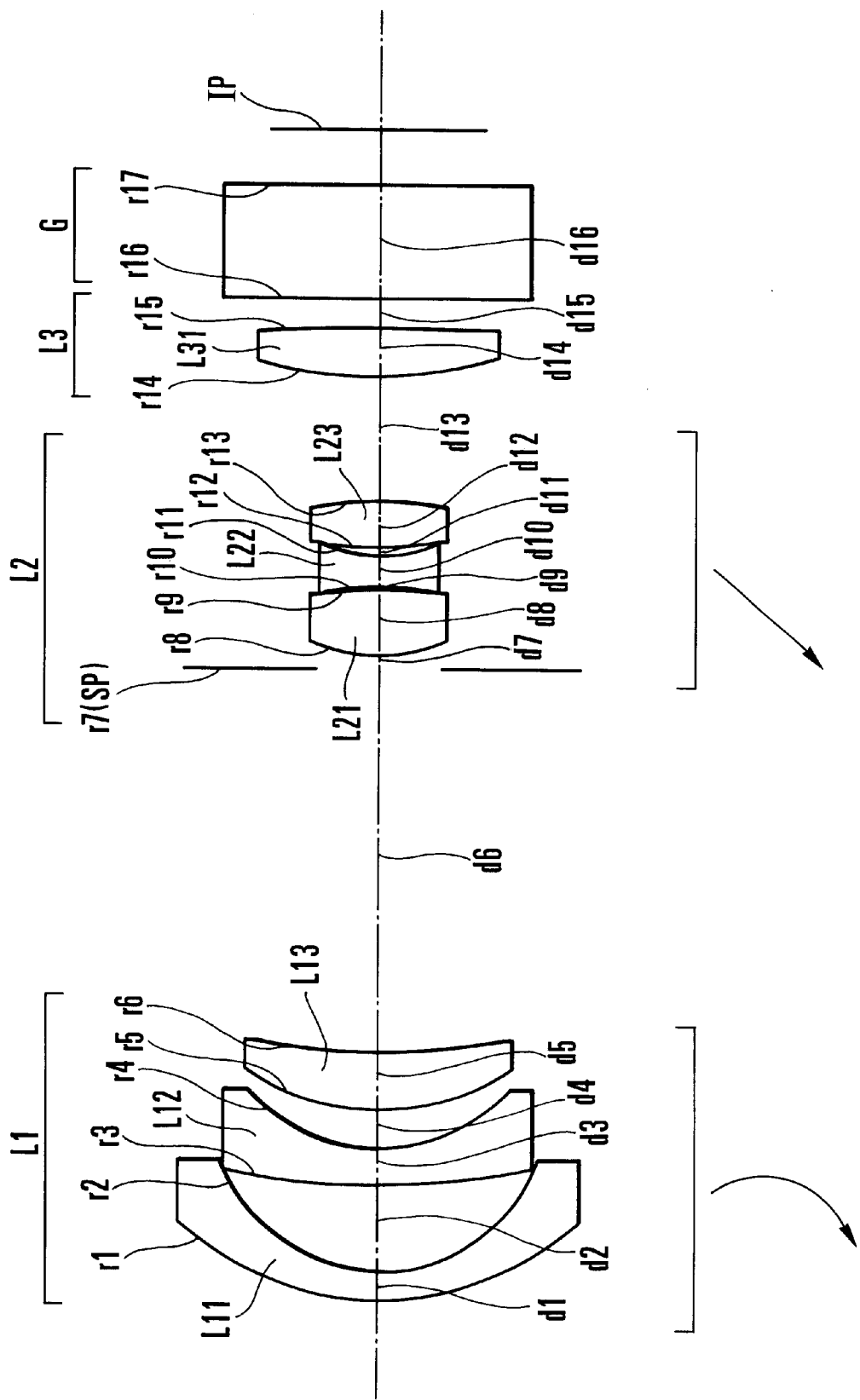
FIG. 57 is a longitudinal section view of a numerical example 15 of the zoom lens.
Figure 58A:
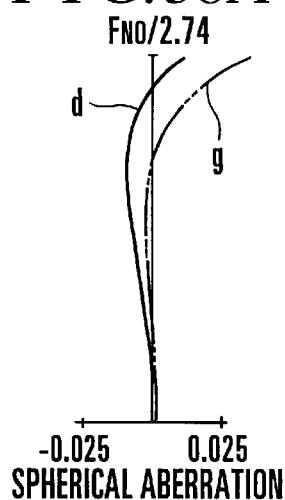
FIGS. 58A to 58C are graphic representations of the aberrations of the zoom lens of numerical example 15 in the wide-angle end.
Figure 58B:
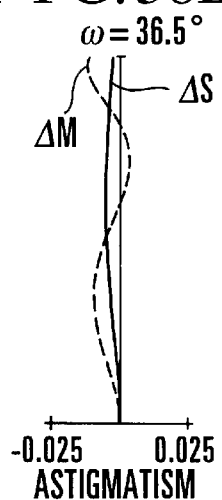
Figure 58C:
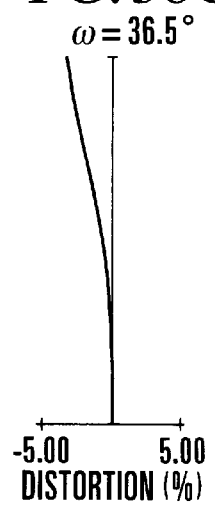
Figure 59A:
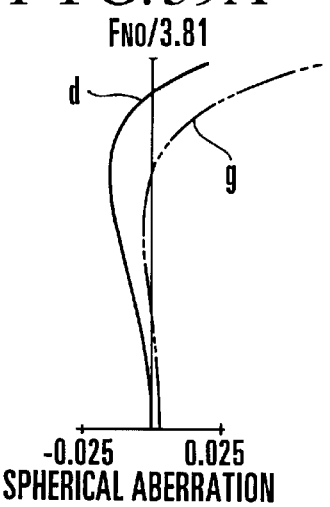
FIGS. 59A to 59C are graphic representations of the aberrations of the zoom lens of numerical example 15 in a middle focal-length position.
Figure 59B:
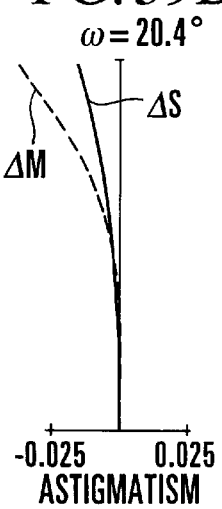
Figure 59C:
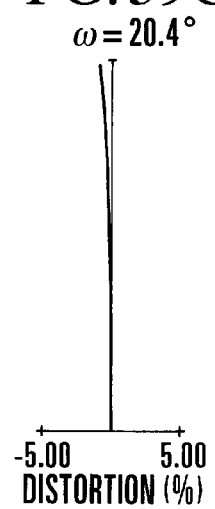
Figure 60A:
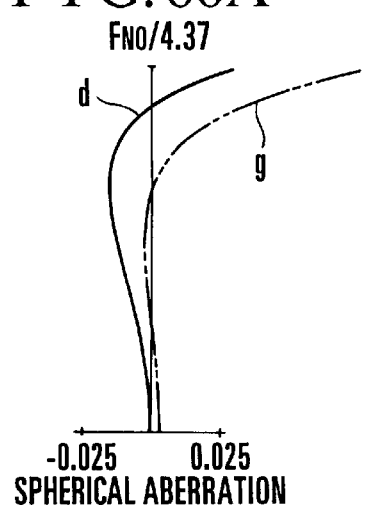
FIGS. 60A to 60C are graphic representations of the aberrations of the zoom lens of numerical example 15 in the telephoto end.
Figure 60B:
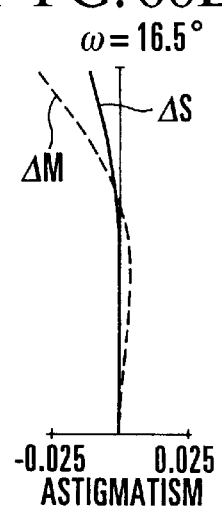
Figure 60C:
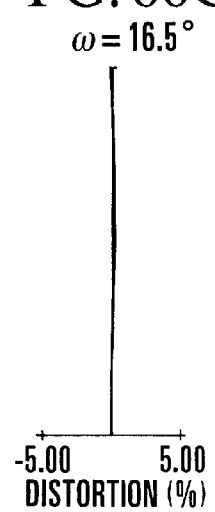

FIG. 57 in block-diagram form shows a zoom lens of numerical example 15, whose numerical data will be given later. FIGS. 58A to 58C through FIGS. 60A to 60C graphically show the aberrations of the zoom lens of FIG. 57 at the wide-angle end, a middle focal length position and the telephoto end, respectively.

Figure 61:
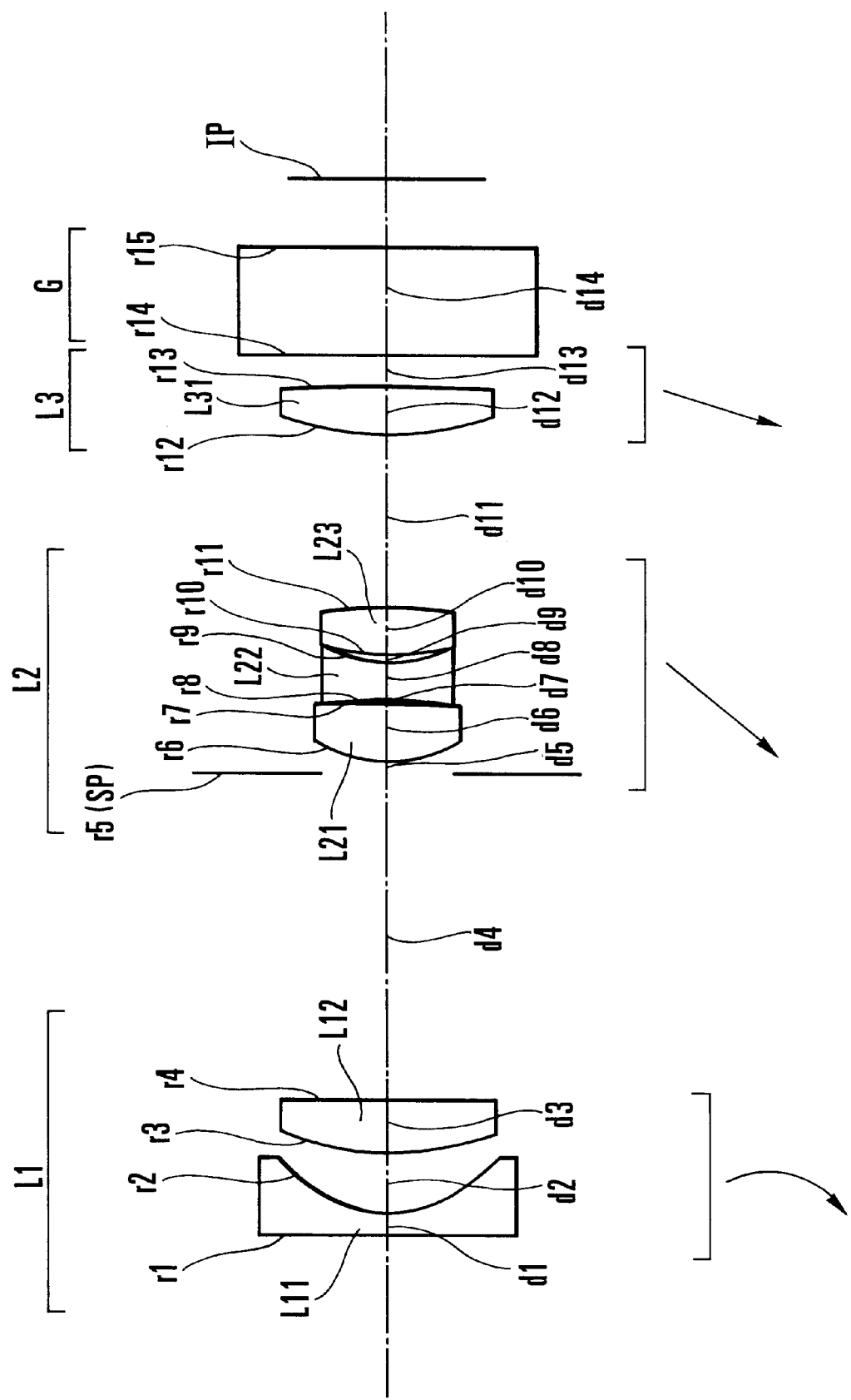
FIG. 61 is a longitudinal section view of a numerical example 16 of the zoom lens.
Figure 62A:
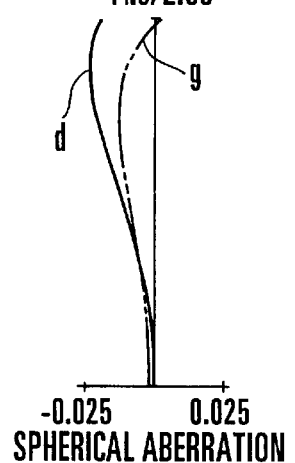
FIGS. 62A to 62C are graphic representations of the aberrations of the zoom lens of numerical example 16 in the wide-angle end.
Figure 62B:
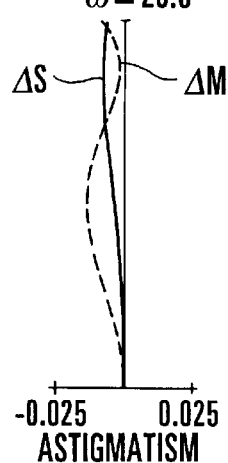
Figure 62C:
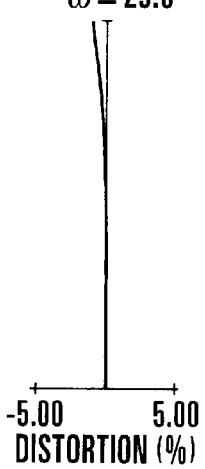
Figure 63A:
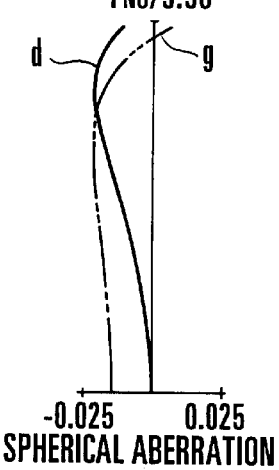
FIGS. 63A to 63C are graphic representations of the aberrations of the zoom lens of numerical example 16 in a middle focal-length position.
Figure 63B:
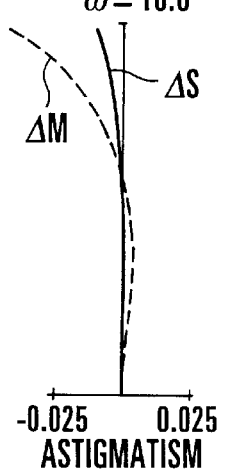
Figure 63C:
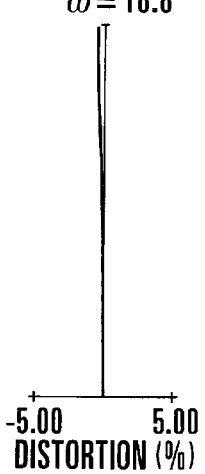
Figure 64A:
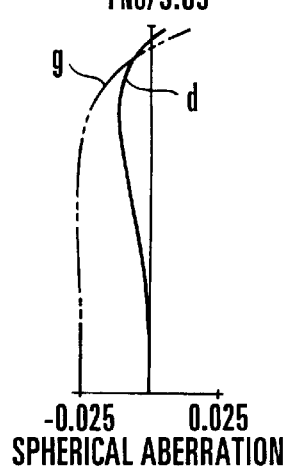
FIGS. 64A to 64C are graphic representations of the aberrations of the zoom lens of numerical example 16 in the telephoto end.
Figure 64B:
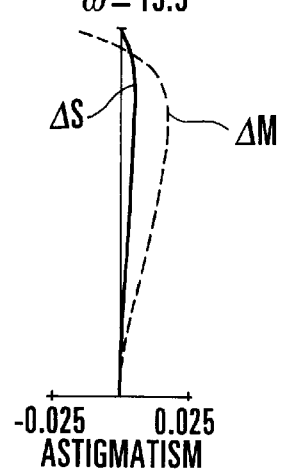
Figure 64C:
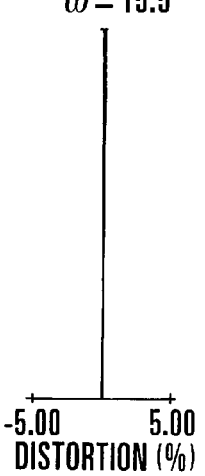

FIG. 61 in block-diagram form shows a zoom lens of numerical example 16, whose numerical data will be given later. FIGS. 62A to 62C through FIGS. 64A to 64C graphically show the aberrations of the zoom lens of FIG. 61 at the wide-angle end, a middle focal length position and the telephoto end, respectively.

Referring to the block diagrams of FIGS. 33, 37, 41, 45, 49, 53, 57 and 61, the zoom lens comprises, in order from an object side to an image side, a first lens unit L1 of negative refractive power, an aperture stop SP, a second lens unit L2 of positive refractive power and a third lens unit L3 of positive refractive power. IP stands for an image plane, and G stands for a glass block such as a filter or color separation prism.

In the zoom lenses of numerical examples 9 to 16, during zooming from the wide-angle end to the telephoto end, the second lens unit axially moves toward the object side, while simultaneously moving the first lens unit axially non-linearly to compensate for the shift of the image plane resulting from the zooming. As necessity arises, the third lens unit may be made to axially move toward the object side or toward the image side. Focusing is performed by moving the first lens unit or the third lens unit.

Next, each of the numerical examples 9 to 16 is described successively.

In the numerical example 9 shown in FIG. 33, the zoom lens is constructed with three lens units, i.e., in order from the object side to the image side, a first lens unit of negative refractive power, a second lens unit of positive refractive power and a third lens unit of positive refractive power. During zooming from the wide-angle end to the telephoto end, the first lens unit reciprocates almost completely in a locus convex toward the image side, and the second lens unit moves toward the object side. The third lens unit remains stationary during zooming.

The numerical example 9 is basically designed with the negative first lens unit and the positive second lens unit constituting the so-called wide-angle "short" zoom system. The focal length is varied by moving the positive second lens unit, and the shift of the image point with variation of the focal length is compensated for by reciprocating the negative first lens unit.

The positive third lens unit, which remains stationary during zooming, does not contribute to any variation of the focal length, but shares in an increase of the refractive power of the photographic lens due to the reduction of the size of the image sensor. As the use of the third lens unit decreases the refractive power of the short zoom system, composed of the first lens unit and the second lens unit, the aberrations that the constituent lenses of the first lens unit, in particular, produce are suppressed, thus achieving improvements of the optical performance.

Further, particularly for the photographic apparatus using the solid-state image pickup element, the lens system must be made telecentric in the image space. This is accomplished by having the positive third lens unit play the role of a field lens.

Further, the stop SP is disposed adjacent to the lens surface closest to the object side in the second lens unit, thereby reducing the distance between the entrance pupil and the first lens unit in the wide-angle region. This allows suppression of the increase of the diameter of the constituent lenses of the first lens unit and also enables the various off-axial aberrations on both sides of the stop in front of the positive second lens unit to be canceled by the first lens unit and the third lens unit. The optical performance is thus improved without having to increase the number of constituent lenses.

Further, in the numerical example 9, the negative first lens unit is constructed with, in order from the object side to the image side, two concave lenses (negative lenses) L11 and L12 having concave surfaces facing the image side and a convex lens (positive lens) L13 having a convex surface facing the object side. The positive second lens unit is constructed with, in order from the object side to the image side, a convex lens L21, a concave lens L22 and a convex lens L23, totaling three lenses. The positive third lens unit is constructed with, in order from the object side to the image side, a concave lens L31 and a convex lens L32 having a convex surface facing the object side.

In such a manner, all the lens units are constructed to bring the aberration correction into consistence with the desired refractive power arrangement, thus achieving improvements in the compact form of the lens system, while maintaining good performance. The negative first lens unit has a role of forming a pupil image with the off-axial principal ray at the center of the stop. Particularly at the wide-angle region, the oft-axial principal ray refracts to a large angle. Therefore, off-axial aberrations, especially, astigmatism and distortion, are liable to be produced.

On this account, as in the ordinary wide-angle lens system, such an arrangement is made that the diameter of the frontmost lens can be suppressed from increasing. Within the framework of this or a concave(negative)-convex (positive) arrangement in this order from the object side, a negative lens unit that takes a main share in the negative refractive power is made up from the two lenses L11 and L12, thus distributing the refractive power. All the constituent lenses of the first lens unit are formed to shapes approximately to the concentric spheres with the centers of curvature at the center of the stop.

The positive second lens unit is constructed in the form of the so-called "triplet". This is because the second lens unit moves a large distance during zooming. To prevent defects from occurring in manufacturing by decentering the lens units from one another due to the production tolerance, the second lens unit has in itself to get rid of spherical aberration and coma to some extent. The convex lens L21 closest to the object side in the second lens unit is formed to a convex shape toward the object side. Otherwise, the off-axial principal ray after having emerged from the first lens unit would refract greatly to produce various off-axial aberrations.

Further, the concave lens L22 is made to have a concave surface facing the image side. Together with the convex surface of the convex lens L23 that follows on the image side, the concave surface of the concave lens L22 forms a negative air lens, by which the spherical aberration, resulting from the increase of the relative aperture, is corrected. The positive third lens unit has the convex lens L32 in the form of the convex surface on the object side and plays a role of a field lens for making the system telecentric in the image space.

To achieve further improvements in the optical performance while minimizing the number of constituent lenses of each lens unit, aspheric surfaces are introduced with advantages in the numerical example 9. In the zoom lens of numerical example 9 shown in FIG. 33, the concave lens L11 constituting part of the first lens unit has its lens surface on the object side made aspherical in such a shape that the positive refractive power becomes progressively stronger toward the margin. Particularly for the wide-angle region, astigmatism and distortion are corrected by the aspheric surface. The convex lens L32 constituting part of the third lens unit has its lens surface on the image side made aspherical in such a shape that the positive refractive power becomes progressively weaker toward the margin, contributing to correction of various off-axial aberrations over the entire zooming range.

For distortion, usually, the barrel type at the wide-angle end gives rise to a problem. In the numerical example, this aspheric surface cooperates with the aspheric surface introduced to the first lens unit to correct the barrel distortion not only at the wide-angle end but also over the entire zooming range.

To focus the zoom lens of numerical example 9 onto an object at a shorter distance, good performance is obtained by axially moving the first lens unit toward the object side. However, it is more desirable that the third lens unit alone is made to axially move toward the object side. This allows the zooming and focusing movements to separate from each other. Therefore, the first lens unit and the second unit can be made to move in differential relation by a cam or like simple linkage, thus making it possible to simplify the structure of the construction of the operating mechanism.

The numerical example 9 provides a zoom lens whose range is 2.5 with an aperture ratio of 2.8 to 4.0.

Next, the zoom lens of numerical example 10 shown in FIG. 37 is described. The zoom lens of numerical example 10 is similar in the negative-positive-positive refractive power arrangement to the numerical example 9. However, as indicated by the arrows in FIG. 37, during zooming from the wide-angle end to the telephoto end, the first lens unit reciprocates along a locus convex to the image side, the second lens unit moves toward the object side, and the third lens unit moves to the image side. While, in the numerical example 9, the third lens unit is made to remain stationary during zooming, the third lens unit may be made to move during zooming, as in the numerical example 10. Now, assuming that the third lens unit moves during zooming, then, letting the back focal distance be denoted by sk', letting the focal length of the third lens unit be denoted by f3 and letting the image magnification of the third lens unit be denoted by $\beta 3$, the following relationship is obtained:

$$sk'=f3(1-\beta 3)$$

where $0<\beta 3<1.0$.

Suppose here that the direction in which the third lens unit moves during zooming from the wide-angle end to the telephoto end is toward the image side, then the back focal distance sk' decreases. Hence, the image magnification $\beta 3$ increases on the telephoto side.

Then, as a result, the third lens unit shares in varying the focal length, giving the advantage of reducing the zooming movement of the second lens unit. This leads to a reduced space for that purpose, thus contributing to a decrease of the size of the lens system. As the third lens unit is made to move for focusing onto an object at a shorter distance, it becomes impossible to separate out the zooming and focusing movements. However, if the camera has a memory in which to store the locus of zooming movement for every object distance, or the so-called "electronic cam", or if a means is provided for compensating for the image shift with zooming by auto-focus, the operating mechanism will remain as simple as when the third lens unit is fixed.

The concave lens L11 closest to the object side in the negative first lens unit has an aspheric surface of such a shape that the negative refractive power becomes progressively weaker toward the margin. Similar to the zoom lens of numerical example 9, astigmatism and distortion are advantageously corrected at the wide-angle end. Also, the lens surface on the image side of the convex lens L23 constituting part of the second lens unit is formed to such an aspheric shape that the positive refractive power becomes progressively weaker toward the margin. The spherical aberration that becomes prominent when the relative aperture increases is thus advantageously corrected.

The positive third lens unit is constructed with one convex lens L31 having a convex surface facing the object side, thus assuring a further shortening of the total length of the complete lens, while still keeping the telecentric system in the image space. Also, the lens surface on the object side of the convex lens L31 is formed, similarly to the zoom lens of numerical example 9, to such an aspheric shape that the positive refractive power becomes progressively weaker toward the margin. Various off-axial aberrations are advantageously corrected throughout the entire zooming range.

The numerical example 10 provides a zoom lens whose range is 2.5 with an aperture ratio of 2.5 to 3.8 or thereabout.

Next, the zoom lens of numerical example 11 shown in FIG. 41 is described. The zoom lens of numerical example 11 is similar in the nagative-positive-positive refractive power arrangement to the numerical example 9. However, as indicated by the arrows in FIG. 41, during zooming from the wide-angle end to the telephoto end, the first lens unit reciprocates along a locus convex toward the image side, the second lens unit moves toward the object side, and the third lens unit moves toward the object side.

To adapt the application of the zoom lens to a camera using the solid-state image pickup element, it is desired that the telecentric image space is kept throughout the entire zooming range. In the zoom lens of numerical example 11, the second lens unit with inclusion of the stop moves to effect zooming. Therefore, the exit pupil position is caused to change. On this account, the positive third lens unit is made movable toward the object side, thus canceling the shift of the exit pupil position caused by zooming.

The numerical example 11 provides a zoom lens whose range is 2.5 with an aperture ratio of 2.8 to 4.0 or thereabout.

The zoom lens of numerical example 12 shown in FIG. 45 is basically designed to a zoom type similar to the zoom lens of numerical example 11.

The numerical example 12 provides a zoom lens whose range is 2.5 with an aperture ratio of 2.8 to 4.0 or thereabout.

The zoom lens of numerical example 13 shown in FIG. 49 is basically designed to a zoom type similar to the zoom lens of numerical example 11. In the numerical example 13, the third lens unit is constructed with a cemented lens composed of a negative lens and a positive lens.

The numerical example 13 provides a zoom lens whose range is 2.5 with an aperture ratio of 2.8 to 4.0 or thereabout.

The zoom lens of numerical example 14 shown in FIG. 53 is basically designed to a zoom type similar to the zoom lens of numerical example 11. In the numerical example 14, too, the third lens unit is constructed with a cemented lens composed of a negative lens and a positive lens.

In the numerical example 14, the lens surface on the object side of the concave lens L12 in the negative first lens unit is formed to such an aspheric shape that the positive refractive power becomes progressively stronger toward the margin. Similarly to the zoom lens of numerical example 9, astigmatism and distortion are advantageously corrected in the wide-angle region.

The numerical example 14 provides a zoom lens whose range is 2.5 with an aperture ratio of 2.8 to 4.0 or thereabout.

In the numerical example 14, the aspheric surface is defined by an axial deviation "X" from the vertex of the surface as the reference at a height "h" from an optical axis, as follows:

$$X=R[1-\sqrt{1-(1+K)h^2/R^2}]+Bh^4+Ch^6$$

where R is the radius of the osculating sphere, and K, B and C are the aspheric coefficients.

Next, the zoom lens of numerical example 15 shown in FIG. 57 is basically designed as a zoom type similar to the zoom lens of numerical example 9. In the numerical example 15, the lens surface on the image side of the concave lens L12 in the negative first lens unit is formed to such an aspheric shape that the negative refractive power becomes progressively weaker toward the margin. Similar to the zoom lens of numerical example 9, astigmatism and distortion are advantageously corrected in the wide-angle region. The third lens unit is constructed with a positive lens of bi-convex form.

The numerical example 15 provides a zoom lens whose range is 2.5 with an aperture ratio of 2.8 to 4.0 or thereabout.

The zoom lens of numerical example 16 shown in FIG. 61 is basically designed as a zoom type similar to the zoom lens of numerical example 11. In the numerical example 16, with an aim of further reducing the size of the zoom lens in the encapsulated state, the number of constituent lenses is decreased. For this purpose, the negative first lens unit is constructed with a concave lens having a concave surface facing the image side and a convex lens having a convex surface facing the object side. The lens surface on the image side of the concave lens is formed to such an aspheric shape that the negative refractive power becomes progressively weaker toward the margin. Similarly to the zoom lens of numerical example 9, astigmatism and distortion are advantageously corrected in the wide-angle region. The third lens unit is constructed with one convex lens having a convex surface facing the object side, thereby assuring a further shortening of the size of the complete lens. Also, the lens surface on the object side of the convex lens is formed, similarly to the numerical example 9, to such an aspheric shape that the positive refractive power becomes progressively weaker toward the margin. Various off-axial aberrations are advantageously corrected throughout the entire zooming range.

The numerical example 15 provides a zoom lens whose range is 2 with an aperture ratio of 2.8 to 3.8 or thereabout.

It should be noted here that the total zooming movement of the third lens unit is desired to lie within the following range:

$$-0.3 < \frac{m}{\sqrt{fw \cdot ft}} < 0.3 \quad (5)$$

where m: the movement of the third lens unit from the wide-angle end to the telephoto end;
fw: the focal length of the entire lens system at the wide-angle end; and
ft; the focal length of the entire lens system at the telephoto end.

The inequalities of condition (5) are concerned with the share in varying the focal length by the movement of the third lens unit and the cancellation of the shift of the exit pupil position. When the third lens unit moves toward the object side beyond the lower limit, the shift of the exit pupil position can be canceled, but the magnification of the third lens unit drops extremely in the telephoto region. To obtain the desired zoom ratio, therefore, the movement of the second lens unit must be increased. This is objectionable because the total length of the complete lens increases.

Conversely when the third lens unit moves toward the image side beyond the upper limit, the magnification of the third lens unit becomes large in the telephoto region. So, the movement of the second lens unit can be decreased, but the exit pupil position shifts in the same direction as that resulting from the movement of the second lens unit including the stop. Therefore, the image space can no longer be kept telecentric, causing the zoom lens to become unsuitable to the photographic apparatus using the solid-state image pickup element.

The numerical data for the numerical examples 9 to 16 are given in tables below.

The aspheric surface is defined by an axial deviation "X" from the vertex of the surface as the reference at a height "h" from an optical axis, as follows:

$$X=R[1-\sqrt{1-h^2/R^2}]+Bh^4+Ch^6+Dh^8+Eh^{10}+Fh^{12}$$

where R is the radius of the osculating sphere, and B, C, D, E and F are the aspheric coefficients.

Numerical Example 9 f = 1.00 ~ 2.48    Fno = 1:2.83 ~ 4.20    2ω = 73.86 ~ 33.69°

| | | | |
|---|---|---|---|
| *r 1 = 5.1364 | d 1 = 0.2004 | n1 = 1.74330 | ν1 = 49.2 |
| r 2 = 1.7637 | d 2 = 0.6389 | | |
| r 3 = 20.1622 | d 3 = 0.1754 | n2 = 1.69680 | ν2 = 55.5 |
| r 4 = 1.9267 | d 4 = 0.1503 | | |
| r 5 = 2.8657 | d 5 = 0.4259 | n3 = 1.84666 | ν3 = 23.8 |
| r 6 = 12.4953 | d 6 = Variable | | |
| r 7 = (Stop) | d 7 = 0.1002 | | |
| r 8 = 1.0517 | d 8 = 0.4259 | n4 = 1.83400 | ν4 = 37.2 |
| r 9 = −96.0772 | d 9 = 0.0401 | | |
| r 10 = −3.8744 | d 10 = 0.1253 | n5 = 1.80518 | ν5 = 25.4 |
| r 11 = 0.9252 | d 11 = 0.1152 | | |
| r 12 = 2.0564 | d 12 = 0.3507 | n6 = 1.72000 | ν6 = 50.2 |
| r 13 = −2.9654 | d 13 = Variable | | |
| r 14 = −2.4945 | d 14 = 0.1253 | n7 = 1.69895 | ν7 = 30.1 |
| r 15 = −7.1105 | d 15 = 0.0326 | | |
| r 16 = 2.5129 | d 16 = 0.4760 | n8 = 1.67790 | ν8 = 55.3 |
| *r 17 = −5.0857 | d 17 = 0.2505 | | |
| r 18 = ∞ | d 18 = 0.8769 | n9 = 1.51633 | ν9 = 64.1 |
| r 19 = ∞ | | | |

*Aspheric Surface

| Variable | Focal Length | | |
|---|---|---|---|
| Separation | 1.00 | 1.89 | 2.48 |
| d 6 | 3.26 | 1.09 | 0.51 |
| d 13 | 0.77 | 1.86 | 2.59 |

Aspheric Coefficients

| | | | |
|---|---|---|---|
| r1: | $B = 1.41622 \times 10^{-2}$ | $C = -1.25909 \times 10^{-3}$ | $D = 4.31017 \times 10^{-4}$ |
| | $E = 0$ | $F = 0$ | |
| r17: | $B = 2.88443 \times 10^{-2}$ | $C = 1.55249 \times 10^{-2}$ | $D = 1.66463 \times 10^{-2}$ |
| | $E = 0$ | $F = 0$ | |

Numerical Example 10

$f = 1.00 \sim 2.49 \quad \text{Fno} = 1:2.53 \sim 4.04 \quad 2\omega = 73.31 \sim 33.22°$

| | | | |
|---|---|---|---|
| r 1 = 4.9611 | d 1 = 0.2729 | n1 = 1.67790 | ν1 = 55.3 |
| *r 2 = 1.4241 | d 2 = 0.4217 | | |
| r 3 = 5.5014 | d 3 = 0.1488 | n2 = 1.77250 | ν2 = 49.6 |
| r 4 = 1.4666 | d 4 = 0.3324 | | |
| r 5 = 1.9844 | d 5 = 0.4465 | n3 = 1.84666 | ν3 = 23.8 |
| r 6 = 4.9611 | d 6 = Variable | | |
| r 7 = (Stop) | d 7 = 0.0992 | | |
| r 8 = 1.2270 | d 8 = 0.4217 | n4 = 1.83400 | ν4 = 37.2 |
| r 9 = 7.9693 | d 9 = 0.0580 | | |
| r 10 = −4.8969 | d 10 = 0.3969 | n5 = 1.80518 | ν5 = 25.4 |
| r 11 = 1.0982 | d 11 = 0.0509 | | |
| r 12 = 1.6085 | d 12 = 0.3721 | n6 = 1.69350 | ν6 = 53.2 |
| *r 13 = −2.9553 | d 13 = Variable | | |
| *r 14 = 3.0851 | d 14 = 0.3721 | n7 = 1.58313 | ν7 = 59.4 |
| r 15 = −24.8055 | d 15 = 0.4961 | | |
| r 16 = ∞ | d 16 = 0.8682 | n8 = 1.51633 | ν8 = 64.1 |
| r 17 = ∞ | | | |

*Aspheric Surface

| Variable | Focal Length | | |
|---|---|---|---|
| Separation | 1.00 | 1.96 | 2.49 |
| d 6 | 3.02 | 1.12 | 0.69 |
| d 13 | 0.92 | 2.53 | 3.38 |

Aspheric Coefficients

| | | | |
|---|---|---|---|
| r2: | $B = -4.38413 \times 10^{-2}$ | $C = 5.71643 \times 10^{-3}$ | $D =$ |
| | $E = 1.91194 \times 10^{-2}$ | $F = -6.99028 \times 10^{-3}$ | $-3.22625 \times 10^{-2}$ |
| r13: | $B = 3.53749 \times 10^{-2}$ | $C = 1.52097 \times 10^{-2}$ | $D =$ |
| | $E = -3.44719 \times 10^{-2}$ | $F = -9.29317 \times 10^{-4}$ | $-2.84025 \times 10^{-2}$ |
| r14: | $B = -5.80070 \times 10^{-3}$ | $C = -4.76824 \times 10^{-3}$ | $D =$ |
| | $E = -7.15811 \times 10^{-3}$ | $F = 0$ | $1.13959 \times 10^{-2}$ |

Numerical Example 11

$f = 1.00 \sim 2.51 \quad \text{Fno} = 1:2.53 \sim 3.89 \quad 2\omega = 73.54 \sim 33.19°$

| | | | |
|---|---|---|---|
| *r 1 = 4.9822 | d 1 = 0.2740 | n1 = 1.67790 | ν1 = 55.3 |
| r 2 = 1.4332 | d 2 = 0.4235 | | |
| r 3 = 5.5404 | d 3 = 0.1495 | n2 = 1.77250 | ν2 = 49.6 |
| r 4 = 1.4714 | d 4 = 0.3338 | | |
| r 5 = 1.9929 | d 5 = 0.4484 | n3 = 1.84666 | ν3 = 23.8 |
| r 6 = 4.9822 | d 6 = Variable | | |
| r 7 = (Stop) | d 7 = 0.0996 | | |
| r 8 = 1.2359 | d 8 = 0.4235 | n4 = 1.83400 | ν4 = 37.2 |
| r 9 = 8.2906 | d 9 = 0.0583 | | |
| r 10 = −4.7936 | d 10 = 0.3986 | n5 = 1.80518 | ν5 = 25.4 |
| r 11 = 1.1086 | d 11 = 0.0511 | | |
| r 12 = 1.6379 | d 12 = 0.3737 | n6 = 1.69350 | ν6 = 53.2 |
| *r 13 = −2.9030 | d 13 = Variable | | |
| *r 14 = 3.1077 | d 14 = 0.3737 | n7 = 1.58313 | ν7 = 59.4 |
| r 15 = −24.9110 | d 15 = 0.2491 | | |
| r 16 = ∞ | d 16 = 0.8719 | n8 = 1.51633 | ν8 = 64.1 |
| r 17 = ∞ | | | |

*Aspheric Surface

| Variable | Focal Length | | |
|---|---|---|---|
| Separation | 1.00 | 2.00 | 2.51 |
| d 6 | 3.07 | 0.96 | 0.53 |
| d 13 | 0.93 | 2.35 | 3.10 |

Aspheric Coefficients

| | | | |
|---|---|---|---|
| r1: | $B = -4.30972 \times 10^{-2}$ | $C = 5.65407 \times 10^{-3}$ | $D =$ |
| | $E = 1.83623 \times 10^{-2}$ | $F = -6.59455 \times 10^{-3}$ | $-3.13224 \times 10^{-2}$ |
| r13: | $B = 3.22721 \times 10^{-2}$ | $C = 1.83486 \times 10^{-2}$ | $D =$ |
| | $E = -4.57574 \times 10^{-2}$ | $F = -1.09165 \times 10^{-3}$ | $-3.44518 \times 10^{-2}$ |
| r14: | $B = -6.09119 \times 10^{-3}$ | $C = -2.89751 \times 10^{-3}$ | $D =$ |
| | $E = -5.23722 \times 10^{-3}$ | $F = 0$ | $8.16177 \times 10^{-3}$ |

Numerical Example 12

$f = 1.00 \sim 2.51 \quad \text{Fno} = 1:2.83 \sim 4.20 \quad 2\omega = 73.88 \sim 33.40°$

| | | | |
|---|---|---|---|
| *r 1 = 3.6733 | d 1 = 0.1755 | n1 = 1.74330 | ν1 = 49.2 |
| r 2 = 1.7750 | d 2 = 0.6316 | | |
| r 3 = 29.0921 | d 3 = 0.1504 | n2 = 1.69680 | ν2 = 55.5 |
| r 4 = 1.6035 | d 4 = 0.3008 | | |
| r 5 = 2.2063 | d 5 = 0.4261 | n3 = 1.84666 | ν3 = 23.8 |
| r 6 = 4.6132 | d 6 = Variable | | |
| r 7 = (Stop) | d 7 = 0.1003 | | |
| r 8 = 1.2326 | d 8 = 0.4261 | n4 = 1.83400 | ν4 = 37.2 |
| r 9 = ∞ | d 9 = 0.2256 | | |
| r 10 = −2.2424 | d 10 = 0.1253 | n5 = 1.80518 | ν5 = 25.4 |
| r 11 = 1.1211 | d 11 = 0.0727 | | |
| r 12 = 2.0234 | d 12 = 0.4261 | n6 = 1.69680 | ν6 = 55.5 |
| r 13 = −2.0234 | d 13 = Variable | | |
| *r 14 = 2.8544 | d 14 = 0.4010 | n7 = 1.58313 | ν7 = 59.4 |
| r 15 = −25.0644 | d 15 = 0.2506 | | |
| r 16 = ∞ | d 16 = 0.8773 | n8 = 1.51633 | ν8 = 64.1 |
| r 17 = ∞ | | | |

*Aspheric Surface

| Variable | Focal Length | | |
|---|---|---|---|
| Separation | 1.00 | 1.94 | 2.51 |
| d 6 | 3.12 | 1.00 | 0.48 |
| d 13 | 0.82 | 2.01 | 2.79 |

Aspheric Coefficients

| | | | |
|---|---|---|---|
| r1: | $B = 1.67391 \times 10^{-2}$ | $C = -2.82778 \times 10^{-3}$ | $D = 1.12530 \times 10^{-3}$ |
| | $E = 0$ | $F = 0$ | |

-continued

| r14: | B = −1.28648 × $10^{-2}$ | C = 6.09500 × $10^{-3}$ | D = −2.68119 × $10^{-3}$ |
|---|---|---|---|
|  | E = 0 | F = 0 |  |

Numerical Example 13

| f = 1.00~2.48 | Fno = 1:2.83~4.20 | 2ω = 73.38~33.40° |  |
|---|---|---|---|
| *r1 = 3.6628 | d1 = 0.1739 | n1 = 1.74330 | υ1 = 49.2 |
| r2 = 1.7259 | d2 = 0.5837 |  |  |
| r3 = 26.0395 | d3 = 0.1490 | n2 = 1.69680 | υ2 = 55.5 |
| r4 = 1.5460 | d4 = 0.3229 |  |  |
| r5 = 2.0099 | d5 = 0.4223 | n3 = 1.84666 | υ3 = 23.8 |
| r6 = 4.0564 | d6 = Variable |  |  |
| r7 = (Stop) | d7 = 0.0994 |  |  |
| r8 = 1.0506 | d8 = 0.4223 | n4 = 1.83400 | υ4 = 37.2 |
| r9 = −21.9370 | d9 = 0.0472 |  |  |
| r10 = −2.9576 | d10 = 0.1242 | n5 = 1.76182 | υ5 = 26.5 |
| r11 = 0.9251 | d11 = 0.1292 |  |  |
| r12 = 2.6706 | d12 = 0.3477 | n6 = 1.69680 | υ6 = 55.5 |
| r13 = −2.5424 | d13 = Variable |  |  |
| r14 = 2.5056 | d14 = 0.1242 | n7 = 1.83400 | υ7 = 37.2 |
| r15 = 1.6368 | d15 = 0.5216 | n8 = 1.58313 | υ8 = 59.4 |
| *r16 = −15.3074 | d16 = 0.2484 |  |  |
| r17 = ∞ | d17 = 0.8694 | n9 = 1.51633 | υ9 = 64.1 |
| r18 = ∞ |  |  |  |

*: Aspheric Surface

| Variable | Focal Length |  |  |
|---|---|---|---|
| Separation | 1.00 | 1.93 | 2.48 |
| d 6 | 3.13 | 1.04 | 0.52 |
| d 13 | 0.99 | 2.13 | 2.89 |

Aspheric Coefficients

| r1: | B = 1.65225 × $10^{-2}$ | C = −2.40186 × $10^{-3}$ | D = 1.19204 × $10^{-3}$ |
|---|---|---|---|
|  | E = 0 | F = 0 |  |
| r16: | B = 1.48893 × $10^{-2}$ | C = 2.63343 × $10^{-4}$ | D = −6.89762 × $10^{-3}$ |
|  | E = 0 | F = 0 |  |

Numerical Example 14

| f = 1.00~2.50 | Fno = 1:2.83~4.00 | 2ω = 73.85~33.400 |  |
|---|---|---|---|
| r1 = 4.1672 | d1 = 0.1252 | n1 = 1.77250 | υ1 = 49.6 |
| r2 = 1.8793 | d2 = 0.5260 |  |  |
| *r3 = 61.2771 | d3 = 0.2004 | n2 = 1.67790 | υ2 = 55.3 |
| r4 = 2.4636 | d4 = 0.0751 |  |  |
| r5 = 3.0536 | d5 = 0.3006 | n3 = 1.84666 | υ3 = 23.8 |
| r6 = 5.9656 | d6 = Variable |  |  |
| r7 = (Stop) | d7 = 0.2505 |  |  |
| r8 = 1.0229 | d8 = 0.4008 | n4 = 1.83400 | υ4 = 37.2 |
| r9 = −65.7096 | d9 = 0.2004 |  |  |
| r10 = −1.6603 | d10 = 0.1252 | n5 = 1.80518 | υ5 = 25.4 |
| r11 = 0.9872 | d11 = 0.1252 |  |  |
| r12 = 3.3823 | d12 = 0.3757 | n6 = 1.77250 | υ6 = 49.6 |
| r13 = −1.6440 | d13 = Variable |  |  |
| r14 = 6.2086 | d14 = 0.1252 | n7 = 1.84666 | υ7 = 23.8 |
| r15 = 4.5716 | d15 = 0.4509 | n8 = 1.48749 | υ8 = 70.2 |
| r16 = −2.5107 | d16 = 0.2505 |  |  |
| r17 = ∞ | d17 = 0.8767 | n9 = 1.51633 | υ9 = 64.1 |
| r18 = ∞ |  |  |  |

*: Aspheric Surface

| Variable | Focal Length |  |  |
|---|---|---|---|
| Separation | 1.00 | 2.09 | 2.50 |
| d 6 | 3.12 | 0.66 | 0.27 |
| d 13 | 0.40 | 1.46 | 1.91 |

Aspheric Coefficients r3: K=−7.30444×$10^{-2}$ B=1.11469×$10^{-2}$ D=3.60930×$10^{-4}$

Numerical Example 15

| f = 1.00 ~ 2.49 | Fno = 1:2.74 ~ 4.37 | 2ω = 73.11 ~ 33.11° |  |
|---|---|---|---|
| r 1 = 2.5060 | d 1 = 0.1977 | n1 = 1.77250 | υ1 = 49.6 |
| r 2 = 1.3592 | d 2 = 0.6920 |  |  |
| r 3 = 6.2431 | d 3 = 0.2966 | n2 = 1.67790 | υ2 = 55.3 |
| *r 4 = 1.2032 | d 4 = 0.2966 |  |  |
| r 5 = 1.9771 | d 5 = 0.4448 | n3 = 1.84666 | υ3 = 23.8 |
| r 6 = 4.9427 | d 6 = Variable |  |  |
| r 7 = (Stop) | d 7 = 0.0989 |  |  |
| r 8 = 1.2376 | d 8 = 0.5190 | n4 = 1.83400 | υ4 = 37.2 |
| r 9 = −5.0046 | d 9 = 0.0321 |  |  |
| r 10 = −2.4294 | d 10 = 0.2471 | n5 = 1.80518 | υ5 = 25.4 |
| r 11 = 1.0998 | d 11 = 0.0696 |  |  |
| r 12 = 2.5210 | d 12 = 0.3707 | n6 = 1.69680 | υ6 = 55.5 |
| r 13 = −2.5210 | d 13 = Variable |  |  |
| *r 14 = 3.0472 | d 14 = 0.3954 | n7 = 1.58313 | υ7 = 59.4 |
| r 15 = −24.7136 | d 15 = 0.2471 |  |  |
| r 16 = ∞ | d 16 = 0.8650 | n8 = 1.51633 | υ8 = 64.1 |
| r 17 = ∞ |  |  |  |

*Aspheric Surface

| Variable | Focal Length |  |  |
|---|---|---|---|
| Separation | 1.00 | 1.99 | 2.49 |
| d6 | 3.01 | 0.97 | 0.54 |
| d13 | 0.95 | 2.34 | 3.08 |

Aspheric Coefficients

| r4: | B = −7.51656 × $10^{-2}$ | C = −2.80215 × $10^{-2}$ | D = 4.74401 × $10^{-3}$ |
|---|---|---|---|
|  | E = −2.89948 × $1^{-2}$ | F = 0 |  |
| r14: | B = −1.53234 × $10^{-2}$ | C = 1.37043 × $10^{-2}$ | D = −6.69772 × $10^{-3}$ |
|  | E = 0 | F = 0 |  |

Numerical Example 16

| f = 1.00 ~ 2.00 | Fno = 1:2.83 ~ 3.89 | 2ω = 58.13 ~ 31.07° | |
|---|---|---|---|
| r 1 = −25.0035 | d 1 = 0.1297 | n1 = 1.69350 | ν1 = 53.2 |
| *r 2 = 0.7392 | d 2 = 0.3475 | | |
| r 3 = 1.8875 | d 3 = 0.2964 | n2 = 1.76182 | ν2 = 26.5 |
| r 4 = 96.5942 | d 4 = Variable | | |
| r 5 = (Stop) | d 5 = 0.0741 | | |
| r 6 = 0.9204 | d 6 = 0.3335 | n3 = 1.80610 | ν3 = 40.9 |
| r 7 = 40.4339 | d 7 = 0.0269 | | |
| r 8 = −3.8499 | d 8 = 0.2223 | n4 = 1.76182 | ν4 = 26.5 |
| r 9 = 0.7735 | d 9 = 0.0454 | | |
| r 10 = 1.4832 | d 10 = 0.2779 | n5 = 1.71300 | ν5 = 53.8 |
| r 11 = −3.3887 | d 11 = Variable | | |
| *r 12 = 2.0816 | d 12 = 0.2779 | n6 = 1.58313 | ν6 = 59.5 |
| r 13 = −14.3201 | d 13 = 0.1853 | | |
| r 14 = ∞ | d 14 = 0.6485 | n7 = 1.51633 | ν7 = 64.1 |
| r 15 = ∞ | | | |

*Aspheric Surface

| Variable | Focal Length | | |
|---|---|---|---|
| Separation | 1.00 | 1.63 | 2.00 |
| d4 | 1.99 | 0.66 | 0.26 |
| d11 | 1.04 | 1.72 | 2.17 |

Aspheric Coefficients

| r2: | B = −2.88847 × 10⁻¹ | C = −6.73654 × 10⁻¹ | D = |
| | E = −3.70555 × 10⁻¹ | F = 0 | 1.58429 × 10⁻¹ |
| r12: | B = −4.2399 × 10⁻² | C = 3.87870 × 10⁻² | D = |
| | E = 1.78241 × 10⁻¹ | F = 0 | −1.15844 × 10⁻¹ |

The values of the factor in the condition (5) for the numerical examples 9 to 16 are listed in Table-3 below.

TABLE 3

| Condition | Numerical Example | | | |
|---|---|---|---|---|
| No. | 9 | 10 | 11 | 12 |
| (5) | 0 | 0.11 | −0.11 | −0.24 |
| Condition | Numerical Example | | | |
| No. | 13 | 14 | 15 | 16 |
| (5) | −0.24 | −0.24 | −0.08 | −0.23 |

The zoom lenses of numerical examples 9 to 16 have been designed by setting forth the rules described above, being suited to be used in the photographic apparatus using the solid-state image pickup element. It is thus made possible to achieve realization of a zoom lens of high range having an excellent optical performance with the number of constituent lenses in each lens unit lessened to improve its compact form.

In particular, a first lens unit of negative refractive power, a second lens unit of positive refractive power and a third lens unit of positive refractive power, totaling three lens units, are arranged in this order from the object side to the image side. By varying the separations between any two of the lens units, the focal length is varied. The first lens unit is constructed with, in order from the object side, two negative lenses and a positive lens, totaling three lenses. The second lens unit is Constructed with, in order from the object side, a positive lens, a negative lens and a positive lens, totaling three lenses. The third lens unit is constructed with at least one positive lens. Accordingly, in application to the photographic apparatus using the solid-state image pickup element, a great advantage is produced that the zoom lens, despite its having a high zoom ratio, is made excellent in the compact form and optical performance.

An aspheric surface is introduced into each of the lens units with a high efficiency, thereby giving other advantages that various off-axial aberrations, especially, astigmatism and distortion, can be corrected well and that, when the relative aperture is increased, spherical aberration can be effectively corrected.

Next, a photographing apparatus having any one of the zoom lenses of numerical examples 1 to 16 is described by reference to FIGS. 65A and 65B.

FIG. 65A is a front elevation view of the photographing apparatus and FIG. 65B is a longitudinal section view of the photographing apparatus. The photographing apparatus has a body (housing) 10 in which a zoom lens 11 of any of the numerical examples 1 to 16, a viewfinder optical system 12 and an image sensor 13 such as CCD are located.

In the above manner, the zoom lens of any of the numerical examples 1 to 16 is applied to a photographic optical system of the photographing apparatus, thus making it possible to realize a compact photographing apparatus having a good optical performance.

What is claimed:

1. A zoom lens comprising, in order from an object side to an image side:
    a first lens unit of negative optical power, said first lens unit having an aspherical lens of negative optical power;
    a stop;
    a second lens unit of positive optical power, said second lens unit having an aspherical lens of positive optical power; and
    a third lens unit of positive optical power,
    wherein, during a variation in magnification from a wide-angle end to a telephoto end, said second lens unit and said stop move in unison toward the object side, and said first lens unit so moves as to compensate for a shift of an image plane resulting from the variation in magnification,
    wherein said first lens unit is located closest to the object side among all of the lens units, and said second lens unit consists of two positive lens elements and one negative lens element.

2. A zoom lens according to claim 1, wherein said third lens unit consists of one positive lens.

3. A zoom lens according to claim 1, wherein said aspherical lens of said first lens unit is of meniscus form.

4. A zoom lens according to claim 1, wherein said aspherical lens of said first lens unit has an aspheric surface formed in one of the lens surfaces thereof which is smaller in radius of curvature.

5. A zoom lens according to claim 1, wherein said aspherical lens of said first lens unit is of meniscus form, and the following condition is satisfied:

$$1 < t/d < 2$$

where d is an axial thickness of said aspherical lens on an optical axis of said zoom lens, and t is a maximum thickness measured in a direction parallel to the optical axis at a maximum peripheral diameter at which said aspherical lens is mounted in a lens barrel.

6. A zoom lens comprising, in order from an object side to an image side;

a first lens unit of negative optical power, said first lens unit having, in order from the object side to the image side, a negative lens of meniscus form convex toward the object side, a negative lens of meniscus form convex toward the object side, and a positive lens of meniscus form convex toward the object side;

a second lens unit of positive optical power; and a third lens unit of positive optical power, wherein, during a variation in magnification from a wide-angle end to a telephoto end, said second lens unit moves toward the object side and said first lens unit so moves as to compensate for a shift of an image plane resulting from the variation in magnification, and wherein each of said first lens unit and said second lens unit has at least one aspherical lens, said zoom lens satisfying the following conditions:

$$-3 \leq f1/fw \leq -2$$

$$2 \leq f2/fw \leq 3$$

where f1 is a focal length of said first lens unit, f2 is a focal length of said second lens unit, and fw is a focal length of said zoom lens at the wide-angle end, and wherein said first lens unit is located closest to the object side among all of the lens units.

7. A zoom lens according to claim 6, further satisfying the following condition:

$$-2 \leq \beta 2T \leq -1$$

where β2T is an image magnification at the telephoto end of said second lens unit.

8. A zoom lens according to claim 6, wherein said second lens unit has a plurality of positive lenses, and the following condition is satisfied:

$$1.65 \leq n2ave \leq 2.0$$

where n2ave is an average refractive index of the plurality of positive lenses of said second lens unit.

9. A zoom lens according to claim 6, wherein said third lens unit is made movable during the variation in magnification.

10. A zoom lens according to claim 6, further comprising a stop disposed between said first lens unit and said second lens unit, wherein said stop moves in unison with said second lens unit the variation in magnification.

11. A zoom lens according to claim 6, wherein said second lens unit has an aspheric surface formed on a lens surface closest to the object side in said second lens unit.

12. A zoom lens according to claim 6, wherein the aspherical lens of said second lens unit is a positive lens.

13. A zoom lens according to claim 6, wherein said second lens unit has an aspheric surface formed on a lens surface closest to the image side in said second lens unit.

14. A zoom lens comprising, in order from an object side to an image side:

a first lens unit of negative optical power, said first lens unit consisting of, in order from the object side to the image side, a negative lens, a negative lens and a positive lens;

a second lens unit of positive optical power, said second lens unit having, in order from the object side to the image side, a positive lens, a negative lens and a positive lens; and a third lens unit of positive optical power, wherein a variation in magnification is effected by varying a separation between said first lens unit and said second lens unit, wherein said first lens unit is located closest to the object side among all of the lens units.

15. A zoom lens according to claim 14, wherein at least one of the two negative lenses of said first lens unit is a lens having a concave surface facing the image side, and the positive lens of said first lens unit is a lens having a convex surface facing the object side.

16. A zoom lens according to claim 15, wherein said first lens unit has a negative lens of meniscus form concave toward the image side, a negative lens of meniscus form concave toward the image side, and a positive lens of meniscus form convex toward the object side.

17. A zoom lens according to claim 14, wherein the positive lens closest to the object side of said second lens unit is a lens having a convex surface facing the object side, and the negative lens of said second lens unit is a lens having a concave surface facing the image side.

18. A zoom lens according to claim 17, wherein said second lens unit consists of, in order from the object side to the image side, a positive lens, a bi-concave negative lens, and a bi-convex positive lens.

19. A zoom lens according to claim 14, satisfying the following condition:

$$-0.3 < \frac{m}{\sqrt{fw \cdot ft}} < 0.3$$

where m is an amount of movement of said third lens unit required for a variation in magnification from a wide-angle end to a telephoto end, the amount of movement taking a positive sign when said third lens unit moves toward the image side, fw is a focal length of said zoom lens at the wide-angle end, and ft is a focal length of said zoom lens at the telephoto end.

20. A zoom lens according to claim 14, wherein said third lens unit has an aspherical lens.

21. A zoom lens comprising, in order from an object side to an image side:

a first lens unit of negative optical power, said first lens unit having, in order from the object side to the image side, a negative lens having a concave surface facing the image side and a positive lens;

a stop:

a second lens unit of positive optical power, said second lens unit consisting of, in order from the object side to the image side, a positive lens, a negative lens and a positive lens; and a third lens unit of positive optical power, wherein a variation in magnification is effected by varying a separation between said first lens unit and said second lens unit, said first lens unit is located closest to the object side among all of the lens units.

22. A zoom lens according to claim 21, wherein the positive lens of said first lens unit is a lens having a convex surface facing the object side.

23. A zoom lens according to claim 21, wherein the positive lens closest to the object side of said second lens unit is a lens having a convex surface facing the object side, and the negative lens of said second lens unit is a lens having a concave surface facing the image side.

24. A zoom lens according to claim 23, wherein said second lens unit consists of, in order from the object side to the image side, a positive lens, a bi-concave negative lens, and a bi-convex positive lens.

25. A zoom lens according to claim 21, satisfying the following condition:

$$-0.3 < \frac{m}{\sqrt{fw \cdot ft}} < 0.3$$

wherein m is an amount of movement of said third lens unit required for a variation in magnification from a wide-angle end to a telephoto end, the amount of movement taking a positive sign when said third lens unit moves toward the image side, fw is a focal length of said zoom lens at the wide-angle end, and ft is a focal length of said zoom lens at the telephoto end.

26. A zoom lens according to claim 21, wherein said third lens unit has an aspherical lens.

27. A photographing apparatus comprising a zoom lens according to any of claims 1 to 26 and 28 to 31, and an image pickup element which receives light from said zoom lens.

28. A zoom lens comprising in order from an object side to an image side:
   a first lens unit of negative optical power, said first lens unit being located closest to the object side among all lens units,
   a stop,
   a second lens unit of positive optical power, said second lens unit consisting of two positive lens elements and one negative lens element,
   a third lens unit of positive optical power,
   wherein spacing between said first lens unit and said second is varied for varying magnification, and
   at least one aspherical lens.

29. A zoom lens comprising in order from an object side to an image side,
   a first lens unit of negative optical power, said first lens unit having negative lens, a negative lens and a positive lens, and being located closest to the object side among all lens units,
   a stop,
   a second lens unit of positive optical power, said second lens unit consisting of, in order from the object side to the image side, a positive lens, a negative lens, and a positive lens, and
   a third lens unit of positive optical power,
   wherein a spacing between said first lens unit and said second lens unit is varied for varying magnification.

30. A zoom lens comprising in order from an object side to an image side,
   a first lens unit of negative optical power, said first lens unit having in order from the object side to the image side a negative lens, a negative lens and a positive lens, and being located closest to the object side among all lens units,
   a second lens unit of positive optical power, said second lens unit consisting of, in order from the object side to the image side, a positive lens, a negative lens and a positive lens, and
   a third lens unit of positive optical power,
   wherein a space between said first lens unit and said second lens unit is varied for varying magnification, and
   at least one aspherical lens.

31. A zoom lens comprising in order from an object side to an image side,
   a first lens unit of negative optical power, said first lens unit having in order from the object side to the image side a negative lens having a convex surface facing toward the image side, and a positive lens, and said first lens unit being located closest to the object side among all lens units,
   a second lens unit of positive optical power, said second lens unit consisting of, in order from the object side to the image side a positive lens, a negative lens, and a positive lens,
   a third lens unit of positive optical power,
   wherein the spacing between said first lens unit and said second lens unit is varied for varying magnification, and
   at least one aspherical lens.

* * * * *

UNITED STATES PATENT AND TRADEMARK OFFICE
CERTIFICATE OF CORRECTION

PATENT NO. : 6,308,011 B1
DATED : October 23, 2001
INVENTOR(S) : Fumihito Wachi et al.

It is certified that error appears in the above-identified patent and that said Letters Patent is hereby corrected as shown below:

Title page, Item [54] and Column 1, line 1,
"PHOTOGRAPHIC" should read -- PHOTOGRAPHING --.

Column 3,
Line 46, "telocentric" should read -- telecentric --.

Column 5,
Line 57, "DRAWING" should read -- DRAWINGS --.

Figure 13:
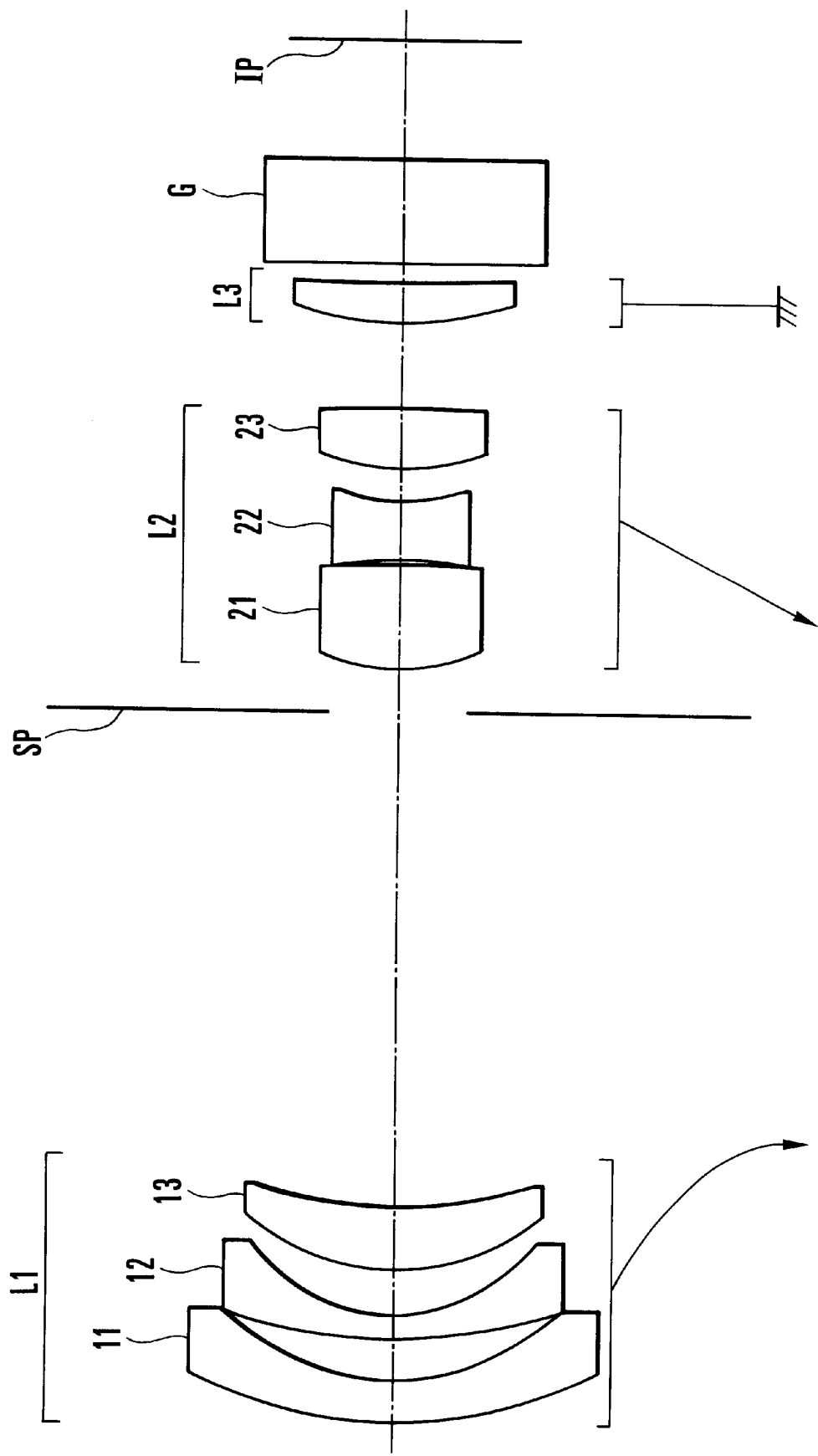
FIG. 13 is a longitudinal section view of a numerical example 4 of the zoom lens.
Figure 17:
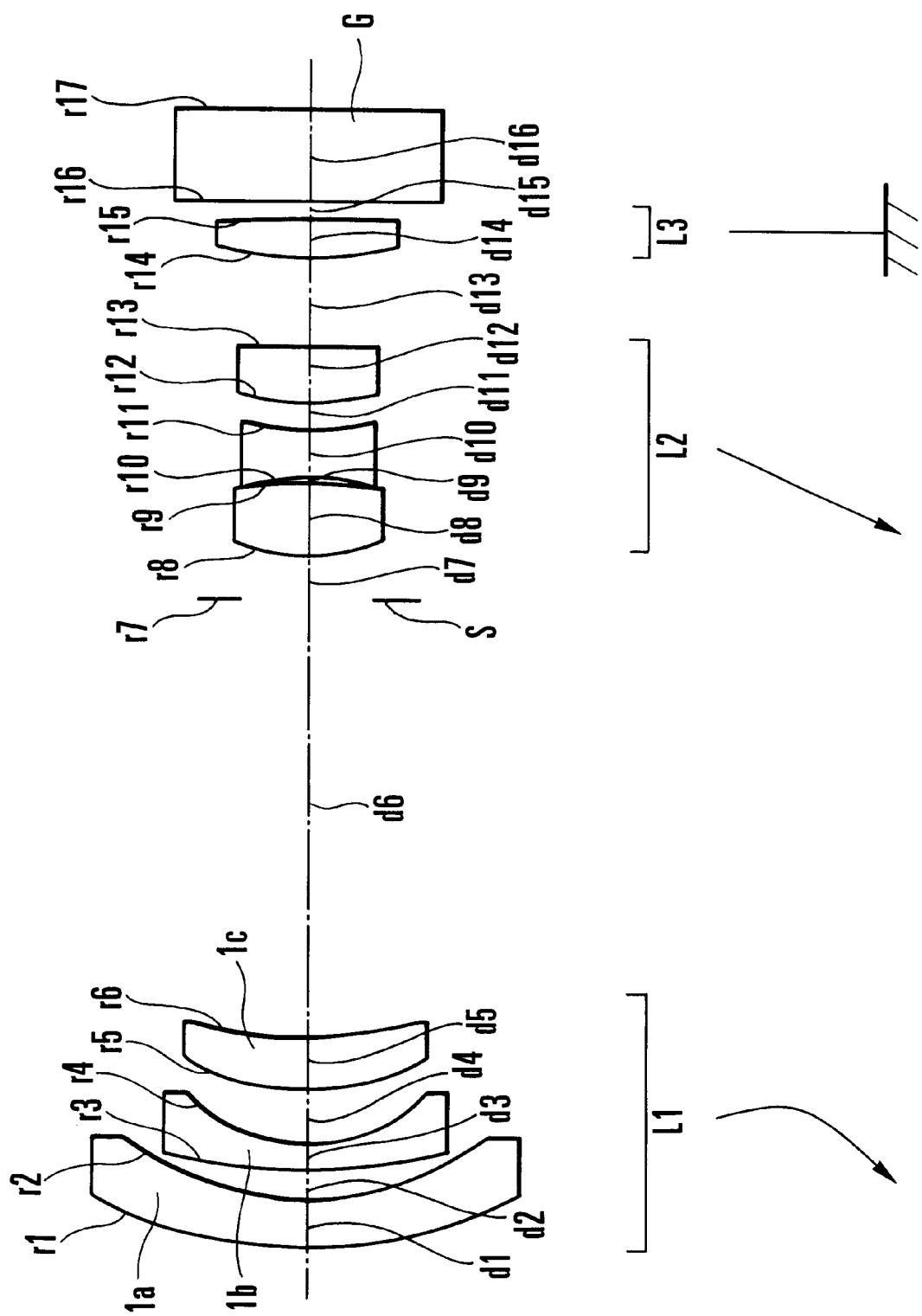
FIG. 17 is a longitudinal section view of a numerical example 5 of the zoom lens in the wide-angle end.
Figure 18:
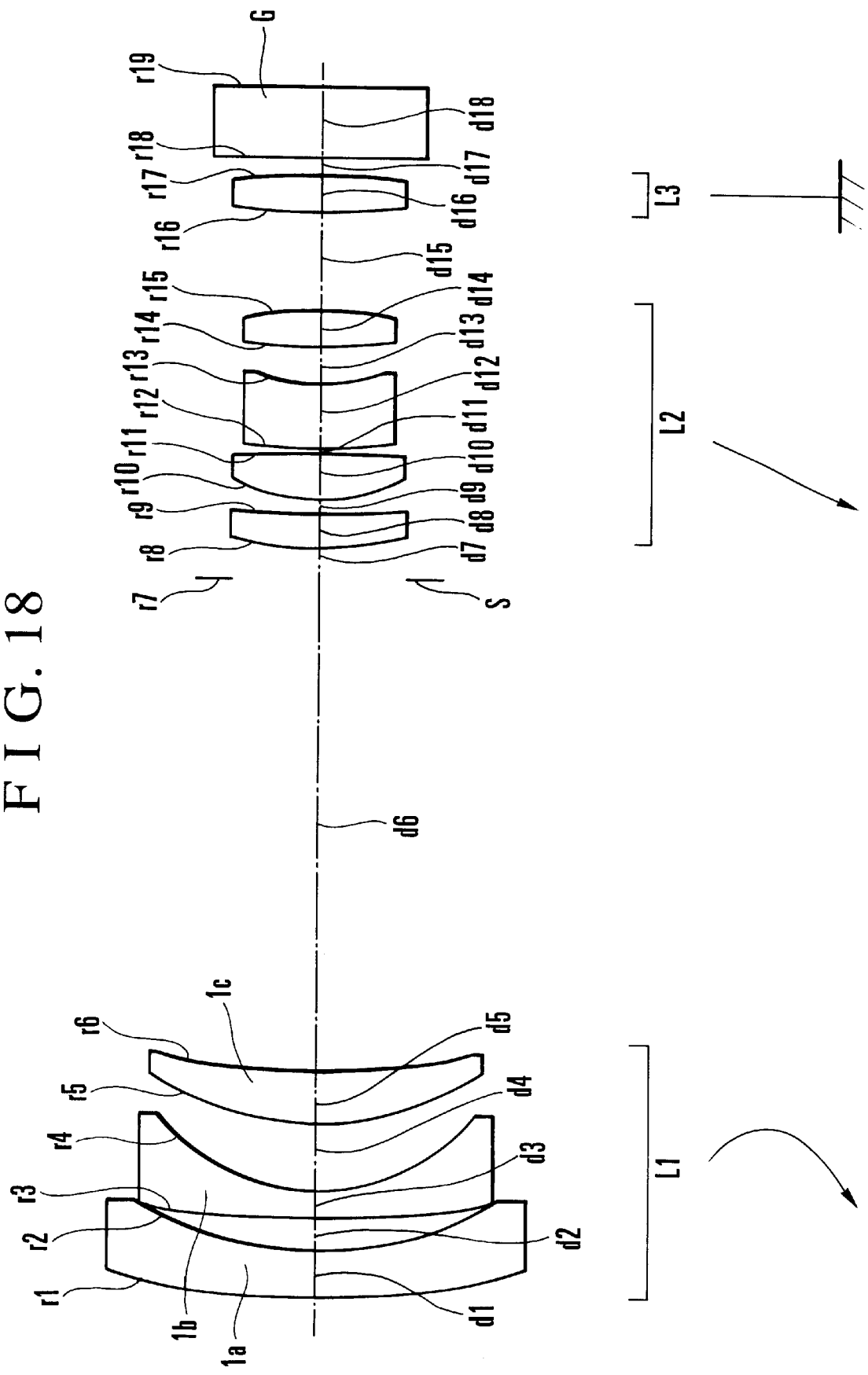
FIG. 18 is a longitudinal section view of a numerical example 6 of the zoom lens in the wide-angle end.
Figure 19:
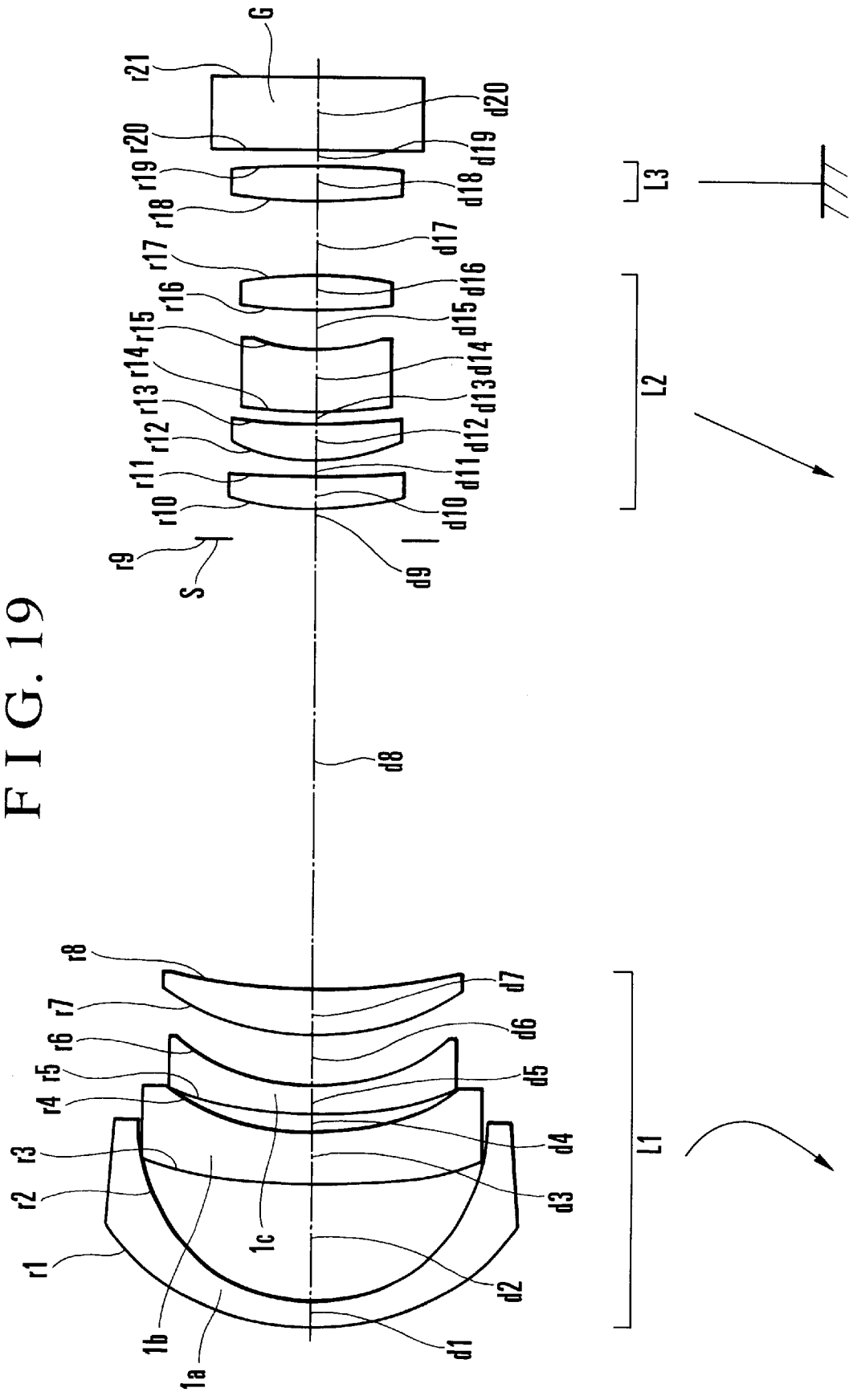
FIG. 19 is a longitudinal section view of a numerical example 7 of the zoom lens in the wide-angle end.
Figure 20:
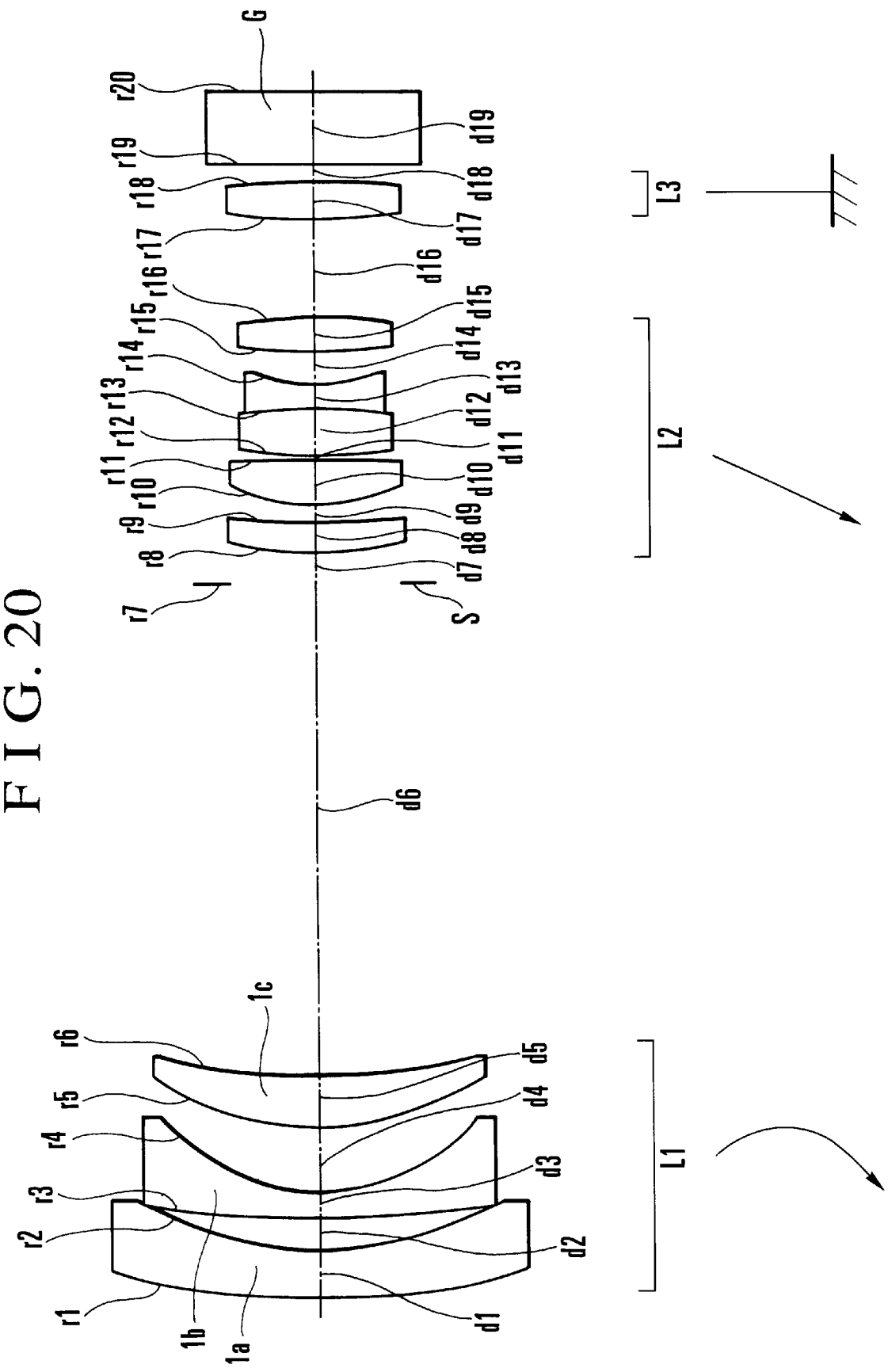
FIG. 20 is a longitudinal section view of a numerical example 8 of the zoom lens in the wide-angle end.

Column 8,
Line 67, "FIG. 5" should read -- FIG. 13 --.

Column 9,
Line 9, "aperture SP" should read -- aperture stop SP --.
Line 50, "Center" should read -- center --.

Column 10,
Line 14, "Used" should read -- used --.

Column 11,
Line 43, "in consideration" should read -- into consideration --.

Column 12,
Line 12, "in consideration" should read -- into consideration --.

Column 13,
Line 44, "0.30" should read -- 0.80 --.

Column 15,
Line 25, "-5.12602D-04" should read -- 5.12602D-04 --.
Line 62, "imaae" should read -- image --.

UNITED STATES PATENT AND TRADEMARK OFFICE
CERTIFICATE OF CORRECTION

PATENT NO. : 6,308,011 B1
DATED : October 23, 2001
INVENTOR(S) : Fumihito Wachi et al.

It is certified that error appears in the above-identified patent and that said Letters Patent is hereby corrected as shown below:

<u>Column 19,</u>
Line 37, "0.00000·10" should read -- $0.00000 \cdot 10^0$ --.

<u>Column 20,</u>
Line 64, "$-3.9111 \cdot 10^0$" should read -- $-3.95111 \cdot 10^0$ --, and "$5.60118 \cdot 10^0$" should read -- $5.60118 \cdot 10^{-3}$ --.

<u>Column 21,</u>
Line 43, "23D-graphically" should read -- 23D graphically --.

<u>Column 24,</u>
Line 20, "oft-axial" should read -- off-axial --.

<u>Column 31,</u>
Line 53, "33.400" should read -- 33.40° --.

<u>Column 32,</u>
Line 3, "33.400" should read -- 33.40° --.
Line 63, "$1 \sim^{-2}$" should read -- $10^{-2}$ --.

<u>Column 34,</u>
Line 3, "Constructed" should read -- constructed --.

<u>Column 35,</u>
Line 5, "side;" should read -- side: --.
Line 50, "unit the" should read -- unit during the --.

<u>Column 37,</u>
Line 37, "second is" should read -- second lens unit is --.
Line 40, "side," should read -- side: --.
Line 42, "having" should read -- having a --.

UNITED STATES PATENT AND TRADEMARK OFFICE
CERTIFICATE OF CORRECTION

PATENT NO.   : 6,308,011 B1
DATED        : October 23, 2001
INVENTOR(S)  : Fumihito Wachi et al.

It is certified that error appears in the above-identified patent and that said Letters Patent is hereby corrected as shown below:

Column 38,
Line 9, "side," should read -- side: --.
Line 27, "side," should read -- side: --.

Signed and Sealed this

Eleventh Day of March, 2003

JAMES E. ROGAN
*Director of the United States Patent and Trademark Office*